(12) United States Patent
Foster et al.

(10) Patent No.: US 7,882,149 B2
(45) Date of Patent: Feb. 1, 2011

(54) SYSTEM AND METHOD FOR FUTURE-PROOFING DEVICES USING METASCHEMA

(75) Inventors: Peter Reeve Foster, Macquarie Park (AU); John Charles Brook, Stanhope Gardens (AU); Nigel David Peter Eke, Kirrawee (AU)

(73) Assignee: Canon Kabushiki Kaisha, Tokyo (JP)

( * ) Notice: Subject to any disclaimer, the term of this patent is extended or adjusted under 35 U.S.C. 154(b) by 409 days.

(21) Appl. No.: 11/288,188

(22) Filed: Nov. 29, 2005

(65) Prior Publication Data

US 2006/0155725 A1 Jul. 13, 2006

(30) Foreign Application Priority Data

Nov. 30, 2004 (AU) .............................. 2004906846

(51) Int. Cl.
*G06F 7/00* (2006.01)
(52) U.S. Cl. ........................ 707/803; 707/695; 715/234
(58) Field of Classification Search ........................ None
See application file for complete search history.

(56) References Cited

U.S. PATENT DOCUMENTS

| | | | | |
|---|---|---|---|---|
| 6,502,112 | B1 | 12/2002 | Baisley ........................ 707/513 |
| 2003/0110279 | A1* | 6/2003 | Banerjee et al. ............. 709/232 |
| 2003/0120651 | A1 | 6/2003 | Bernstein et al. ................ 707/6 |
| 2003/0140308 | A1* | 7/2003 | Murthy et al. ............... 715/500 |
| 2003/0149934 | A1 | 8/2003 | Worden ....................... 715/513 |
| 2003/0167445 | A1 | 9/2003 | Su et al. ...................... 715/513 |
| 2003/0172368 | A1 | 9/2003 | Alumbaugh et al. ......... 717/106 |
| 2003/0182308 | A1* | 9/2003 | Ernst et al. ................ 707/103 Z |
| 2004/0083218 | A1* | 4/2004 | Feng ........................... 707/100 |
| 2004/0194016 | A1* | 9/2004 | Liggitt ..................... 715/501.1 |
| 2005/0050056 | A1* | 3/2005 | Idicula et al. ................ 707/100 |
| 2005/0050105 | A1* | 3/2005 | Idicula et al. ................ 707/200 |
| 2005/0060345 | A1* | 3/2005 | Doddington ............ 707/103 Y |

\* cited by examiner

*Primary Examiner*—Pierre M Vital
*Assistant Examiner*—Christopher J Raab
(74) *Attorney, Agent, or Firm*—Fitzpatrick, Cella, Harper & Scinto

(57) ABSTRACT

Disclosed are arrangements which seek to update schemas in a controlled manner so that a device (3710) or service can accurately parse documents conforming to a new version of a schema (3724, 3734) without the need for translation services or extra information within the document to provide guides for translation. One embodiment provides a "best-effort" attempt to process documents of an unknown schema, based on a defined similarity threshold, instead of rejecting such documents as being invalid. The arrangements disclosed seek to provide a satisfactory output from an input document that conforms with an unexpected schema. A method for constraining evolution of a schema associated with a markup language includes the steps of defining the schema and defining a metaschema associated with the schema. The metaschema provides rules for valid changes to the schema.

16 Claims, 42 Drawing Sheets

SYSTEM AND METHOD FOR FUTURE-PROOFING DEVICES USING METASCHEMA

CROSS-REFERENCE TO RELATED PATENT APPLICATION

This application claims the right of priority under 35 U.S.C. §119 based on Australian Provisional Patent Application No 2004906846, filed 30 Nov. 2004, which is incorporated by reference herein in its entirety as if fully set forth herein.

FIELD OF THE INVENTION

The present invention relates generally to electronic documents and, in particular, to the storage, maintenance and exchange of structured text-based documents as those documents evolve over time.

BACKGROUND

It is becoming increasingly popular to utilise electronic documents encoded with a markup language, such as Standard Generalized Markup Language (SGML) or eXtensible Markup Language (XML), for exchanging information among devices and services. Whilst the following discussion is largely described with reference to XML, it will be apparent to a person skilled in the art that the principles of the invention are not restricted thereto and may be equally practised on documents encoded using other markup languages.

XML provides a way to serialize structured information. XML schemas provide a means for defining the structure, content and semantics of XML documents. Schemas are used to specify valid elements that may occur in a document and the order in which such elements may occur. Schemas may also constrain certain aspects of the elements.

Each networked device or service that is to interchange XML documents is equipped with a parser conforming to a particular schema. On receipt of an XML document, the device executes the parser on the document to determine whether the received document is valid for the particular schema that the device is using. Using a validating parser in this manner requires memory, processing power and time. Some documents have an associated version number that indicates the schema to which the document conforms, thus reducing or obviating the need for validation.

XML does not provide an effective solution for handling incompatibilities that arise between different schema versions. Such incompatibilities generally occur as a result of enhancing functionality of devices and services over time. This is the problem of future-proofing, which seeks to ensure that XML documents utilising different schemas may be handled in an appropriate manner. There are a number of approaches presently used that attempt to address this problem.

The first, and arguably the simplest, approach adds new information to an existing schema of an XML document, as the need arises. In this way, a device is designed to use a parser that ignores all unknown elements and attributes in a received document by assuming these new elements and attributes have been added for new functionality on new devices. This solution fails to cater for any modification of existing elements and attributes, and is thus somewhat limiting. Examples of such modifications include renaming elements and attributes or moving existing elements and attributes within the document structure. These types of modifications typically arise when a schema is updated to provide new functionality. Thus, this first approach is unable to validate a document that has modified or new elements or attributes.

The first approach described above can be enhanced by adding a new schema to an original schema to produce an extended schema. Most elements in an extended schema do not require amendment and remain the same. Reorganized elements and new elements constitute new elements in the new, extended schema. Thus, devices equipped with a parser based on the original schema still successfully parse a document encompassing the extended schema, although the document might not validate against the old schema. New devices equipped with a parser conforming to the new schema ignore old information contained in the document and parse the new information successfully. Unfortunately, extending an existing schema in this manner increases the size and complexity of the document. Further, a new problem of maintaining duplicate information within the document has been created. It is preferable not to deal with the maintenance of duplicate information.

A further approach is to treat different versions of a schema as separate schemas. Rather than merging an existing schema and new schema together in the manner described above, this further approach utilises a translation function to enable a schema to be translated from the new schema version to the existing schema version and from the existing schema version to the new schema version. This translation function allows devices equipped with parsers conforming to different schemas to interchange documents successfully. The translation functionality can occur in either one or both of the devices that are interchanging a document, or as a separate service on a connected network.

The translation function disadvantageously requires details of how to translate between various versions of a given schema. This conversion is generally created manually by one of the schema designers. More recently, conversions have been generated in a semi-automatic manner by a schema mapping method that determines a way to map the same information from one schema to a different schema.

Schema mapping is used to provide a first attempt at mapping information between two given schemas. This first attempt at mapping is then manually updated, usually by a schema designer, to correct any errors caused by the schema mapping method. Some schema mapping methods produce a scoring value that can be used to provide an approximate indication of the success of a mapping. There is presently no single automatic schema mapping method that perfectly maps one arbitrary schema to another. Such a translation function can be implemented by utilising an Extensible Stylesheet Language Transformation (XSLT) transformation file.

The translation function is implemented in the device containing the translation functionality. As indicated above, this device can be one of the devices interchanging a document or can be a separate service on a connected network. Over time, the translation function consumes increasing amounts of memory on the device providing the translation, as the translation function needs to maintain translations between every combination of schema versions.

Although creating a new translation file is a time consuming and somewhat expensive process, translation has been considered a good solution, since the translation between two given schema versions is a precise mapping that has been verified by the schema designers. However, the translation approach requires constant availability of the mapping service, and eventually the mapping service may be used in every transaction, causing network and device bandwidth, latency and dependency problems.

XML is generally considered to be an exact structured format for storing information. Validating parsers are given a schema and reject any document that does not conform exactly to the schema. Validating parsers are not generally used in embedded devices, as validating is a processing and memory consuming overhead. Embedded devices typically have limited memory and processing power. Such embedded devices include printers, personal digital assistants (PDAs) and mobile phones. Further, in many instances there is no prescribed action if a document fails the schema validation. However, schema validation is useful when a person is using an XML editor and generating an XML document. The validation provides feedback to incorrect use of the XML structure by the user.

To reduce the rigidness of parsing an XML document, an application designer can use a parser, such as a Simple Application Program Interface for XML (SAX)-like parser, in a non-validating mode to allow for a loose form of parsing. The designer can design the application to process SAX events on specific XML elements, ignoring the relationship of these elements to other elements within the XML document. Although this approach seems prone to error, the document schema can be designed so that there is a unique tag name containing the relevant information. This means loose parsing is also somewhat robust to changes in the schema, because the schema structure can be changed and the parser still finds the XML tag and associated data. However, this approach does not work when a new version of the schema renames an element or attribute, or if there is more than one element of the same name in the document. This approach is equivalent to searching for a tag and ignoring structure, and thus does not use the full facilities of the XML technology. Consequently, structure or relationship information is not used.

Another form of loose parsing is the ubiquitous World Wide Web ("web") browser. Although HyperText Markup Language (HTML) does not necessarily conform to the strict rules of XML, HTML is very similar to the XML format. XML is concerned with describing data and what constitutes the data. In contrast, HTML is also concerned with displaying display and how data looks.

Web browsers have been designed to make a poor, but workable, "best-effort" attempt to display something from a given web page. A web browser is capable of displaying plain text containing no HTML tags whatsoever. HTML tags can be misspelt or important tags forgotten and the browser still provides something on the display. Generally, an HTML parser ignores any tag that the parser does not recognize and attempts to display any information contained within those tags. This leads the web browser defaulting to display the text nodes if no other formatting information is found. The web browser may also accept HTML tags, even when such tags have been placed in an incorrect part of the HTML document. This "best-effort" approach to process an HTML document is considered to be a desirable feature of web browsers and has reduced the amount of frustration with browsing poorly written web pages, or even pages designed to work better with a particular type of browser rather than another. When browsing web pages, it seems that showing something is better than showing nothing.

XML is becoming a common format for storing and interchanging information on the Internet. Unfortunately, the designers of schemas for information stored and interchanged on the Internet generally use different structures for storing the same data. For example, a first employee database stores the first name of an employee in a field entitled "FirstName" in one schema, while in another company the schema stores the first name of an employee in a field entitled "first". This lack of consistency makes interchanging information between companies very difficult.

An embedded device that is to operate in an environment where the document schema is constantly being evolved, new profiles are being generated and these profiles' schemas are also being evolved, can have a difficult time finding a document that the embedded device can understand sufficiently well to operate on. The constant need to update translation services to map new versions of the schema and profiles to older versions can be expensive and delay product releases due to the time taken to generate and test the translation files.

Thus, a need exists to provide a manner for "future-proofing" documents encoded using a markup language to enable documents conformant to different schemas to be handled in an appropriate manner when interchanged among networked devices and services.

SUMMARY

It is an object of the present invention to substantially overcome, or at least ameliorate, one or more disadvantages of existing arrangements.

Disclosed are arrangements which seek to update schemas in a controlled manner so that a device or service can accurately parse documents conforming to a new version of a schema without the need for translation services or extra information within the document to provide guides for translation. The invention also provides a best-effort attempt to process documents of an unknown schema, based on a defined similarity threshold, instead of rejecting such documents as being invalid. The arrangements disclosed seek to provide a satisfactory output from an input document that conforms with an unexpected schema.

According to a first aspect of the present disclosure, there is provided a method for performing schema-validation of a document, the method comprising the steps of:

defining a schema;

defining a set of constraining rules associated with the schema, the set of constraining rules identifying at least one valid change for at least one of an attribute and an element of the schema;

parsing the document using a rule-based parser associated with the set of constraining rules; and determining a similarity score for the document with respect to the schema, based on the parsing.

According to a second aspect of the present disclosure, there is provided a device for performing schema validation of a document, the device comprising:

a rule-based parser for parsing the document, the rule-based parser being associated with a set of constraining rules associated with a defined schema, the set of constraining rules identifying at least one valid change for at least one of an attribute and an element of the schema; and means for determining a similarity score for the document with respect to the schema, based on the parsing.

According to a third aspect of the present disclosure, there is provided a computer program product having a computer readable medium having a computer program recorded therein for performing schema-validation of a document, the computer program product comprising:

computer program code means for defining a schema;

computer program code means for defining a set of constraining rules associated with the schema, the set of constraining rules identifying at least one valid change for at least one of an attribute and an element of the schema;

computer program code means for parsing the document using a rule-based parser associated with the set of constraining rules; and computer program code means for determining a similarity score for the document with respect to the schema, based on the parsing.

According to a fourth aspect of the present disclosure, there is provided a method for constraining evolution of a schema associated with a markup language, the method comprising the steps of:

providing the schema; and defining a metaschema associated with the schema, the metaschema providing rules for valid changes to the schema.

According to a fifth aspect of the present disclosure, there is provided a method of performing schema validation on one or more documents, said method comprising the steps of:

defining a schema theme;

providing at least one markup language schema associated with said schema theme;

defining a set of rules associated with said schema theme, said set of rules establishing how each said schema relates to said schema theme;

parsing each said document using a parser associated with said set of rules; and determining a similarity score for each said document with respect to said schema based on said parsing.

According to a sixth aspect of the present disclosure, there is provided a computer program product having a computer readable medium having a computer program recorded therein for validating documents, the computer program product comprising:

computer program code means for defining a schema theme;

computer program code means for providing at least one markup language schema associated with the schema theme;

computer program code means for defining a set of rules associated with the schema, the set of rules establishing how the schema relates to each schema theme;

computer program code means for parsing the document using a rule-based parser conformant with the schema and associated with the set of rules; and computer program code means for determining a similarity score for the document with respect to the schema for at least one of the schema themes, based on the parsing.

According to another aspect of the present disclosure, there is provided an apparatus for implementing any one of the aforementioned methods.

According to another aspect of the present disclosure there is provided a computer program product including a computer readable medium having recorded thereon a computer program for implementing any one of the methods described above.

Other aspects of the invention are also disclosed.

BRIEF DESCRIPTION OF THE DRAWINGS

Some aspects of the prior art and one or more embodiments of the present invention will now be described with reference to the drawings, in which.

DETAILED DESCRIPTION INCLUDING BEST MODE

Figure 1:
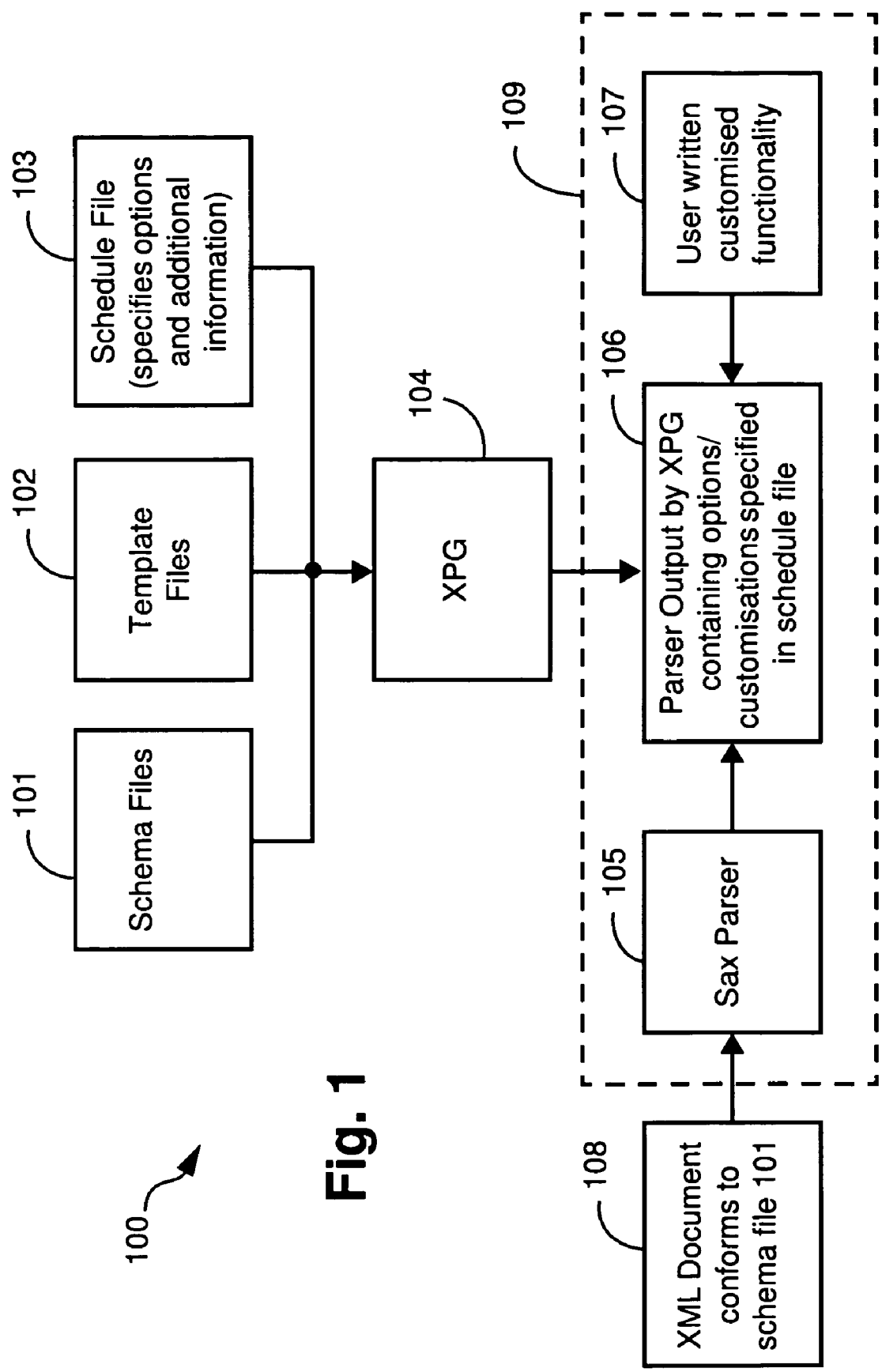
FIG. 1 is a schematic block diagram representation of data and functional blocks used in generating, building and executing a parser.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or patent applicant that such documents or devices in any way form part of the common general knowledge in the art.

XML Parser Generator (XPG)

XML Parser Generator (XPG) is a tool that enables a parser to be created or regenerated in a static form. A regenerated parser appears as source-code, which is typically compiled and linked with other code and installed into a device at time of manufacture. Alternatively, upgrades to deployed devices are also possible. Such upgrades are typically effected by updating software in the deployed devices. XPG utilises a schedule file to permit control of parsing, or implementation of optional parsing features.

XPG Summary

XPG is a parser generator that allows static modifications to the behaviour and data structures of the generated code through the use of options specified before generation and thus before compile time.

XPG generates a parser from an XML schema. In addition to this simple functionality, XPG provides a means to customise generated parser code by specifying options through an associated "schedule" file. The current implementation and generated code are implemented using the C programming language, but other programming languages can also be used.

A customisable and regenerable parser allows the regular and predictable code for XML parsing to be handled by the generated code, without limiting the functionality. This method allows the programmers to "hand" code the more complicated functionality that is impractical to generate using machines.

XPG Detailed Description

FIG. 1 is a schematic block diagram representation of an XML parsing system 100. An XPG 104 receives three input sources: an XML schema file 101, a set of predefined template files 102, and a schedule file 103. The schema file 101, as with all XML schemas, defines the grammar of the language. The set of template files 102 provides source code common to all XPG generated parsers. Typically, this code provides methods for tree traversal, tree construction and other common functions. The schedule file 103 specifies customisable options in a set of control parameters and provides additional information that may be required by the XPG 104. These options specified in the schedule file may require the user to provide additional functionality in a user written customised library 107. The XPG 104 utilises the three input sources 101, 102, 103 to generate parser source code 106.

The customised library 107 is typically compiled/linked with the generated source code 106. The customised library 107, parser source code 106, and an event based parser 105 form an output parsing system 109. The event based parser 105 receives an XML document 108 conforming to the schema defined by the schema file 101.

In this particular embodiment, the event based parser 105, or tokenising parsing system, is shown as a SAX parser. However, the parsing system is not limited to a SAX parser, or an event based parser such as this. For example, the tokenising parser 105 could be implemented as a "pull" parser.

The generated source code 106 is compiled and linked to generate a parser that defines data structures to represent all types, elements and attributes defined in the schema file 101. These data structures store schema elements in equivalent native C programming language data types, where appropriate. The generated parser is intended for use on any schema conformant XML document.

XPG Code Generation Process

The XPG program generates source code for an XML parser. As described above with reference to FIG. 1, there are several inputs to the generation process. The generation process involves creating the source code files based on the schema file 101, template files 102 and the schedule file 103. Throughout the generation process, the schema/schedule data may be accessed for information necessary for generating source code.

The schedule file 103 specifies pre-compiled options for the parser generation. These options allow static modification to the behaviour of the generated library, before compilation. These options include, but are not limited to, the features listed below.

1. A prefix for file, type and function names used in the generated code.
2. Customisable system function calls such as memory and input/output (I/O) routines that allow generation of parsers for restricted systems where particular handling of these is necessary. Additional source code is added to use the particular memory functions. In one embodiment, the template files 102 contain tags rather than specific memory and I/O operations. These tags are replaced with the chosen memory and I/O functions. Additionally to this, the generating process queries the schedule information before writing a memory or I/O function into the source code. Default options for memory and I/O handling are used if none are specified.
3. A choice of document tokenising parsers is available. In general, changing the document tokenising parser means that the initialisation procedures are changed. It may be necessary to change the document tokenising parser to ensure the system compiles with the customisation of memory and IO routines specified in option 2.
4. Ignoring schema types/elements/attributes provides simple filtering of a document. Elements/Attributes between the start and end tag are not included in an internal parse tree representation.
5. Call-backs on elements, attributes or types for customised behaviour that may include, but is not limited to, processing the data immediately, filtering the data, and mapping the data to another type. This allows customised functionality to be supported without overwriting the modified code when regeneration is necessary due to schema changes. Performing this customised functionality when processing document tokenising parser events will be described later with reference to FIG. 4.
6. Changes and additions to the data structures used to represent the schema and related additional initialisation and destruction. These changes or additions to the data structures are typically used by the "custom call-backs" of option 5.

Figure 2:
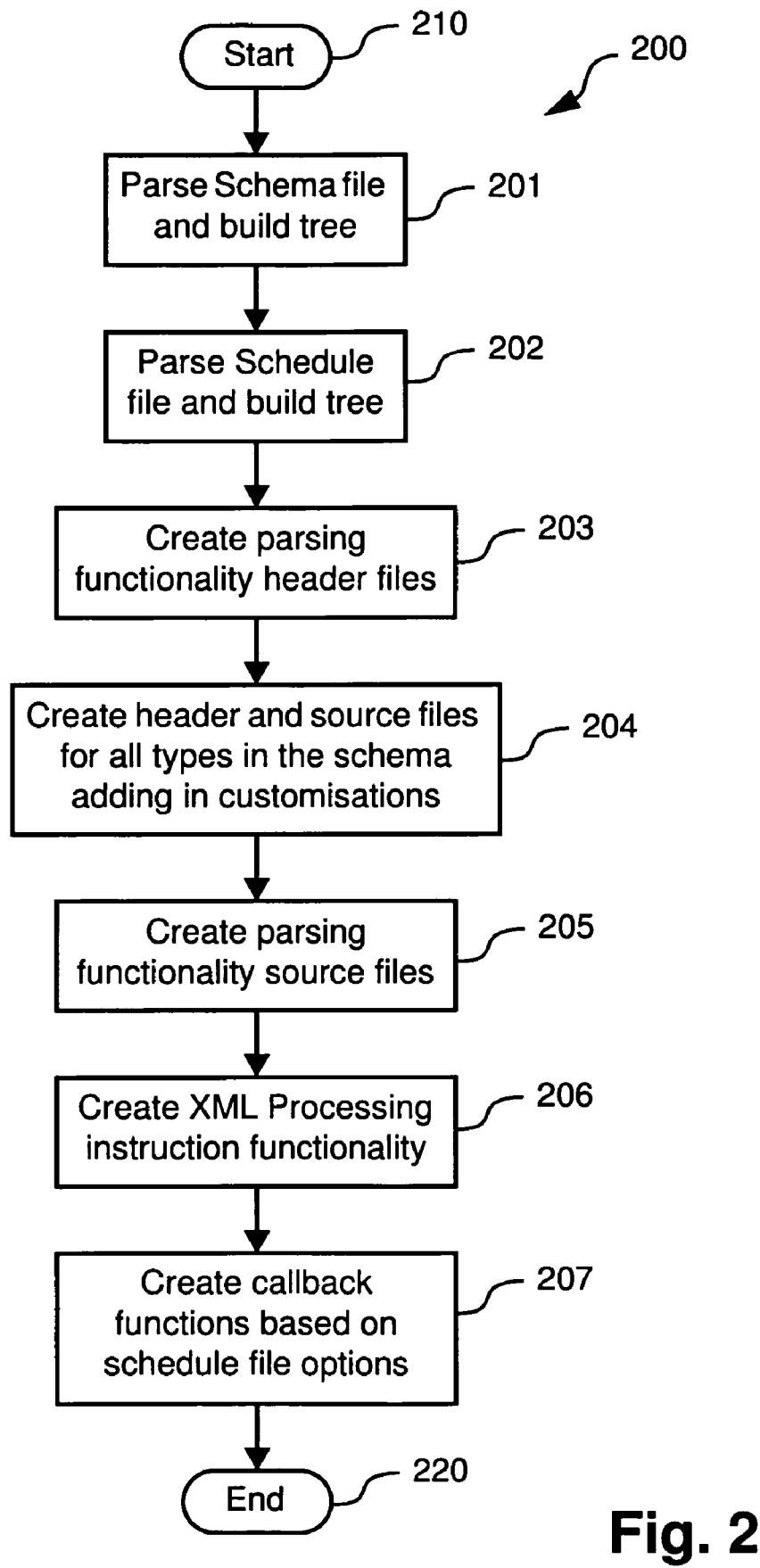
FIG. 2 is a flow diagram illustrating steps taken in generating a parser.

FIG. 2 is a flow diagram 200 showing the steps associated with the generation of a parser. Processing commences at Start step 210 and proceeds to step 201, in which XPG reads in the XML schema file 101 and builds an associated first parse tree. Control passes to step 202, in which XPG reads in the schedule file 103 and builds an associated second parse tree. The order in which the schema file 101 and the schedule file 103 are read is not important. Thus, in an alternate embodiment, step 202 may equally be performed before step 201.

Control passes from step 202 to step 203. Step 203 creates header files that are common to all generated parsers. These header files contain function and type definitions for parsing functionality. Information from the schema file 101, including the data types necessary, and information from the schedule file 103, including the prefix to use for function names and data types, is used in the generation of these header files. The content of these files is based largely upon the template files 102.

Control passes to step 204, which creates header and source files for each data type required by the schema. These header and source files contain static and/or dynamic data describing the type, data structure definitions and functions to initialise and free the structure. The information used to construct these files comes from the schema file 101 and the schedule file 103. The internal data representation created by parsing the schema is traversed to visit each node and create the necessary types. The schedule 103 provides information on any customisations to data structures and initialisation or destruction thereof. An example of a data type customisation is described later with reference to Tables 3 and 4. The memory customisation specified in the schema may also affect these data type source and header files.

Control passes from step 204 to step 205. Step 205 creates parsing routines and associated functions. The parsing routine is a generic method that allows parsing of any element. Most of the parsing functionality is created from the template files 102. Options from the schedule file 103 are used in customising this code. A table of XML components that need to be ignored will also be generated in the parsing routine based on information in control parameters in the schedule file 103. The choice of document tokenising parser and any specified replacement of standard memory or I/O routines defined in the schedule file 103 will also affect the resulting code. These customisations may be necessary for operation in memory/IO restricted environments. More detail of the behaviour of a generic response to a SAX event by the parsing routines is described with reference to FIG. 4.

Control passes from step 205 to step 206, which creates the functionality for any XML processing instructions that have been defined in the schema. These functions return to a user defined function with all the data from the processing instruction. These functions are preferably provided in the user customised library 107.

Control passes from step 206 to step 207, which generates customised functionality callback. The function calls to the customised user library are generated based upon control parameters from the schedule file 103. The function responsible for customised user library function calls, the "callback function", for elements in an example schema is shown in Table 5. This "callback function" is a callback table describing the required function call for an event type. Each XML schema component (elements, attributes, data type) has a "callback function". The parsing functions created in step 205 call an appropriate callback function on visiting elements, types and attributes passing information on what is being visited. The behaviour of the parsing routines in response to a generic SAX event is described in more detail below with reference to FIG. 4. If the XML component is defined in the schedule file to use customised user library functionality, the "callback function" would typically contain entries in a conditional expression that call the appropriate custom library 107 function for each XML component. Control passes from step 207 to a terminating End step 220.

XPG Parser Operation

Figure 3:
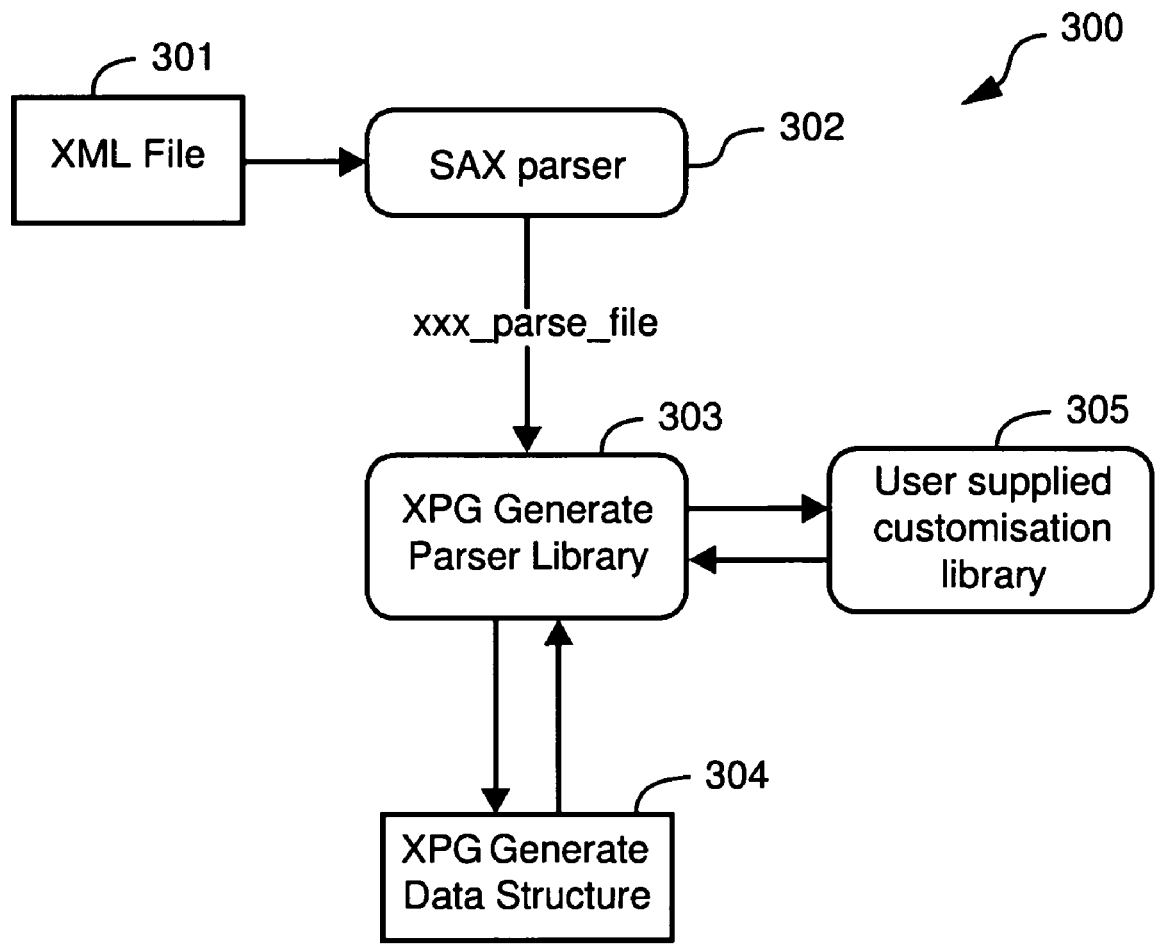
FIG. 3 is a schematic block diagram representation of data flow of a parser.

The basic operation of the generated code is to read an XML file and create a data representation of the XML file in memory of a computer. FIG. 3 is a schematic block diagram representation 300 of data flow of a parser. An XML file 301 is presented to a document tokenising parser 302. In this example, the parser 302 is implemented using a SAX parser. The parser 302 calls back to a generated code module 303 on events such as start and end element. This is standard functionality of a SAX parser, for example.

The generated code 303 uses a generic method for reading the element or attribute and creating the data structure to represent the element or attribute under consideration. Each element/attribute type does not have a specific read method, rather information is gathered about the XML component being read from a look-up table. This information allows the generic read method to construct a data structure 304 without knowledge of the definition of the structure. The data structure 304 is added to the internal representation of the file being built by the parser 302. The data structure 304 exchanges information with the generated code 303, illustrated by bi-directional arrows linking the data structure 304 to the generated code 303. For example, the generated code 303 passes new nodes, or sub-structures that are members of a node, to the data structure 304. The data structure 304 passes pointers to nodes or sub-structures back to the generated code 303. Customised functionality is called in a supplied library 305, if necessary, shown by bi-directional arrows linking the supplied library 305 to the generated code 303.

XPG Customisation Using Call-Back Functions

An advantage of the XPG generated source code method over the prior art is that the custom user library functions, coupled with ignoring elements, customisation and mapping of the data structures, provides a more highly customised regenerable parser.

An example of this is non-standard duplication of types; a resource reference stored as a string may be converted to a pointer that references the resource. These parsers can conditionally process XML documents, including decisions based upon document structure, and map between data types, within the internal data representation of the parser, while still allowing regeneration if the schema changes.

Another example of customisation includes a specification change that ignores more/less of the schema or specifies alternate processing for elements. In the case of a specification change, the parser is regenerated and extra functionality is added to the customised library. The user typically modifies the schedule, regenerates the code, adds the necessary customised functionality to the user supplied library 107, and compiles and links the parser.

The schedule file 103 specifies the function name for customised user library function calls and a header file containing the definition of these functions. The customised user library function body is compiled into a separate library 305 and linked with the generated parser 303. The regeneration process is thus effectively separated from the customisation. If regeneration of the parser is necessary, the customisations are not affected. The user can modify the implementation of their customisation at any time, before linking occurs.

The schedule file specifies the customisations for behaviour/representations of XML components in control parameters specified using the following grammar, described with reference to Table 1, which is a sample fragment of the schema of a schedule file 103.

TABLE 1

| 1 | <xs:complexType name="tExtra"> |
|---|---|
| 2 |   <xs:sequence> |
| 3 |     <xs:element name="INCLUDE" type="xs:string" minOccurs="0" maxOccurs="unbounded"/> |
| 4 |     <xs:element ref="CALL" minOccurs="0" maxOccurs="unbounded"/> |
| 5 |     <xs:element ref="EXTRA" minOccurs="0" maxOccurs="unbounded"/> |
| 6 |   </xs:sequence> |
| 7 |   <xs:attribute name="NAME" type="xs:string"/> |

TABLE 1-continued

| 8 |   <xs:attribute name="IGNORE" type="xs:boolean"/> |
|---|---|
| 9 |   <xs:attribute name="DEFAULT" type="xs:boolean"/> |
| 10 | </xs:complexType> |
| 11 | <xs:element name="CALL"> |
| 12 |   <xs:complexType> |
| 13 |     <xs:sequence> |
| 14 |       <xs:element name="FUNC" type"xs:string"/> |
| 15 |     </xs:sequence> |
| 16 |   </xs:complexType> |
| 17 | </xs:element> |
| 18 | <xs:element name="EXTRA"> |
| 19 |   <xs:complexType> |
| 20 |     <xs:sequence> |
| 21 |       <xs:element name="NAME" type="xs:string"/> |
| 22 |       <xs:element name="TYPE" type="xs:string"/> |
| 23 |       <xs:choice minOccurs="0"> |
| 24 |         <xs:element name="INIT" type="xs:string"/> |
| 25 |         <xs:element name="INIT_FUNC" type="xs:string"/> |
| 26 |       </xs:choice> |
| 27 |       <xs:element name="FREE_FUNC" type="xs:string" minOccurs="0"/> |
| 28 |     </xs:sequence> |
| 29 |   </xs:complexType> |
| 30 | </xs:element> |

Complex types, elements, sequences and attribute groups are of type tExtra, Table 1 line 1, and can be specified with the following options.

INCLUDE specifies extra include files necessary for this XML component.

CALL specifies the custom user library function for the customised processing of the XML component.

EXTRA specifies any extra variables to add to the representation of XML component, including an associated name, type and initialisation and destruction.

NAME specifies the name of the applicable XML component.

IGNORE specifies whether this XML component should be ignored during parsing.

DEFAULT specifies whether the default processing, and hence default data representation, is necessary.

TABLE 2

| 1 | <!-- Callback Function --> |
|---|---|
| 2 | <ELEMENT NAME="import"> |
| 3 |   <CALL> |
| 4 |     <FUNC>xsdb_import</FUNC> |
| 5 |   </CALL> |
| 6 | </ELEMENT> |
| 7 | |
| 8 | <!--Callback Function --> |
| 9 | <ELEMENT NAME="include"> |
| 10 |   <CALL> |
| 11 |     <FUNC>xsdb_include</FUNC> |
| 12 |   </CALL> |
| 13 | </ELEMENT> |
| 14 | |
| 15 | <!--Callback Function and data type customisation --> |
| 16 | <COMPLEX_TYPE NAME="tComplexType" IGNORE="false" DEFAULT="true"> |
| 17 |   <INCLUDE>xsd_U6.h</INCLUDE> |
| 18 |   <INCLUDE>xsd_callback_header.h</INCLUDE> |
| 19 |   <CALL> |
| 20 |     <FUNC> xsdb_complex_type</FUNC> |
| 21 |   </CALL> |
| 22 |   <EXTRA> |
| 23 |     <NAME>ct_Base</NAME> |
| 24 |     <TYPE>XSD_O_U6</TYPE> |
| 25 |     <INIT_FUNC>xsd_init_U6</INIT_FUNC> |
| 26 |   </EXTRA> |
| 27 | </COMPLEX_TYPE> |

Table 2 is a sample fragment of schedule file 103 using INCLUDE for the extra data member and custom user library function, at lines 17-18, CALL for a custom user library function, at lines 19-21, and EXTRA, at lines 22-26. EXTRA shows NAME line 23, TYPE line 24 and INIT_FUNC line 25 for an extra member of the data type.

TABLE 3

```
1    #include "xsd_annotated.h"
2    #include "xsd_complexTypeModel.h"
3    #include "xsd_U6.h"
4    #include "xsd_callback_header.h"
5
6    extern XSD_Str XSDS_tComplexType[ ]
7
8    struct XSD_O_tComplexType
9    {
10       XSD_O_annotated   x_Base;
11       XSD_O_U6 ct_Base;
12       XSD_O_complexTypeModel   x_complexTypeModel;
13       char * se_name;
14       BOOL se_mixed;
15       BOOL se_abstract;
16       char * se_final;
17       char * se_block;
18       XML_Ext   *x_Extra;
19   }
```

The resulting header file for this structure, shown as Table 3, illustrates the definition of the extra structure member ct_Base of type XSD_O_U6, line 11 which was defined in line 23 and 24 of Table 2. If "DEFAULT" is set to false in Table 2 line 16, only ct_Base is in the data structure. The default data members generated from the schema information are not included. The additional include file, "xsd_U6.h", line 3 was defined in line 18 of Table 2. The resulting source file for initialising this type, shown as Table 4 below, demonstrates the initialisation of ct_Base using the xsd_init_U6 function, line 25. This initialisation was defined in line 25 of Table 2. If DEFAULT is specified as false, the XSD_O_U6 data type only contains the ct_Base data member. During processing of this element, no default processing occurs.

TABLE 4

```
1    /*
2     * xsd_init_tComplexType
3     *
4     * Routine to init tComplexType structure.
5     *
6     * Parameters:
7     * struct_ptr Structure to init.
8     */
9    void
10   xsd_init_tComplexType
11   (
12      XSD_O_tComplexType *struct_ptr
13   )
14   {
15      xsd_init_U6(&struct_ptr->ct_Base);
16      xsd_init_complexTypeModel(&struct_ptr->
             x_complexTypeModel);
17      struct_ptr->se_name = STR_UNDEF;
18      struct_ptr->se_mixed = BOOL_UNDEF;
19      struct_ptr->se_abstract = BOOL_UNDEF;
20      struct_ptr->se_final = STR_UNDEF;
21      struct_ptr->se_block = STR_UNDEF;
22      struct_ptr->x_Extra = NULL;
23
24      xsd_init_annotated(&struct_ptr->x_Base);
25   }
```

Figure 4:
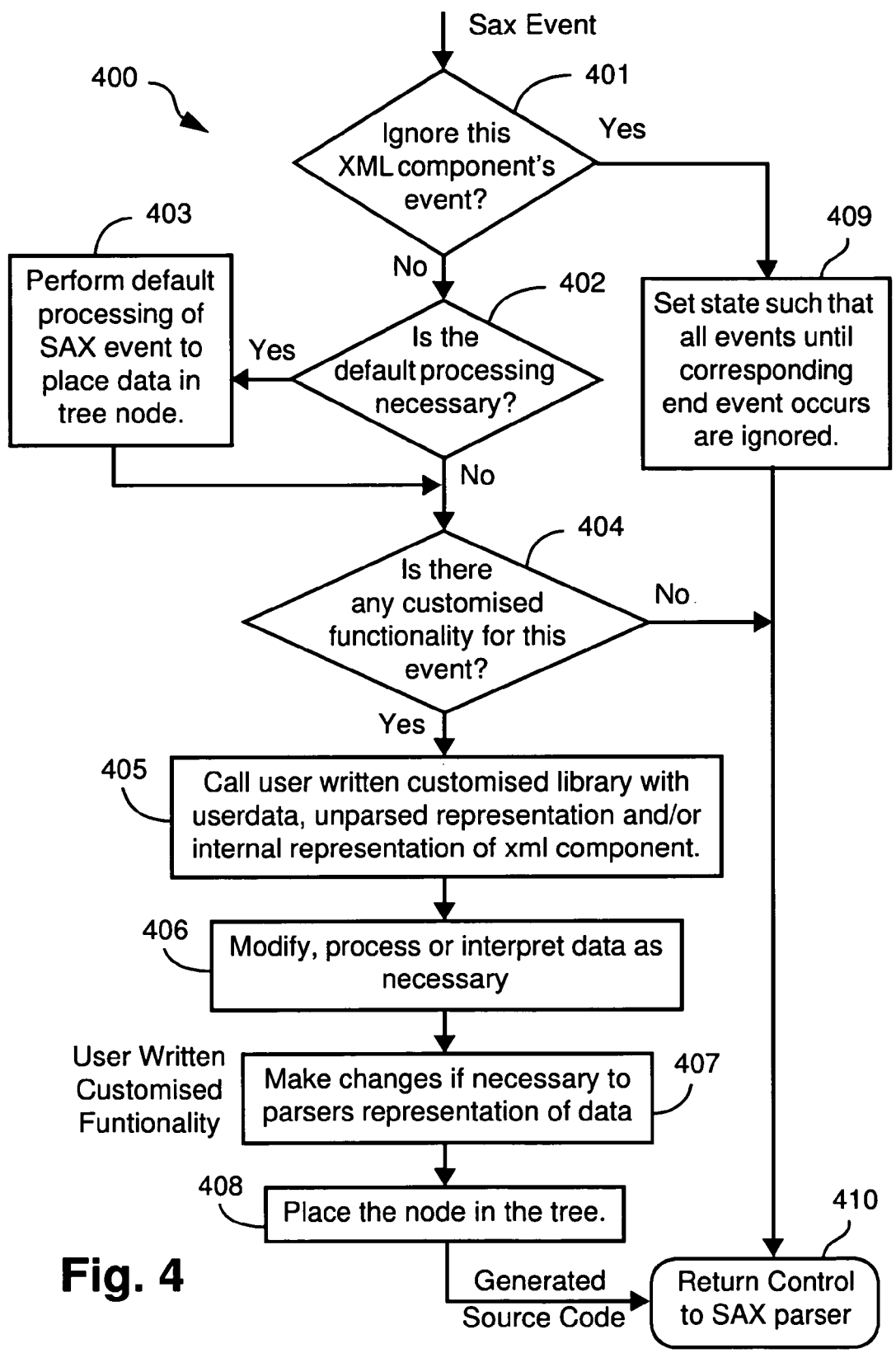
FIG. 4 is a flow diagram illustrating processing of an XML element.

FIG. 4 is a flow diagram 400 showing the generic processing of an XML element by the parsing routines, including a call to a function for customised handling of an XML element. When parsing the document, the generated code for the generic read function receives document parser events.

A SAX event is presented to a first decision step 401, which determines whether to ignore events associated with a current XML component. If the event is to be ignored, "Yes", control passes to step 409, which sets the state of the parser to ignore all received events until a corresponding end event is received. Control then proceeds to step 410, which returns control to the SAX parser.

If the event at step 401 is not to be ignored, "No", control passes to decision step 402, which determines whether default processing is necessary. If default processing is necessary, "Yes", control passes to step 403 to perform the default processing of the SAX event to place data in a tree node. Control then passes to decision step 404. If there is no default processing required at step 402, control passes to the customised functionality test at step 404.

Step 404 determines whether there is a customised functionality callback associated with the received event. If the event has a customised user library function defined, "Yes", control passes to the function in the user written customised functionality library at step 405. This function modifies or processes required data at step 406, before passing control to step 407 to make any necessary changes to the data structure(s). The data structure(s) and associated data constructed through any combination of customised or default processing are added to the tree in the next step 408. Control passes from step 408 to step 410, which returns control to the parser.

If there is no associated customised functionality at step 404, "No", control passes to step 410.

In this preferred embodiment, a generic read method is used, and tests on particular conditions at steps 401, 402 and 404 for each event type are necessary. In another embodiment, a specific read method is created for each type and the tests specified by steps 401, 402 and 404 are implicit in the generated source code.

For each of the elements specified in the schedule to have customised user library functions, the preferred embodiment of the generator adds an entry in a conditional statement within the xsd_cb_call function, shown in Table 5. The xsd_cb_call function is called to determine if there is customised functionality for that XML component, as described above with respect to step 404. The conditional statement is evaluated at run time and any customised functionality from the user supplied library 107 is called to process this event. An example of this appears at Table 5, line 22 which was defined in line 20 in Table 2. A similar process occurs for other components of the XML grammar, for example, attributes.

As mentioned above, in an alternative embodiment where typed read functions exist, the xsd_cb_call function is unnecessary.

TABLE 5

```
1    BOOL
2    xsd_cb_call
3    (
4       void *user_data,
5       BOOL (*callback)(void *, XSD_TypedObj *),
6       XSD_Type type,
7       void *obj
8    )
9    {
10      switch (type)
11      {
12      case XSDTE_import:
```

TABLE 5-continued

```
13      if (!xsdb_import(user_data, obj))
14          return FALSE;
15
16      break;
17
18  case XSDTE_include:
19      if (!xsdb_include(user_data, obj))
20          return FALSE;
21  case XSDTE_complexType:
22      if (!xsdb_complex_type(user_data, obj))
23          return FALSE;
24
25      break;
26
27  default:
28      break;
29  }
30  return TRUE;
31 }
```

The example source generated, shown in Table 5 above, is generated with the schedule snippet provided in Table 2. Note the custom user library functions to xsdb_import line 13, defined in Table 2 line 4, xsdb_include line 19, defined in Table 2 line 11 and xsdb_complexType line 13 defined in Table 2 line 4. The internal tree representation of the XML component parsed and the user data are passed to these custom user library functions. The user customised library 107 can perform additional functionality on the data in this structure and if necessary place results in extra data members created using the EXTRA type, or modify the existing member data.

The user_data parameter shown in Table 5 line 4 is user defined at runtime during initialisation of the generated parser. The user_data parameter contains pointers and data the user may use to process the data during the custom user library functions. This user_data may include, for example, a memory area for memory operations, or a pointer to objects that interface to other systems that could be influenced by the results of parsing.

Selective and Dynamically Reconfigurable Parsing

The following is a detailed description of an embodiment of a method to perform selective and dynamically reconfigurable parsing of streaming documents containing redundant information. There is disclosed a dynamically programmable parser that may have associated rules modified during execution and/or at any time after manufacture and deployment. The detailed description makes reference at various times to priorities. When priorities are indicated by numeric values, the higher number indicates a higher priority. Of course, it will be understood that this is a nominal ordering and other embodiments may equally utilise lower numbers to identify higher priorities.

Neither the examples nor the remainder of the detailed description make specific reference to namespaces within XML. However, it would be apparent to a person skilled in the art that qualified names can be provided wherever simple local names have been shown or described.

Two adaptations are disclosed. The first adaptation, the "inclusive adaptation", provides a method in which there are no concerns about data being extracted from overlapping areas of a document. The second adaptation, the "exclusive adaptation", provides a method in which data is derived from exclusive locations of the document.

Inclusive Adaptation

Figure 5:
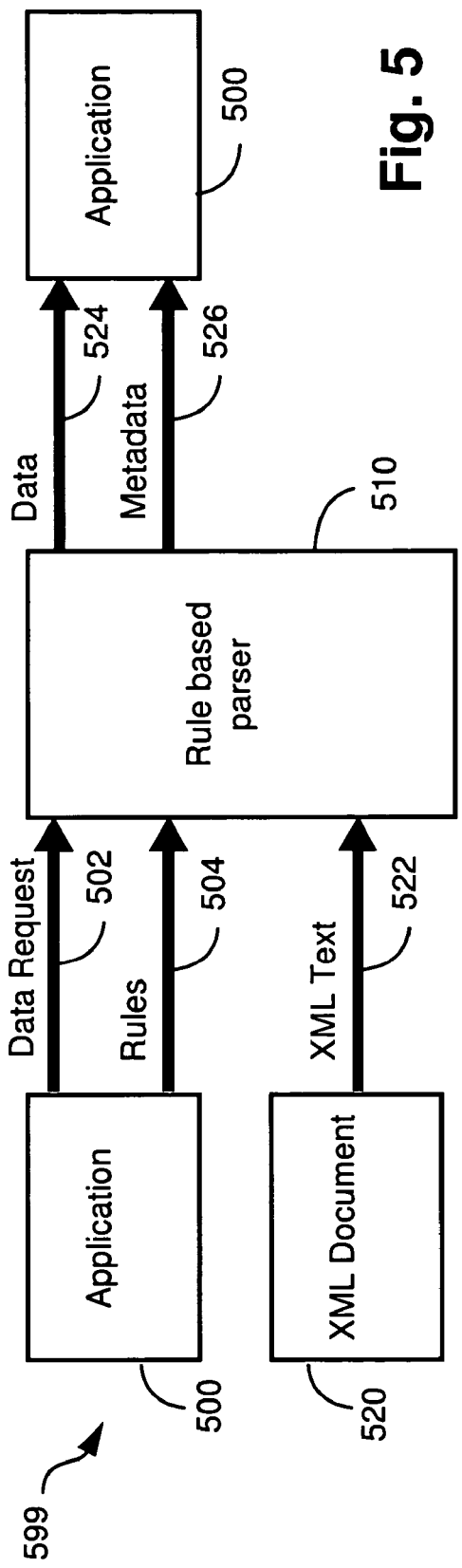
FIG. 5 is a schematic block diagram representation of a rule-based parser and associated data and control flows.

FIG. 5 is a schematic block diagram representation 599 of a rule-based parser 510 and flow of information through interfaces of the rule-based parser 510. An application 500 calls the rule based parser 510 by sending a request for data 502 and associated rules 504. The request for data 502 indicates a source of XML document data 520 and may be implemented, for example by a call to a parsing function passing a filename, Uniform Resource Identifier (URI), or a form of input stream. The rules 504 specify a location of data that the application 500 wishes to extract from the document 520.

XML text 522 is presented from the source document 520 into the rule based parser 510. The rule based parser 510 parses the XML text 522 and checks to see which, if any, of the rules 504 are satisfied. The rule-based parser 510 caches data 524 related to the satisfied rules. When all the required data 524 has been extracted, or there is no more XML text 522 to parse, the data 524 is passed from the parser 510 back to the application 500.

In a preferred embodiment, the rule based parser 510 also returns metadata 526 to the application 500. The metadata 526 provides information relating to the returned data 524, and may include, for example, the rules 504 used in selecting the returned data 524, and the location (offsets) of the returned data 524 in the XML document 520. In one embodiment, the metadata 526 includes 'user data' provided with the rules 504. User data enables the application 500 to easily associate application specific information with the rules 504 that successfully matched, and the returned data 524.

The rule based parser 510 is now described in more detail with reference to FIG. 6, which is a schematic block diagram representation 699 of data flow within the rule based parser 510. When the rule based parser 510 receives the data request 502, the rule based parser 510 downloads XML text 522, shown as a broad arrow entering the rule based parser 510. The parser 510 also receives the rules 504. In this embodiment, the XML text 522 is processed by a SAX or SAX-like parser 600. The SAX or SAX-like parser 600 generates XML events 615 that are presented to a rule engine 620 for interpretation. The rule engine 620 receives the rules 504 and the XML events 615, and then determines whether any of the supplied rules 504 is satisfied. The rule engine 620 is not limited to processing XML events 615. The rule engine 620 may also be utilised to identify and process required data from other received document types. For example, the rule engine 620 may be utilised to identify programmatic structures, such as loop statements and content contained therein in received program source code. In other embodiments, the SAX-like parser 600 could be replaced by any parser that reads any document 520 and, interpreting the text 522 of the document 520, can feed events 615 to the rule engine 620.

In one embodiment, the rule engine 620, while analysing the XML events 615 and checking against the supplied rules 504, caches data 524 that is deemed satisfied by one of the rules 504. In this embodiment, the rule engine 620 stores metadata 526 related to the actual rule satisfied, when storing data 524 in the cache. The storing of related metadata is optional and may not feature in alternate embodiments. On completion of the parsing, the rule based parser 510 outputs the data 524 and any associated metadata 526 from the parser 510 to the application.

Figure 7:
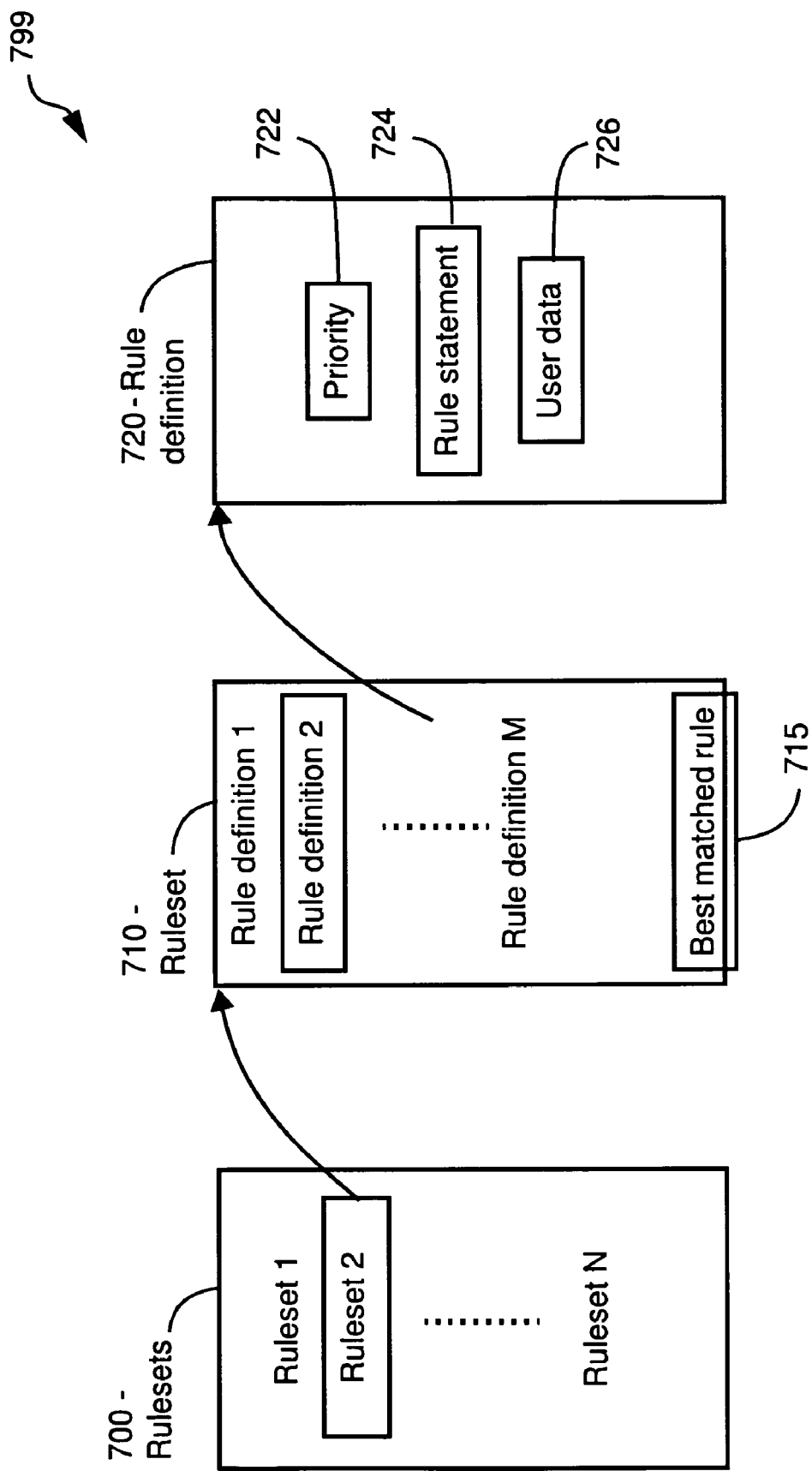
FIG. 7 is a schematic block diagram representation of a logical data structure for rules associated with a rule-based parser.

Before describing the process of matching the events 615 to determine if one of the rules 504 is satisfied, some further definition is required for the structure of the rules 504. FIG. 7 is a schematic block diagram representation 799 of a logical data structure for the rules 504 previously discussed. The rules 504 comprise one or more rulesets 700. A ruleset is defined for each data item 524 that the application 500 seeks to extract from the document 520. In this example, the rulesets 700 include ruleset 1, and ruleset 2 through to ruleset N, where N is the number of data items 524 to be extracted. Each ruleset comprises one or more rule definitions.

Ruleset 710 is an exploded view of ruleset 2 and includes rule definition 1, and rule definition 2 through to rule definition M, where M is the number of rule definitions. Additionally, each ruleset records a best matched rule for the ruleset. The ruleset 710 shows a best matched rule 715. The best matched rule 715 is initialised to indicate there is not a best match and is updated during later processing.

Each rule definition defines a location in the document 520 where the data item 524 may be found. Rule definition 720 is an exploded view of the rule definition 2 of ruleset 710. Rule definition 720 comprises a priority 722, a rule statement 724 and optional user data 726. Rule matches of the same priority 722 are allowable. Thus, the best matched rule 715 can represent one or more rules 720 for the ruleset 710. In the case where the best match rule 715 represents a plurality of rules 720, each rule 720 has the same priority 722. In the preferred embodiment, the rule statement 724 takes the form of an XPath expression.

Although XPath expressions are preferably used to describe the rule statement 724, there is no implication that an implementation of XPath is required when performing the rule matching. It can be seen, however, that the rule statement 724 can take many forms, for example a call-back. In this case, the call-back is provided with data related to the document location. Such data may include, for example, one or more of line, column, current word, current paragraph and current XPath location. The call-back function returns a true or false indication to indicate whether the rule is satisfied or otherwise.

A rule statement can be formed by any expression that specifies one or more data locations within a document. For a text based document, rule statements may include, for example: Chapter X; Paragraph Y; Page W, lines y-z; or Paragraphs containing the word "Sydney". For another document, a rule statement might take the form of "Bytes at offset m through to n".

As mentioned earlier, the application 500 optionally associates user data 726 with each rule 720. The user data is returned to the application 500, if the associated rule 720 is the rule that is matched and used to extract the data 524.

One embodiment utilises a table driven approach to specify the rules 504, as will be described. Other methods to specify the rules 504, other than the table driven approach, include hard-coded procedures, rules that are downloaded, and rules specified in their own languages; indeed, the rules can be written and interpreted in XML. The rules can also be defined using scripts. However, the table-driven approach in the described embodiment complements the reconfigurable properties of the parser. A file is read at run-time to build a table specifying the rules, which allows the rules and priorities to be maintained independently from the program. New rules can be introduced by downloading a new file, without interrupting execution of the program. Further, different sets of rules may be utilised depending on circumstances.

TABLE 6

```
<root>
    <childA>
        <data>...</data>
    </childA>
    <childB>
        <data>...</data>
    </childB>
</root>
```

Figure 8:
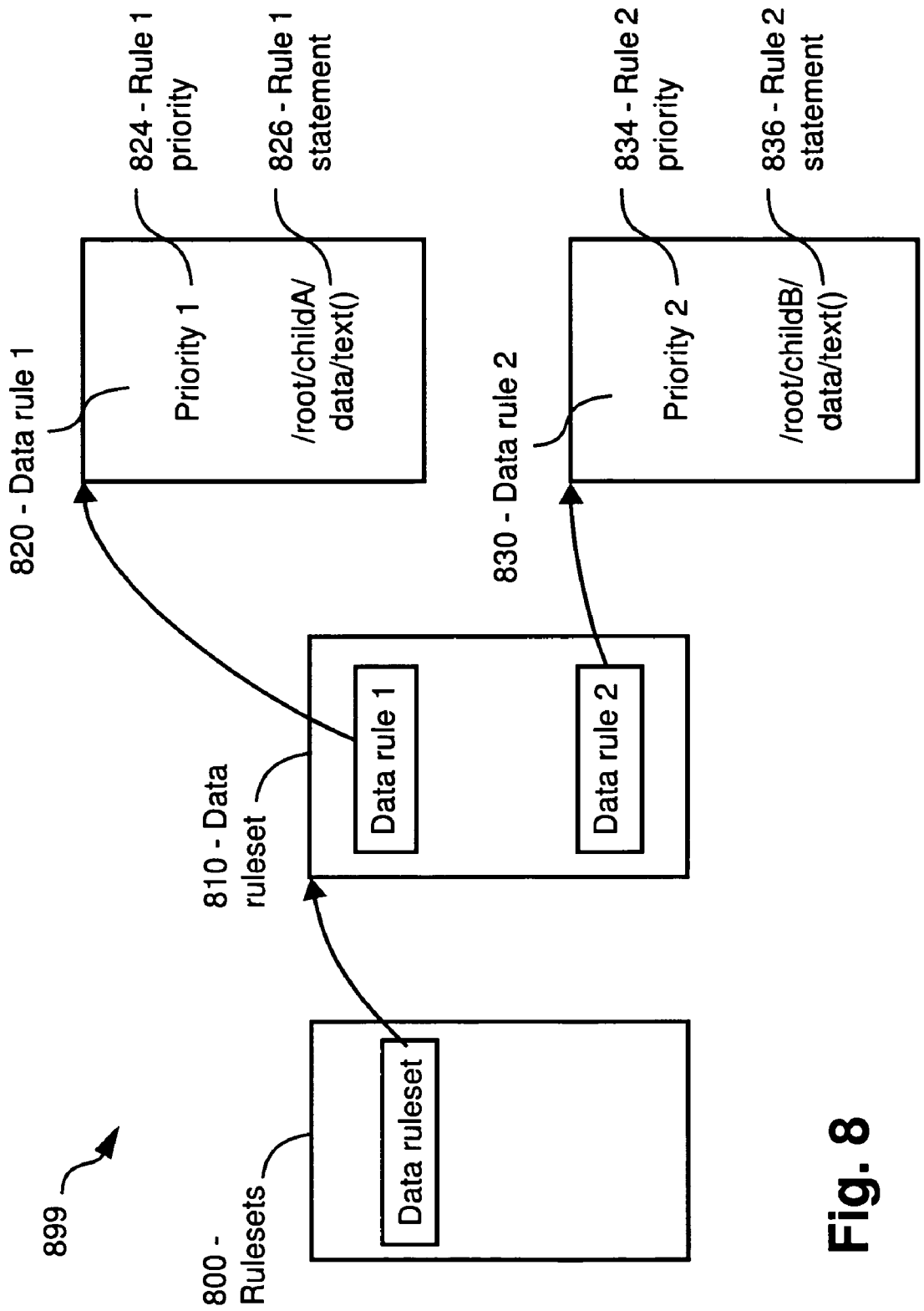
FIG. 8 is a schematic block diagram representation of a sample physical data structure, comprised of the logical elements depicted in FIG. 7, of rules used to extract data from a sample document given in Table 6.

Table 6 is a simple example of an XML document, and represents the contents of the XML document 520 from FIG. 5. FIG. 8 is a schematic block diagram representation 899 of a sample physical data structure, comprising the logical elements depicted in FIG. 7, with reference to Table 6. A ruleset 800 is arranged to select one item of information pertaining to data text of a child, and thus contains a single data ruleset 810.

In this example, the document of Table 6 contains two "child" entries. Accordingly, the ruleset 810 has two entries. An exploded view of the ruleset 810 shows that the ruleset contains data rule 1 820 and data rule 2 830. Data rule 1 820 states that the information can be found in the document of Table 6 at XPath location "/root/childA/data/text( )". Rule 2 830 states that the information can also be found in the document of Table 6 at the XPath location "/root/childB/data/text( )".

An exploded view of data rule 1 820 shows that data rule 1 820 includes a priority of 1 824 and the XPath location "/root/childA/data/text( )" 826. An exploded view of data rule 2 830 shows that data rule 2 830 includes a priority of 2 834 and the XPath location "/root/childA/data/text( )" 836. As data rule 2 830 has a higher priority than data rule 1 820 [priority '2' is greater than '1'], this indicates that the data 524 to be returned to the user should be extracted from the location "/root/childB/data/text( )" in preference to "/root/childA/data/text( )".

TABLE 7

```
<root>
    <image resolution="high" alternateSource="highResImage.jpg">
        [Embedded high res image data]
    </image>
    <image resolution="med" alternateSource="medResImage.jpg">
        [Embedded med res image data]
    </image>
    <image resolution="low" alternateSource="lowResImage.jpg">
        [Embedded low res image data]
    </image>
</root>
```

Figure 9:
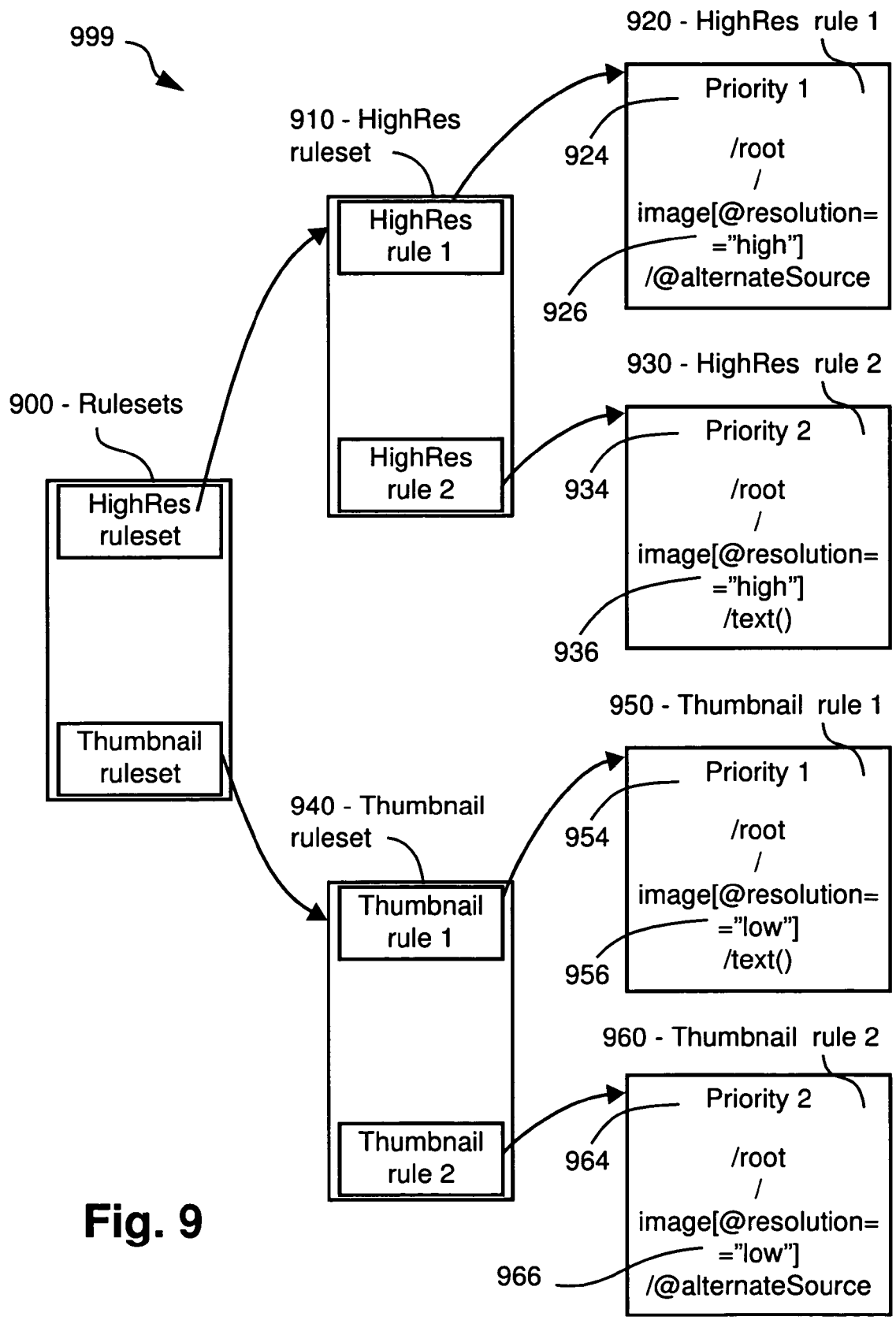
FIG. 9 is a schematic block diagram representation of a sample physical data structure, comprised of the logical elements depicted in FIG. 7, of rules used to extract data from a sample document given in Table 7.

Table 7 shows a portion from another XML document. FIG. 9 is a schematic block diagram representation 999 of a sample physical data structure, comprised of the logical elements depicted in FIG. 7, with reference to Table 7. Rulesets 900 are arranged to select two items of information; a high resolution image and a thumbnail image. A first ruleset 910 is directed to the high resolution image and a second ruleset 940 is directed to the thumbnail image.

An exploded view of the first ruleset 910 shows that the first ruleset 910 contains first and second rules, 920 and 930, respectively. An exploded view of the first rule 920 includes a priority 924 of 1, and an XPath location 926 "/root/image[@resolution="high"]/@alternateSource". An exploded view of the second rule 920 includes a priority 934 of 2 and an XPath location 936 "/root/image[@resolution="high"]/text( )". Thus, the high resolution image data is derived from embedded document data ("/root/image[@resolution="high"]/text( )") in preference to the alternate source given by the attribute ("/root/image[@resolution="high"]/@alternateSource"), as priority '2' of the second rule 930 is greater than priority '1' of the first rule 920.

The thumbnail ruleset 940 includes a first thumbnail rule 950 and a second thumbnail rule 960. The first thumbnail rule 950 includes a priority 954 of 1 and XPath 956 "/root/image[@resolution="low"]/text( )". The second thumbnail rule 960 includes a priority of 964 2 and XPath 966 "/root/image[@resolution="low"]/@alternateSource". Thus, the thumbnail image data is derived from the alternate source given by the attribute ("/root/image[@resolution="low"]/@alternateSource") in preference to the embedded document data ("/root/image[@resolution="low"]/text( )") [priority '2' is greater than '1'].

It will be apparent from the example, to a person skilled in the art of XPath and XML, that, strictly, one expression returns embedded text, whereas the other expression returns the value of an attribute which, in the example, is a filename or URI. As indicated above, the rule statement 724 can take many forms. To fulfil the image example of Table 7 and FIG. 9, the rule statement 724 requires an extension to the described embodiment to allow the content of a filename or URI to be returned. The extension enables the embodiment to interpret the expression 'alternateSource="xyzjpg"' as 'the content of the file "xyzjpg"', rather than the text of the filename itself. The extension, therefore, could take the form of a rule expressed syntactically as 'alternateSource<="xyzjpg"' where '<=' means 'take the contents of'.

Figure 10:
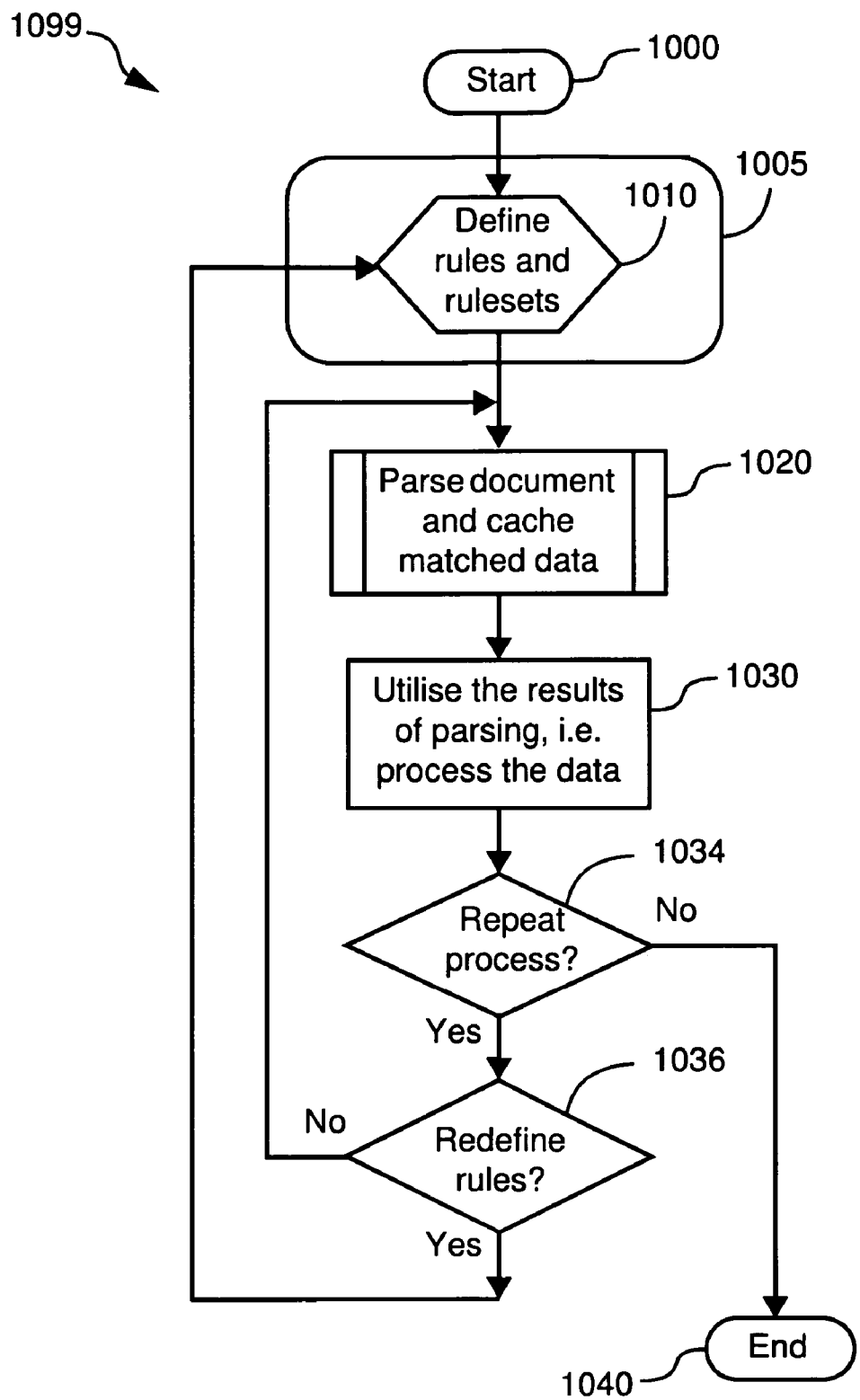
FIG. 10 is a flow diagram of processing performed by an application using a rule-based parser.

FIG. 10 is a flow diagram 1099 of the processing carried out by an application 500 using the rule based parser 510. The processing begins at step 1000. Control passes to step 1005, that represents optional processing performed by the application 500. In this example, the step 1005 includes an initialisation step 1010 that is performed before parsing commences. Step 1005 is optional and can be satisfied by preset tables. Such tables do not require initialisation for the processing of every input document. The rule initialisation can be done once and then many documents processed by the same set of rules. If the implementation includes 'best match' data in the same tables, then the "best match" data does require resetting for each input document, unless the application is configured to consider previous document results.

In this example, the initialisation step 1010 sets the rule structures 700, 710 and 720 as described in greater detail with respect to the examples of FIG. 8 and FIG. 9. The actual physical structures depend on data selection criteria required by the application 500. Having performed any required initialization, control flows to step 1020, in which the rule-based parser 510 is invoked to parse the document and cache data related to matched rules. Control passes to step 1030 in which results are returned and utilised.

In this embodiment, the application 500 has the choice to a) exit, b) repeat the process with another document or c) redefine the rules 504 and repeat the process on another document. Thus, from step 1030, control passes to a decision box 1034 that determines whether the process of steps 1005 to 1030 are to be repeated with another document.

If the process is to be repeated with another document, "Yes", control passes to decision step 1036, which determines whether the rules are to be redefined. If the current rules are to be utilised, the answer at step 1036 is "No", and control returns to step 1020 to parse the next document. If the rules are to be redefined at step 1036, "Yes", control passes from step 1036 to step 1005 for step 1010 to define new rules and rulesets. Control then passes to steps 1020 and 1030 in the manner described above to process the document with the new rules. At step 1034, if the process is not to be repeated for another document, "No", the process is then complete and terminates at step 1040.

It will be apparent to a person skilled in the art that the application 500 may perform many different operations upon returning from the rule-based parser processing, without departing from the spirit and scope of the invention.

Figure 11:
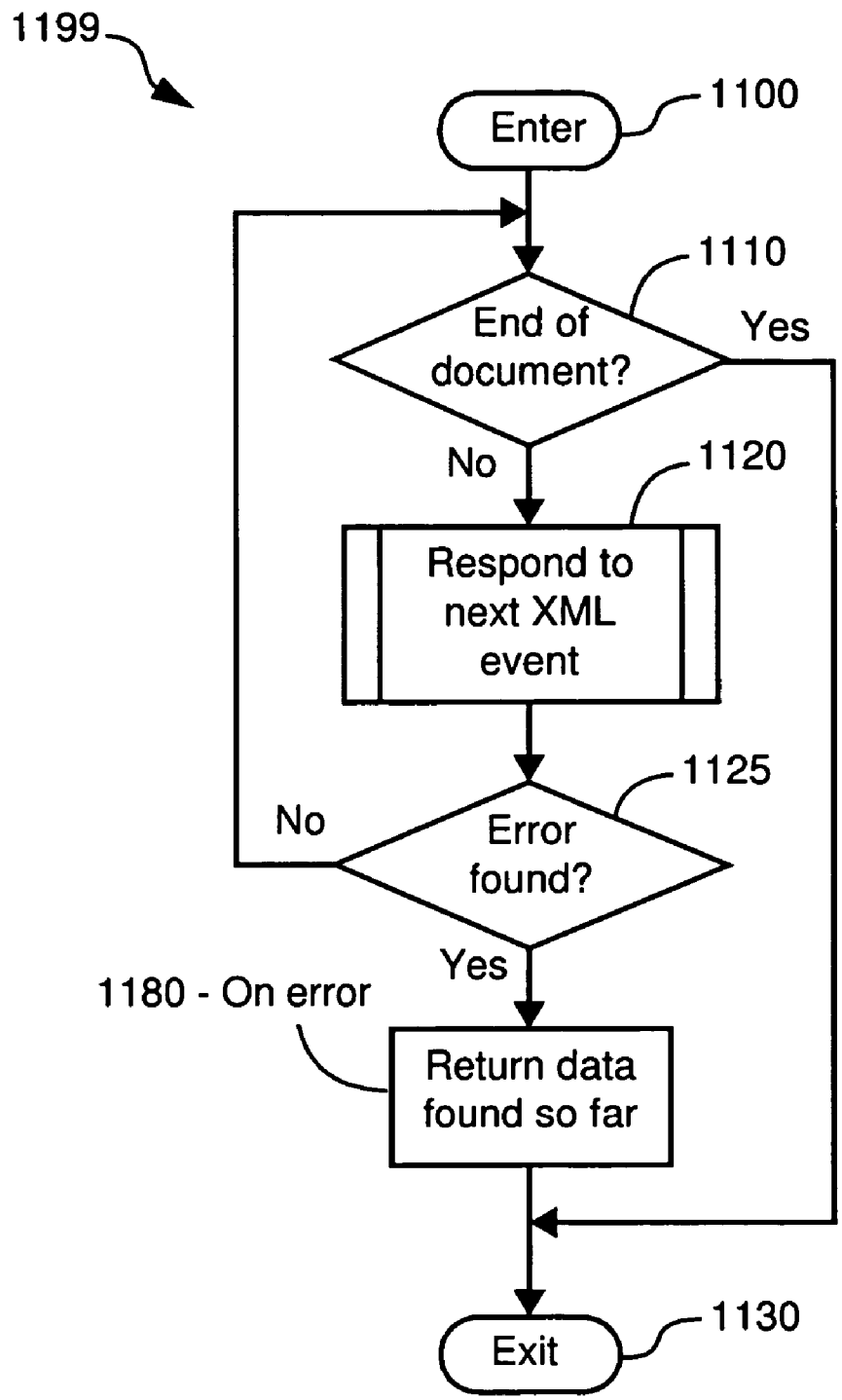
FIG. 11 is a flow diagram that provides further detail for the parsing and caching of data from step 1020 of FIG. 10, for an "inclusive" adaptation.

FIG. 11 is a flow diagram 1199 that provides details for the parsing and caching of data from step 1020 of FIG. 10, for the 'inclusive' adaptation of this method. This stage of the processing begins at step 1100. The initial process is a loop which, in the preferred embodiment, uses the SAX-like parser 600 to read a received document and raise the XML events 615. Control passes from the start step 1100 to a decision step 1110 that determines whether the end of the document has been reached. The end of the document is reached when the complete document 520 has been read or when all the highest priority data 524 required by the application 500 has been found. If the end of the document has been reached, "Yes", control passes from step 1110 to an exit step 1130. If the complete document has not been read or more highest priority data is still required, "No", control passes from step 1110 to step 1120, which responds to a next XML event.

In this example, if the document 520 is still being processed at step 1110, an XML event 615 is raised and that event is processed in step 1120. Processing passes from step 1120 to a decision step 1125 that determines whether an error has been found. If no error exists, "No", control returns to step 1110 at the start of the loop. If an error exists at step 1125, "Yes", control passes to step 1180 that returns the best data matches found so far. In a preferred embodiment, it is desirable for an indicator to also be returned, stating the data was extracted under error conditions. Control passes from step 1180 to exit step 1130.

The processing described preferably processes an entire document, but it will be clear to a person skilled in the art that it is possible to finish this stage of processing when all required highest priority data 524 has been extracted, rather than continuing to process through to the end of the document 520. Other end conditions may also be satisfied and governed by the application 500.

Figure 12:
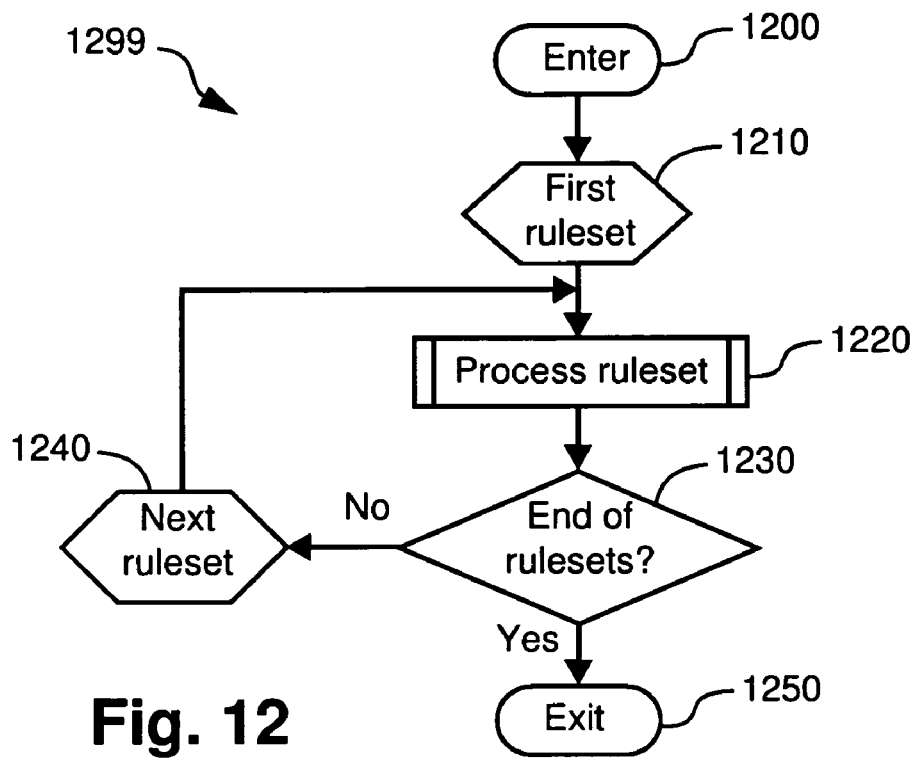
FIG. 12 is a flow diagram that provides further detail for step 1120 of FIG. 11 for the 'inclusive' adaptation, and for step 2520 of FIG. 25 for the 'exclusive' adaptation.

FIG. 12 is a flow diagram 1299 that provides details relating to step 1120 of FIG. 11. The purpose of this stage of the processing is to check whether an XML event 615 just raised matches any of the rulesets 700. Each individual ruleset 710 is checked against the XML event 615.

Processing commences at a start step 1200. A processing loop for each ruleset 710 is performed. From step 1200, control passes to step 1210, which initialises the loop to check a first ruleset. Control passes to step 1220, which processes the first ruleset. Data 524 and metadata 526 are collated during this step if any rules 720 are found to match. Control then flows to decision step 1230 to determine whether all rulesets have been processed. If "No", control passes to step 1240, which initialises the processing for a next ruleset. Control passes from step 1240 to step 1220 to complete the processing loop. If there are no more rulesets 710 to be checked at step 1230 and all rulesets have been processed, "Yes", control passes to an exit step 1250. The stage returns with the resultant data 524 and metadata 526 collated at step 1220.

Figure 13:
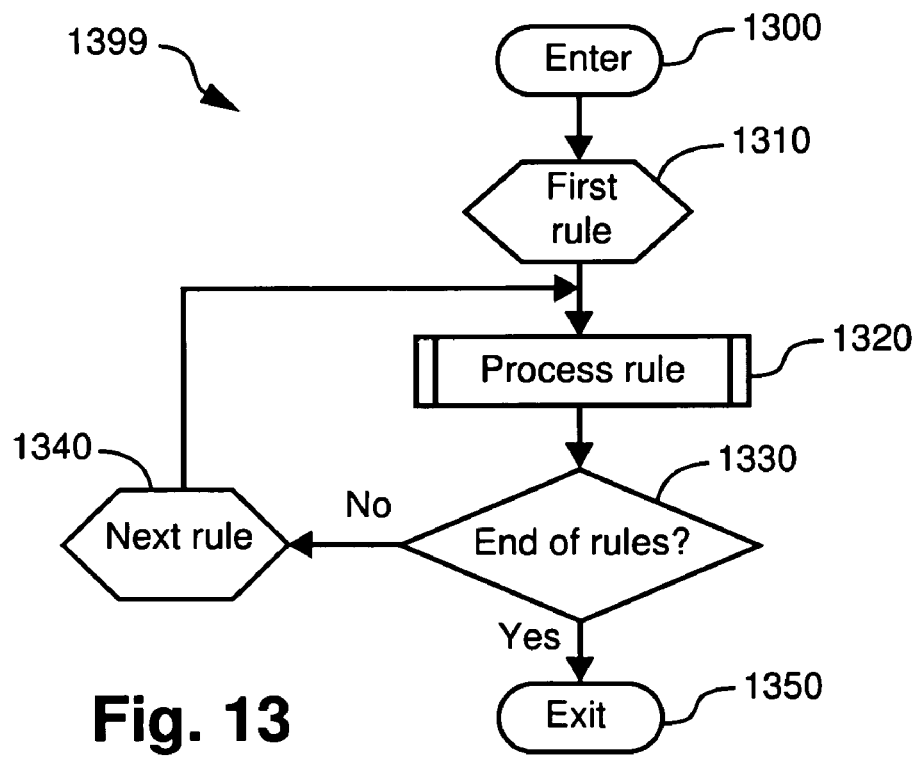
FIG. 13 is a flow diagram that provides further detail for the process ruleset step 1220 of FIG. 12, for the 'inclusive' adaptation.

FIG. 13 is a flow diagram 1399 that expands upon the process ruleset step 1220 of FIG. 12, for the 'inclusive' adaptation. The purpose of this processing stage is to check whether the XML event 615 just raised matches any of the rules 720 of a specific ruleset 710. Each individual rule 720 is checked.

This stage of the processing begins at step 1300. A loop for each rule 720 is performed. Control passes from the start step 1300 to an initialization step 1310, which initialises the loop to check a first rule. Control passes to step 1320 that processes the first rule. If any rules 720 are found to match the event 615, data 524 and metadata 526 are collated. Control passes to decision step 1330 to determine whether all rules have been checked. If "No" and there are any further rules 720 to be checked, then control passes to step 1340 to prepare for the next rule to be checked. From step 1340, control passes to step 1320 and the loop is completed. If all rules 720 have been checked at step 1330, "Yes", then the end of this stage has been reached and control passes to an exit step 1350. This stage returns with the resultant data 524 and metadata 526 collated at step 1320.

Figure 14:
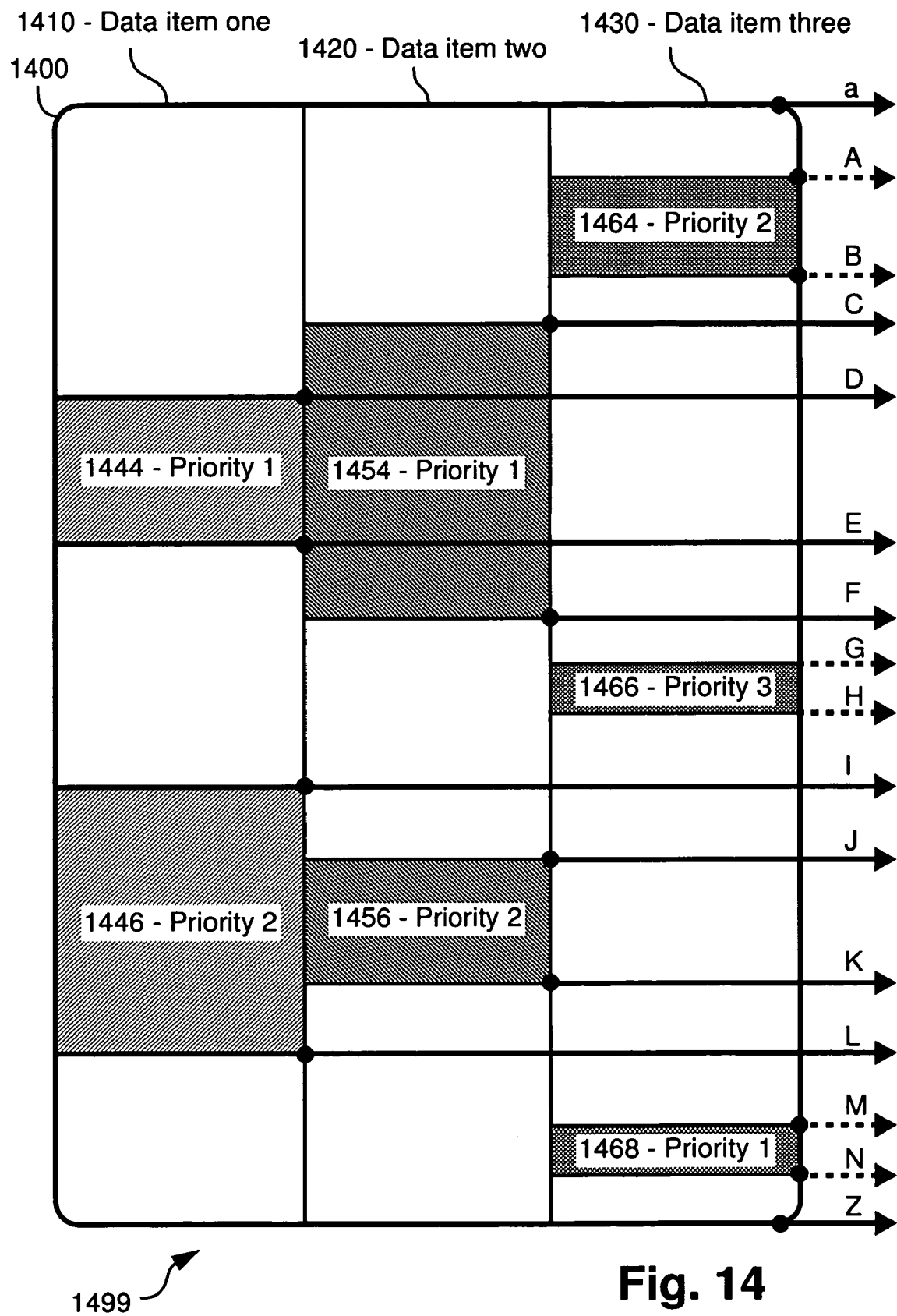
FIG. 14 shows a document layout for a document to be parsed and shows conceptual rulesets specifying rules for data to be extracted from the document.

Some of the caching aspects are now introduced before expanding on "process rule" step 1320 from FIG. 13. FIG. 14 shows a document layout 1499 for an example XML document 1400. The XML document 1400 is an instance of document 520 of FIG. 5. The document layout 1499 is divided into rows and three columns 1410, 1420, 1430. Each column 1410, 1420 and 1430 represents an item of data 524 to be extracted from the document. The start of the document begins at 1400-*a* at the top of the document and progresses toward the end of the document at 1400-*z*. 1400-*a*, 1464-A through to 1468-N, and 1400-*z* provide an ordered reference to locations within the layout 1499. Thus, location 1464-A occurs before location 1464-B.

Data item one 1410 exists in two locations in the document: 1444-D to 1444-E; and 1446-I to 1446-L. Data item two 1420 also exists in two locations: 1454-C to 1454-F; and 1456-J to 1456-K. Data item three 1430 exists in three locations: 1464-A to 1464-B; 1466-G to 1466-H; and 1468-M to 1468-N. One of the locations for data item three 1430 (1464-A to 1464-B) occurs first, as the document is read from top to bottom. This instance of data item three 1430 does not overlap with any other data items of interest.

One of the locations for data item two 1420 (1454-C to 1454-F) occurs next. The first location of data item one 1410 (1444-D to 1444-E) is fully enclosed within this first instance of data item two 1420. A second instance of data item three 1430 (1466-G to 1466-H) is then found. The second instance of data item three 1430 is satisfied by a rule of higher priority, 3, than the priority, 2, of the rule which is satisfied by the first instance 1464. The second instance of data item three 1430 does not overlap with other data items.

A second, and higher priority, data item one 1410 (1446-I to 1446-L) is then found. The second instance of data item one 1410 fully encloses a second, and higher priority, instance of data item two 1420 (1456-J to 1456-K). A final instance of data item three 1430 (1468-M to 1468-N) then occurs. The third instance of data item three 1430 is rejected as it is of priority 1 and thus lower priority than the other locations that contain information for data item three 1430.

A ruleset 710 to extract data item one 1410 provides at least two rules 720 indicating where required data 524 exists in the document. In the example document 1400, two rules 720 are satisfied; one for the data extending from 1444-D to 1444-E, and one for data extending from 1446-I to 1446-L. In this example, the ruleset 710 is defined such that the application 500 extracts data item one 1410 from 1446 in preference to 1444.

A ruleset 710 to extract data item two 1420 provides at least two rules 720 indicating where required data 524 exists in the document. In the example document 1400, two rules 720 are satisfied; one for the data extending from 1454-C to 1454-F, and one for data extending from 1456-J to 1456-K. The ruleset 710 is defined such that the application 500 extracts data item two 1420 from 1456 in preference to 1454.

A ruleset 710 to extract data item three 1430 provides at least three rules 720 indicating where required data 524 exists in the document. In the example document 1400, three rules 720 are satisfied; one for the data extending from 1464-A to 1464-B, one for data extending from 1466-G to 1466-H, and one from 1468-M to 1468-N. The ruleset 710 is defined such that the application 500 extracts data item three 1430 from 1466 in preference to 1464 or 1468, and from 1464 in preference to 1468.

It can be seen that the data items to be extracted overlap with each other to varying degrees. This example is not exhaustive and it is clear that other combinations of overlapping data may exist in other instances of a document 520.

In FIG. 14 the characters, a, z and A-N represent XML events 615. The processing in Table 8 takes the FIG. 14 example and describes responses to these events.

TABLE 8

| Event | Response |
|---|---|
| 1400-a | Do nothing. |
| 1464-A | Mark point at which to start caching data for data item three 1430. |
| 1464-B | Mark point at which to stop caching data for data item three 1430. The data 1464 is the currently cached data 524 for the ruleset 710 for data item three 1430. |
| 1454-C | Mark point at which to start caching data for data item two 1420. |
| 1444-D | Mark point at which to start caching data for data item one 1410 Note: One of the stated requirements is that during processing a minimal amount of memory is consumed to extract the required data. It is clear at this point that the data represented by 1444-D to 1444-E is already marked as being cached for data 1454. Although possible, it would be inappropriate to use further memory when caching for the data 1444. |
| 1444-E | Mark point at which to stop caching data for data item one 1410. The data 1444 is the currently cached data 524 for the ruleset 710 for data item one 1410. |
| 1454-F | Mark point at which to stop caching data for data item two 1420. The data 1454 is the current cached data 524 for the ruleset 710 for data item two 1420. |
| 1466-G | The rule satisfied at this point means that the data represented by 1466 will be used instead of the data previously cached between steps 1464-A and 1464-B because it has a higher priority. The cached data from steps 1464-A and 1464-B no longer needs to be marked for data item three 1430. Mark point at which to start caching data for data item three 1430. |
| 1466-H | Mark point at which to stop caching data for data item three 1430. The data 1466 is the currently cached data 524 for the ruleset 710 for data item three 1430. |

TABLE 8-continued

| Event | Response |
|---|---|
| 1446-I | The rule satisfied at this point means that the data represented by 1446 will be used instead of the data previously cached between steps 1444-D and 1444-E.<br>The cached data from steps 1444-D and 1444-E no longer needs to be marked for data item one 1410.<br>Note: This means it is no longer recorded that data item one 1410 will be derived from 1444-D to 1444-E. The cached memory cannot be discarded because it is required in the caching of 1454 for data item two 1420.<br>Mark point at which to start caching data for data item one 1410. |
| 1456-J | The rule satisfied at this point means that the data represented by 1456 will be used instead of the data previously cached between steps 1454-C and 1454-F.<br>The cached data from steps 1454-C to 1454-F no longer needs to be marked for data item two 1420.<br>Note: At this point any memory that was used for caching of 1454 for data item two 1420 (and previously 1444 for data item one 1410) can be discarded.<br>Mark this point to start caching data for data item two 1420. |
| 1456-K | Mark this point to stop caching data for data item two 1420.<br>The data 1456 is the currently cached data 524 for the ruleset 710 for data item two 1420. |
| 1446-L | Mark this point to stop caching data for data item one 1410.<br>The data 1446 is the currently cached data 524 for the ruleset 710 for data item one 1410. |
| 1468-M | The rule satisfied at this point means that the data represented by 1468 will be skipped because it has a lower priority then the previously found data. |
| 1468-N | Skipped - see 1468-M. |
| 1400-z | The cached data (1446, 1456 and 1466) and metadata (1446-I, 1446-L, 1456-J, 1456-K, 1466-G and 1466-H) are returned to the application 500. |

It is clear from the description in Table 8 that each XML event 615 can result in a statement regarding the caching of data. Such statements include, for example, "start caching xyz" and "stop caching xyz".

Figure 6:
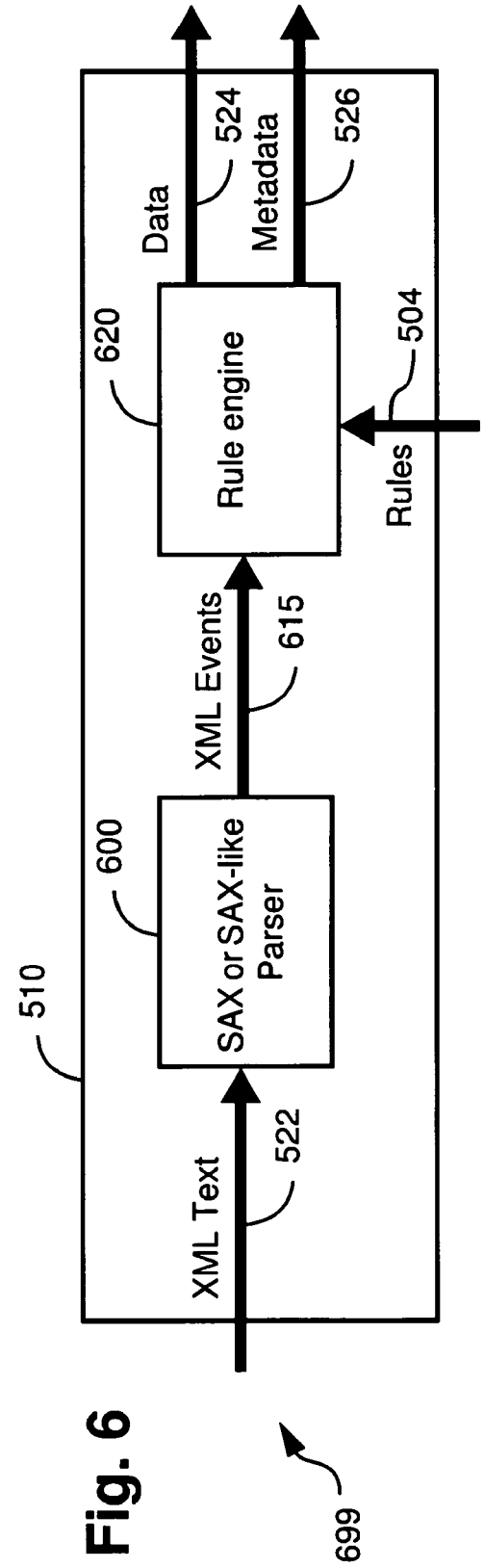
FIG. 6 is a schematic block diagram representation of data flow within a rule-based parser.
Figure 15:
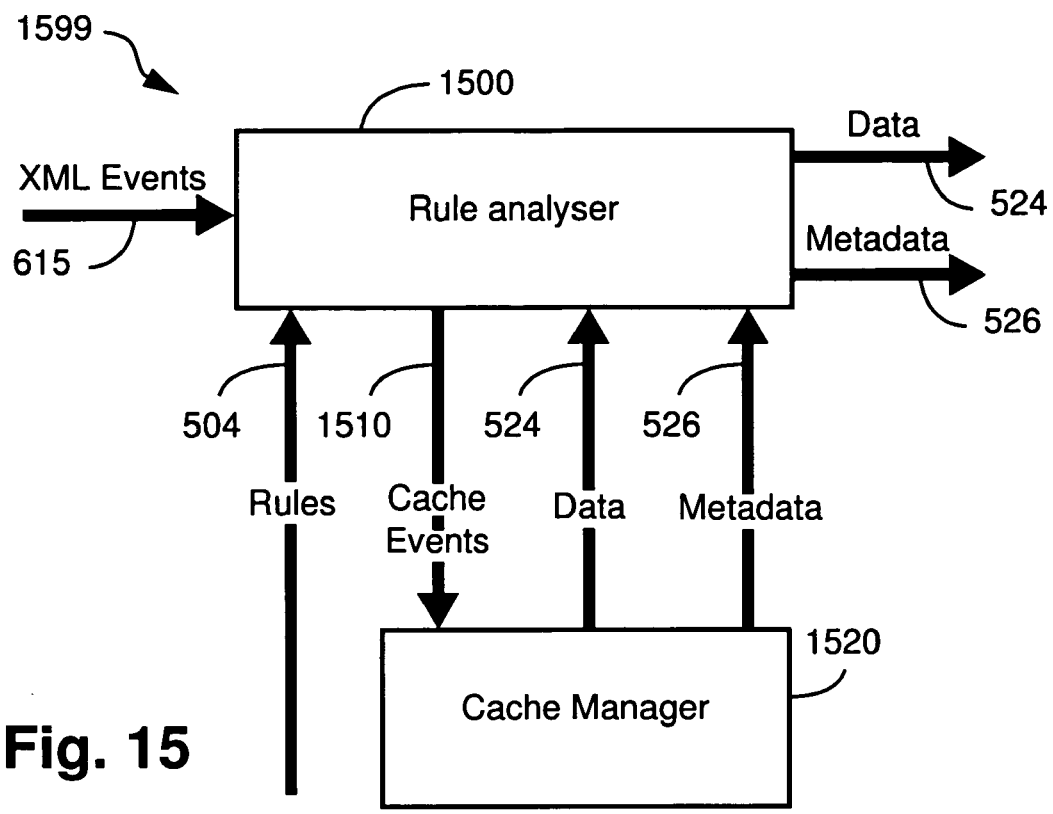
FIG. 15 is a schematic block diagram representation of data flow within the rule engine 620 of FIG. 6.

FIG. 15 is a schematic block diagram representation 1599 of data flow within the rule engine 620 of FIG. 6. The data flow is a result of the processing step 1120 "respond to next XML event" of FIG. 11. A rule analyser 1500 receives XML events 615 and rules 504. The rule analyser 1500 analyses the XML events 615 and transforms the XML events 615 into cache events 1510 that are presented to a cache manager 1520. The cache manager 1520 caches data 524, and tracks rulesets 710 and rule priorities 722 when the rule analyser 1500 raises the cache events 1510.

Once the XML events 615 have all been analysed and processed by the cache manager 1520, the cache manager 1520 presents data 524 and metadata 526 to the rule analyser 1500. The rule analyser 1500 outputs the data 524 and metadata 526 to the application 500. The actions of the cache manager 1520 are driven by the cache events 1510 raised by the rule analyser 1500.

Figure 16A:
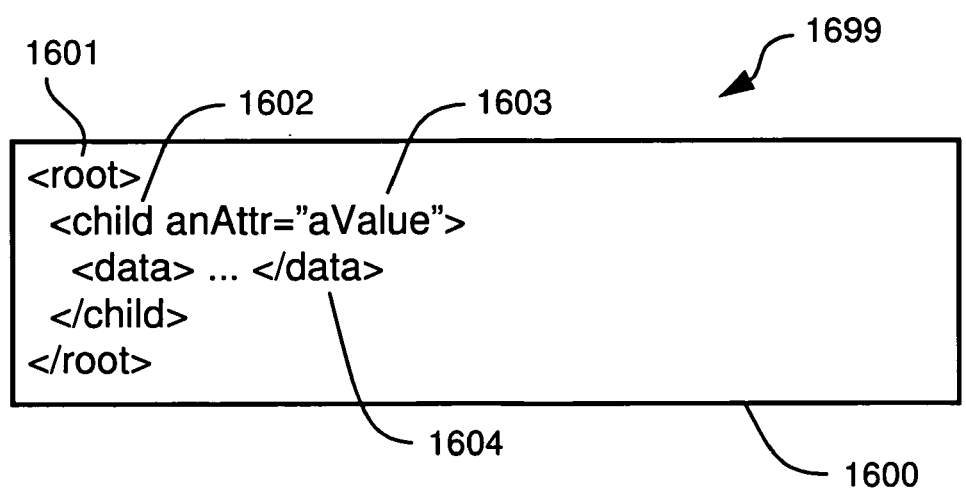
FIG. 16A is a sample XML document used to describe how XML events are transformed into cache events during a translation declared in FIG. 15.
Figure 16B:
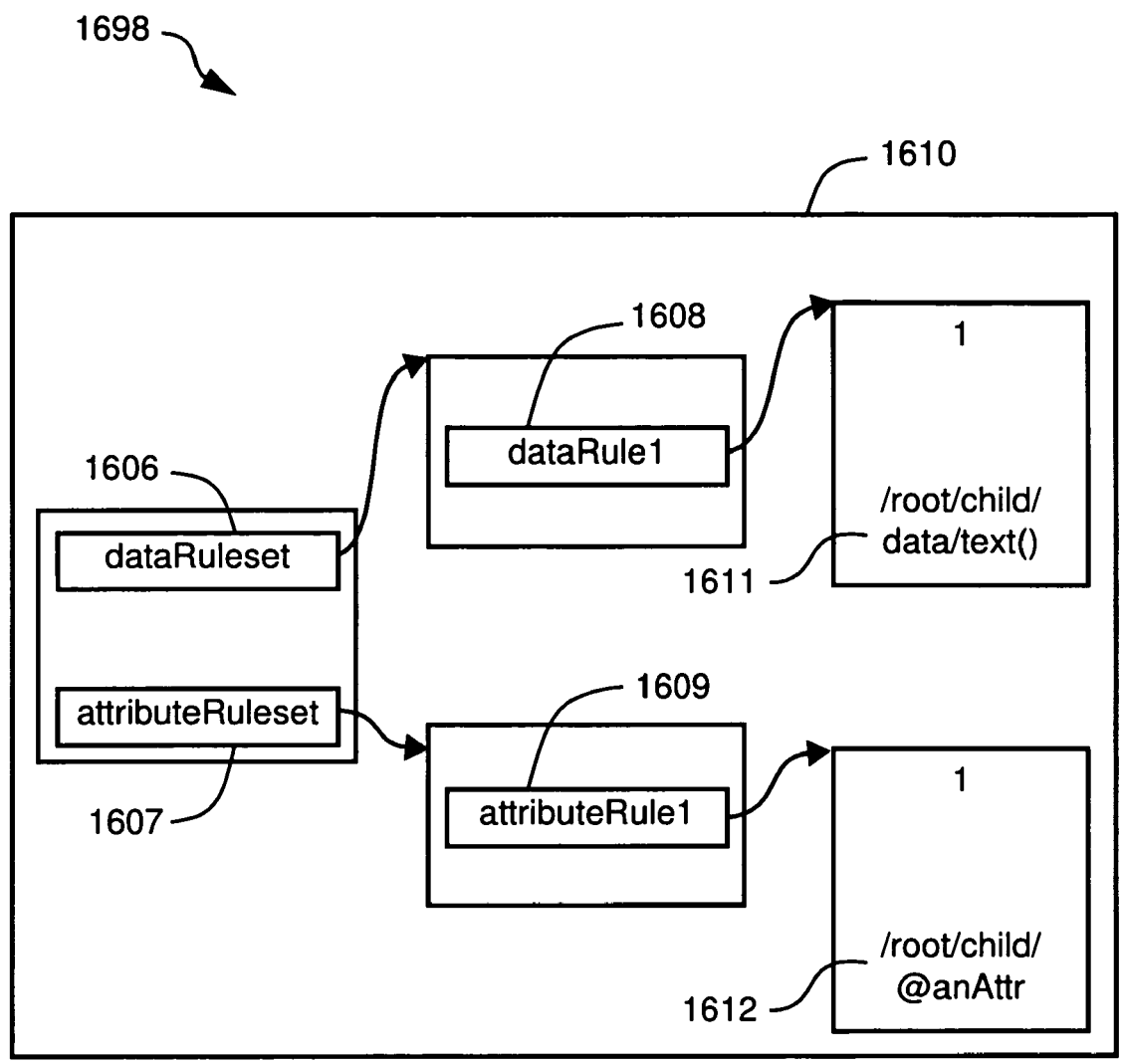
FIG. 16B is a schematic block diagram representation of structures of the rulesets depicted in FIG. 7, describing the translation declared in FIG. 15.
Figure 16C:
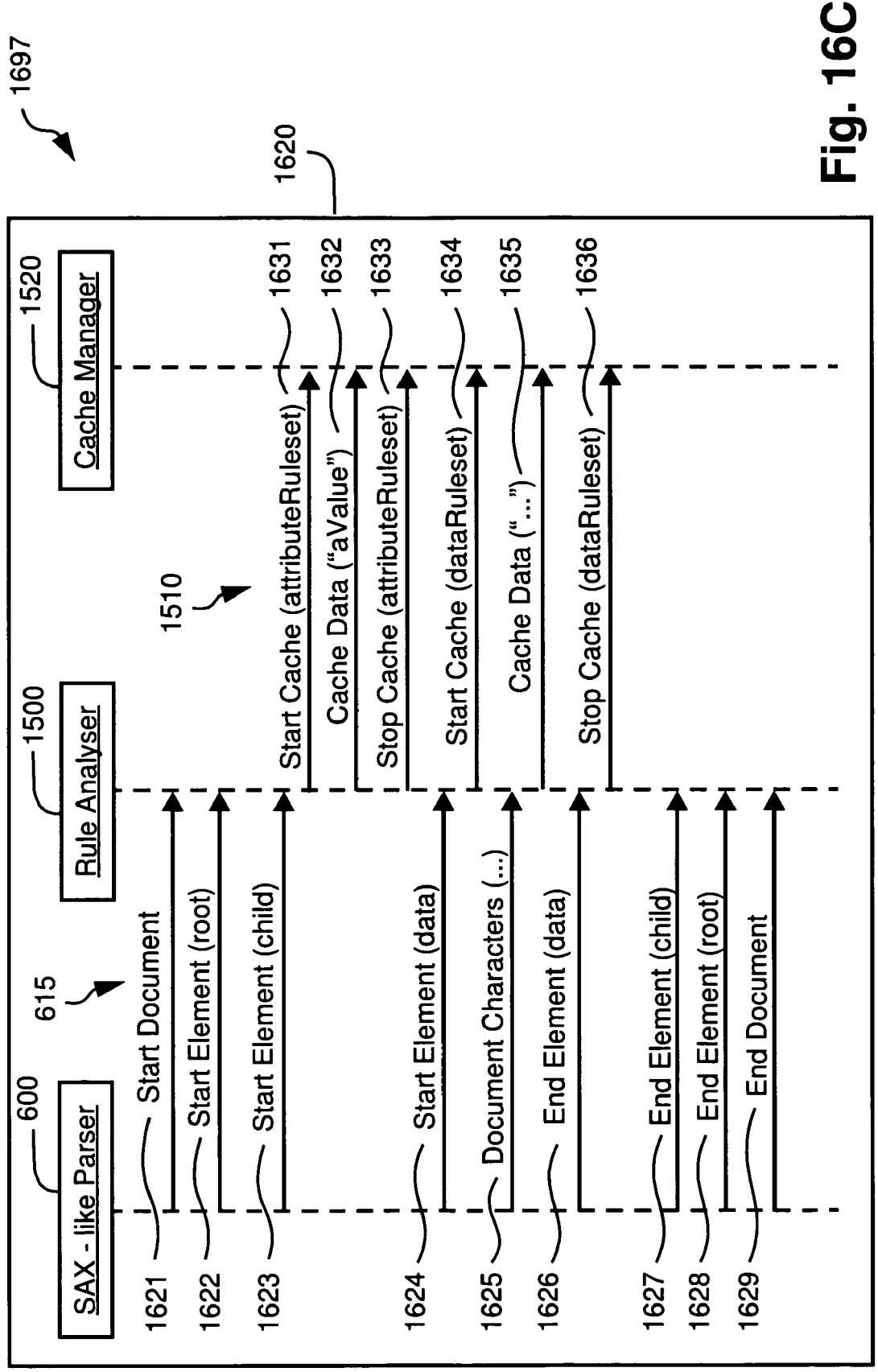
FIG. 16C is a sequence diagram of a rule analyser translating XML events into cache events.

FIG. 16A is a schematic block diagram representation 1699 of a sample XML document 1600 used to describe how XML events 615 are transformed into cache events 1510 in an embodiment of this invention. FIG. 16B is a schematic block diagram representation 1698 of structures 1610 of the actual rulesets depicted in FIG. 7, for the purposes of this example. FIG. 16C is a schematic representation 1697 of sequence diagram 1620 depicting how the rule analyser 1500 transforms XML events 615 into cache events 1510.

Referring first to FIG. 16A, the example document 1600 is to be parsed by the rule based parser 510. The example document includes a root element 1601, and a child element 1602 having an attribute 1603 and a data element 1604.

FIG. 16B shows rules 1610 provided by the application 500 to extract up to two items of data 524. The rules 1610 include a dataRuleset 1606 and an attributeRuleset 1607. The dataRuleset 1606 includes a dataRule 1 1608, which has a priority of "1" and a first rule statement 1611. The first rule statement 1611 is the text from the XPath location "root/child/data". The attributeRuleset 1607 includes an attributeRule 1 1609, which has a priority of "1" and a second rule statement 1612. The second rule statement 1612 is the value of the attribute given by the XPath expression "/root/child/@anAttr".

The sequence diagram 1620 of FIG. 16C shows the XML events 615 generated by the SAX-like parser 600 and supplied to the rule analyser 1500. The rule analyser 1500 transforms the XML events 615 into cache events 1510, which are supplied to the cache manager 1520, as described above with respect to FIG. 15. This transformation is set forth here as an example and is described in detail with reference to FIG. 18.

The sequence diagram 1620 includes the SAX-like parser 600, the rule analyser 1500 and the cache manager 1520 arranged in a row, with a time axis running from the top of the sequence diagram to the bottom. The parser 600 sends a first event "Start Document" 1621 to the rule analyser 1500. No action is taken for this XML event 1621. The parser 600 sends a second event "Start Element (root)" 1622 to the rule analyser 1500. No action is taken for this XML event 1622, as no rules are matched.

The parser 600 sends a third event "Start Element (child)" 1623 to the rule analyser 1500, which results in the rule analyser 1500 sending the (/root/child/@anAttr) attribute value 1603 to the cache manager 1520 as cache events 1510. The cache events 1510 include 'Start Cache (attributeRuleset)' 1631, 'Cache Data ("a Value")' 1632, and 'Stop Cache (attributeRuleset)' 1633.

The next XML event from the parser 600 to the rule analyser 1500 is 'Start Element (data)' 1624, which results in the rule analyser 1500 sending a cache event 1510 to the cache manager 1520 in the form 'Start Cache (dataRuleset)' 1634, as the current path matches the rule "/root/child/data/text( )" 1611. The next XML event from the parser 600 to the rule analyser 1500 is 'Document Characters ( . . . )' 1625, which continues to match the rule "/root/child/data/text( )" 1611. The event 1625 results in the rule analyser 1500 sending a cache event 1510 to the cache manager 1520 in the form 'Cache Data' 1635.

The next XML event from the parser 600 to the rule analyser 1500 is 'End Element (data)' 1626, which indicates that the cache manager 1520 no longer needs cache data for the rule "/root/child/data/text( )" 1611. Accordingly, the rule analyser 1500 sends a cache event 1510 'Stop Cache (dataRuleset)' 1636 to the cache manager 1520.

The final events from the parser 600 to the rule analyser 1500, in order, are 'End Element (child)' 1627, 'End Element (root)' 1628, and 'End Document' 1629. No action is taken by the rule analyser 1500 in respect of these events.

Figure 17:
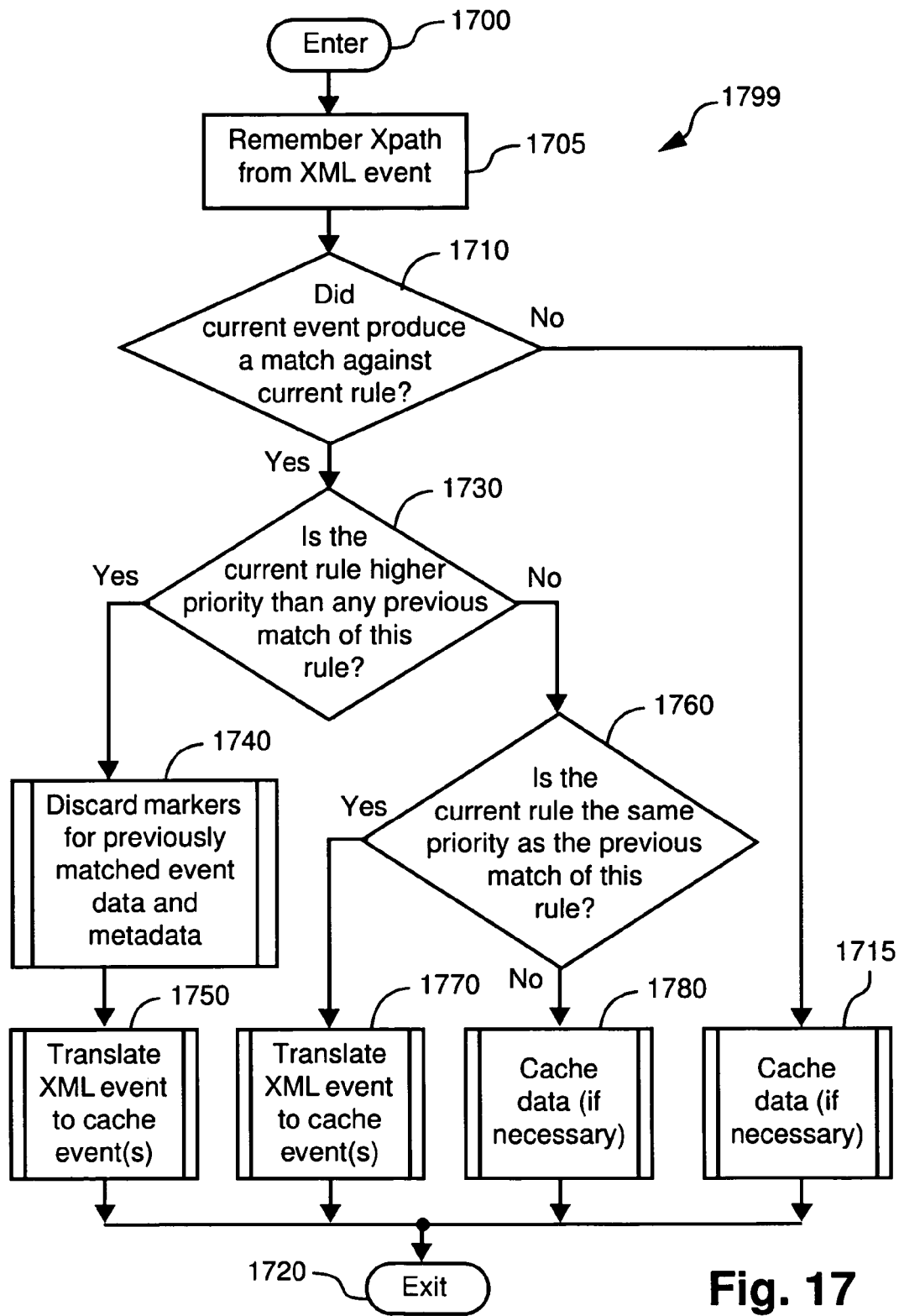
FIG. 17 is a flow diagram that provides further detail for step 1320 from FIG. 13, for the 'inclusive' adaptation.

FIG. 17 is a flow diagram 1799 that expands upon step 1320 "process rule" from FIG. 13, for the 'inclusive' adaptation. The purpose of this processing stage is to check if the XML event 615 just raised matches a specific rule 720. If the event does match a specific rule 720, then data 524 and metadata 526 are cached, if the specific rule 720 was assigned a higher priority 722 by the application 500 than any previously matched rule 720 for the ruleset 710 under consideration.

The processing of step 1320 commences at a start step 1700. Control flows to step 1705, which recalls the current XPath location being processed in the document 520. XML events 615 such as 'Start Element' add to the current XPath location. XML events 615 such as 'End Element' reduce the current XPath location.

TABLE 9

| XML event | XML text | Example XPath location(s) to be checked against rules |
|---|---|---|
| Start document | — | — |
| Start element | <root> | /root |
| Start element | <child anAttr="aValue"> | /root/child |
| | | /root/child[1] |
| | | /root/child[@anAttr] |
| | | /root/child[@anAttr="aValue"] |
| | | /root/child/@anAttr |
| Start element | <data> | /root/child/data |
| | | /root/child/data/text( ) |
| Character data | . . . | /root/child/data/text( ) |
| End element | </data> | /root/child/data |
| End element | </child> | /root/child |
| | | /root/child[1] |
| End element | </root> | /root |
| End document | — | — |

Table 9 shows the XML events 615 for the sample document 1600 of FIG. 16A. In addition, Table 9 shows the XML text that created each respective event, and, optionally, some of the XPath expressions that would, as rule statements 724, be matched by the corresponding event.

Control passes from step 1705 to step 1710 to determine whether the current event 615 produces a match against a current, specific rule 720. As can be seen from Table 9, more than one rule may be satisfied as a result of the XML event 615. It is also clear that a 'Start Element' event may require attribute paths to be checked, if attributes are contained in the element.

TABLE 10

| XML Event (615) | Matching rules |
|---|---|
| Start document | None |
| Start element | An element path |
| | An element path and text( ) function |
| | An attribute path |
| Character data | An element path |
| | An element path and text( ) function |
| End element | An element path |
| End document | None |
| Processing instruction | None |
| XML declaration | None |

Table 10 shows how XML events 615 are deemed to match against rules, in accordance with the described embodiment.

If there is no match at step 1710, "No", then it may still be possible that data is being cached. For example, child elements of some parent which previously matched a rule may be in the process of being cached. For the example document 1600, the rule statement 724 '/root/child' would also be deemed to be matched by the location '/root/child/data' as 'data' is contained within '/root/child'. Control flows from step 1710 to step 1715, and a request is sent to the cache manager 1520 to cache any data. This stage of processing is complete and control passes to an exit step 1720. Any data 524 and metadata 526 found during previous processing of this specific ruleset 710 remain as the returned data 524 and metadata 526 from this stage of processing.

Returning to step 1710, if a match was found, "Yes", then control passes to decision step 1730 to determine whether the current rule 720 is of higher priority 722 than any previously matched rule 720 for the current ruleset 710. This check is made against the 'best rule' 715 currently recorded for the ruleset 710. If the current rule 720 is of higher priority 722, "Yes", control passes to step 1740, which discards markers for any previously cached data 524 and metadata 526. Control then passes to step 1750, which translates the matching XML event to cache events to cache the data 524 and metadata 526 for the current rule 720. After the caching step 1750, this stage of processing is complete and control passes to the exit step 1720.

Returning to step 1730, if the current rule 720 is not of higher priority 722, "No", control passes to decision step 1760. Decision step 1760 determines whether the current rule 720 has the same priority 722 as any previously matched rule 720 for the current ruleset 710. If the current rule 720 has the same priority, "Yes", control passes to step 1770, which translates the matching XML event to cache the data 524 and metadata 526. If the current rule and the previously matched rule of the same priority remain as the final matches for the ruleset 710, an array of data 524 and metadata 526 are returned to the application 500, as more than one match exists at the same priority. After the caching step 1770, this stage of processing is complete and control passes to the exit step 1720.

If the current rule 720 at decision step 1760 has a lower priority 722 than any previously matched rule 720 for the current ruleset 710, "No", then data may still be required for previously matched rules. Control passes from step 1760 to step 1780, which requests the cache manager 1520 to cache any required data. This stage of processing is then complete and control passes to exit step 1720.

Figure 18:
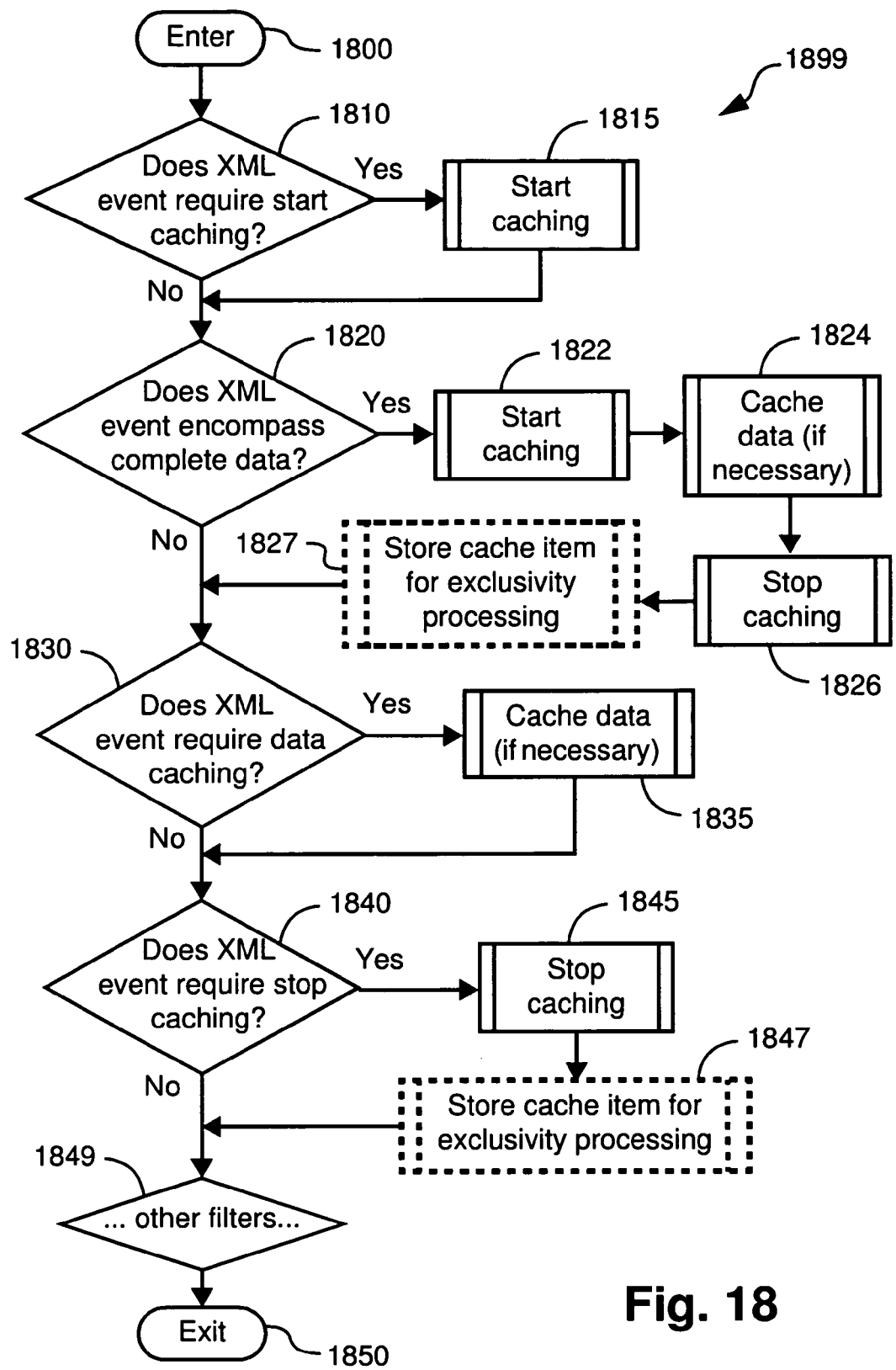
FIG. 18 is a flow diagram that provides further detail for steps 1750 and 1770 of FIG. 17.

FIG. 18 is a flow diagram 1899 providing more detail about the "translate XML event to cache event(s)" steps 1750 and 1770 of FIG. 17. Steps 1750 and 1770 act as a filter for XML events 615 by translating the XML events into one or more cache events 1510. The general translation is provided in Table 10, above. Step 1810 checks the 'Start Element' XML event; step 1820 checks the 'Start Element' XML event where there are attributes in the start element; step 1830 checks 'Start Element', 'Character Data' and 'End Element' events, and step 1840 checks the 'End Element' event.

Processing begins at step 1800, and passes to decision step 1810. Decision step 1810 checks whether the XML event 615 requires the cache manager 1520 to start caching. In the preferred embodiment, this relates to an XML 'Start Element' event for an element whose path, as remembered in step 1705, is the same as that of the XPath expression in the rule statement 724. If the XML event 615 does require the cache manager 1520 to start caching, "Yes", control passes to step 1815, which requests the cache manager 1520 to start caching. Control then passes to step 1820. If the cache manager is not required at step 1810, control passes directly to step 1820.

Step 1820 checks whether the XML event requires a complete cache of data. One example of this is an XML 'Start Element' event, where the element contains attributes and one or more of those attributes are the match for the XPath expression in the rule statement 724. In a preferred embodiment, the SAX or SAX-like parsers allow the attributes to be easily selected. If the XML event does not encompass complete data, "No", control passes directly to step 1830. If the XML event does require a complete cache of data, "Yes", then control passes to step 1822, which requests the cache manager 1520 to start caching. Control passes from step 1822 to step 1824, which caches data, if necessary. Control passes from step 1824 to step 1826, which requests the cache manager 1520 to stop caching. Control passes from step 1826 to decision step 1830. In an "exclusive" adaptation, to be described later, a further step 1827, shown in dotted outline, exists between step 1826 and step 1830 to store cache items for exclusivity processing. This will be described later. In the "inclusive" adaptation, control flows directly from step 1826 to step 1830.

Decision step 1830 checks whether the XML event requires data to be cached. In the preferred embodiment, this will be mostly true. The XML 'document processing instruction' event and XML 'XML decl' events do not need caching in the preferred embodiment; there is no XPath expression that matches the data contained in these events. All other XML events 615 require data to be cached. If the XML event requires caching at step 1830, "Yes", control passes to step 1835 for the cache manager 1520 to cache data, if necessary. Control then passes to decision step 1840. If no data is required to be cached at step 1830, "No", control passes directly to step 1840.

Decision step 1840 determines whether the XML event requires the cache manager 1520 to stop caching. In the preferred embodiment, this relates to an XML 'End Element' event for an element whose path is the same as that of the XPath expression in the rule statement 724. If the XML event does require the cache manager 1520 to stop caching, "Yes", control passes to step 1845, in which a request is sent to the cache manager 1520 to stop caching. Control then passes to step 1849. In the "exclusive" adaptation, a further step 1847, shown in dotted outline, exists between step 1845 and step 1849 to store a cache item for exclusivity processing.

If the XML event does not require the cache manager 1520 to stop caching at step 1840, "No", control passes directly to step 1849. Step 1849 is a step to check other filter rules that may exist in a particular embodiment. Such further filter rules may include, for example, certain character data encoded in base 64 format that require decoding and caching in binary format. One possible implementation utilises this filter step 1849 to check additional indicators in the rules 720 that specify additional actions to be performed while caching. When all filters have been processed, control passes to an exit step 1850.

Figure 19:
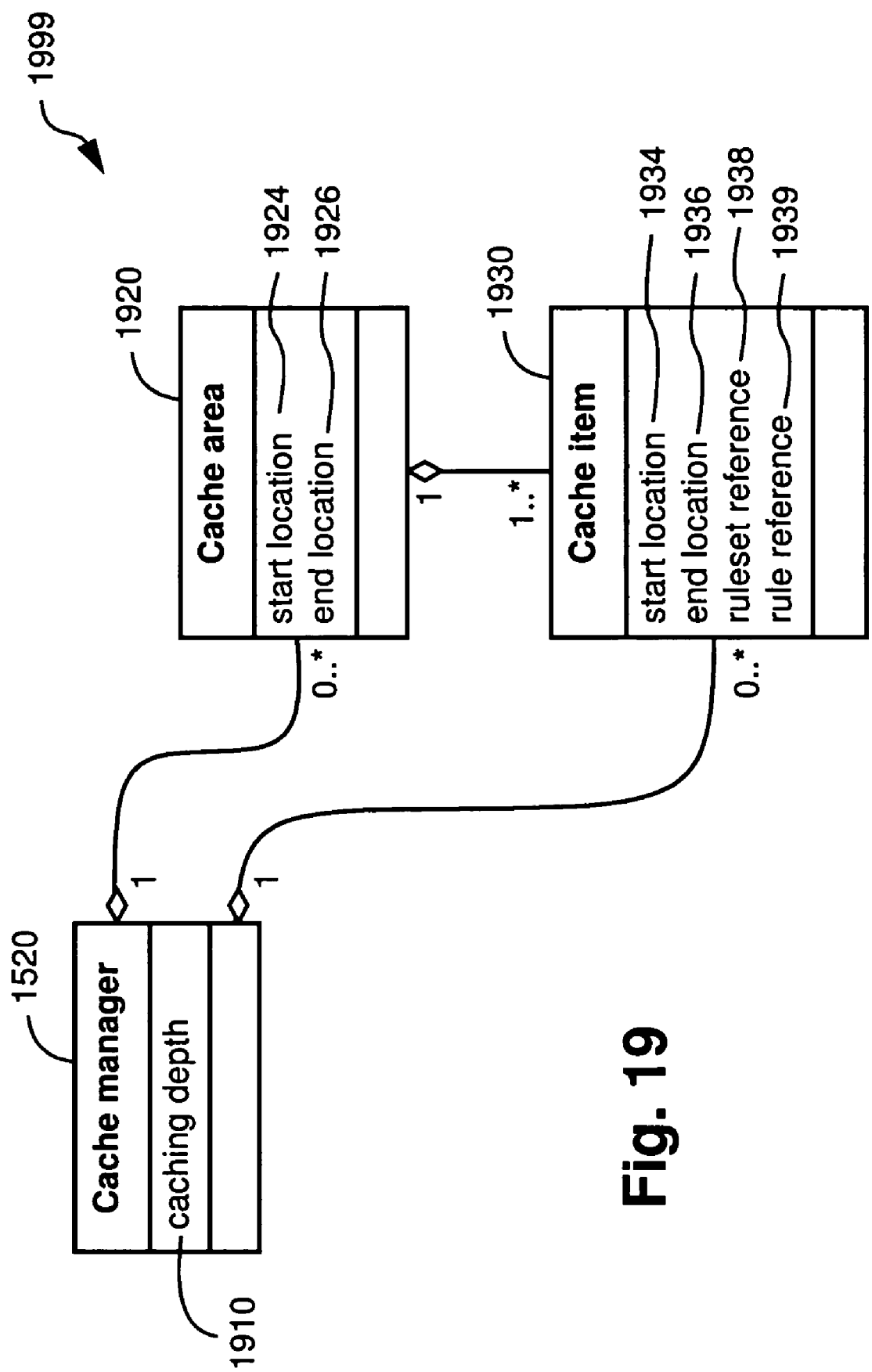
FIG. 19 is a schematic block diagram representation of data structures used in an object oriented class implementation of the cache manager 1520 of FIG. 15.

FIG. 19 is a schematic block diagram representation 1999 of data structures used in an object oriented class implementation of the cache manager 1520 of FIG. 15, shown using the Unified Modelling Language (UML). In this specific embodiment, an instance of class Cache manager 1520 is used by the rule analyser 1500 to: (i) mark areas as requiring caching; (ii) request data to be cached; or (iii) mark areas as no longer requiring caching. The instance of class Cache manager 1520 contains a caching depth 1910, which tracks the number of items of data that have been requested to be cached at any one time. The caching depth 1910 is used when performing the 'cache data (if necessary)' steps 1780 and 1715 from FIG. 17, and steps 1824 and 1835 from FIG. 18. A caching depth 1910 greater than one indicates that caching is necessary.

An aggregation relationship is shown between the instance of class Cache manager 1520 and an instance of a class Cache area 1920. The aggregation relationship indicates that each instance of class Cache manager 1520 references zero or more instances of class Cache area 1920. An instance of class Cache area 1920 is created when the instance of class Cache manager 1520 is requested to mark data as requiring caching and the caching depth 1910 prior to the request is zero. The instance of class Cache area 1920 marks a contiguous location of the document text 522 and manages an area of memory where items of data will be stored. The instance of class Cache area 1920 has a start location 1924 and an end location 1926. In the preferred embodiment, the start location 1924 and end location 1926 are relative to the start of the XML text 522.

FIG. 19 also shows an instance of class Cache item 1930. An aggregation relationship between the instance of class Cache manager 1520 and the instance of class Cache item 1930 indicates that each instance of class Cache manager 1520 references zero or more instances of class Cache item 1930. Further, an aggregation relationship exists between the instance of class Cache area 1920 and the instance of class Cache item 1930 to indicate that each instance of class Cache area 1920 references one or more instances of class Cache item 1930. An instance of class Cache item 1930 is created when the cache manager 1520 is requested to mark data as requiring caching. The instance of class Cache item 1930 marks a contiguous location of the document text 522 for the data item being cached. An instance of class Cache item 1930 has a start location 1934 and an end location 1936. The start location 1934 and end location 1936 are on or within the start location 1924 and end location 1926 of an instance of class Cache area 1920 associated with the instance of the class Cache item 1930. As shown by the aggregation relationship, each instance of class Cache item is always associated with at least one instance of class Cache area. An instance of class Cache area 1920, however, may manage data for one or more instances of class Cache item, in which case each instance of class cache item represents data that overlaps with at least one other instance of class Cache item.

When the instance of class Cache item 1930 is created, the instance of class Cache item 1930 contains a ruleset reference 1938 to the ruleset 710 and a rule reference 1939 to the rule 720 that were being processed. When instances of the class Cache item 1930 are removed, in the event the final instance of class Cache item 1930 is removed from an instance of class Cache area 1920, the instance of class Cache area 1920 is deleted.

The cache manager 1520, cache areas 1920 and cache items 1930 record document locations. There is a correspondence between data to be cached (and therefore referenced by the cache areas 1920 and cache items 1930) and the cache areas 1920 and cache items 1930. Calls made on the cache manager 1520 are now described with reference to FIGS. 20 to 24. The correspondence between these calls and underlying memory management routines is described after the description of FIG. 24.

Figure 20:
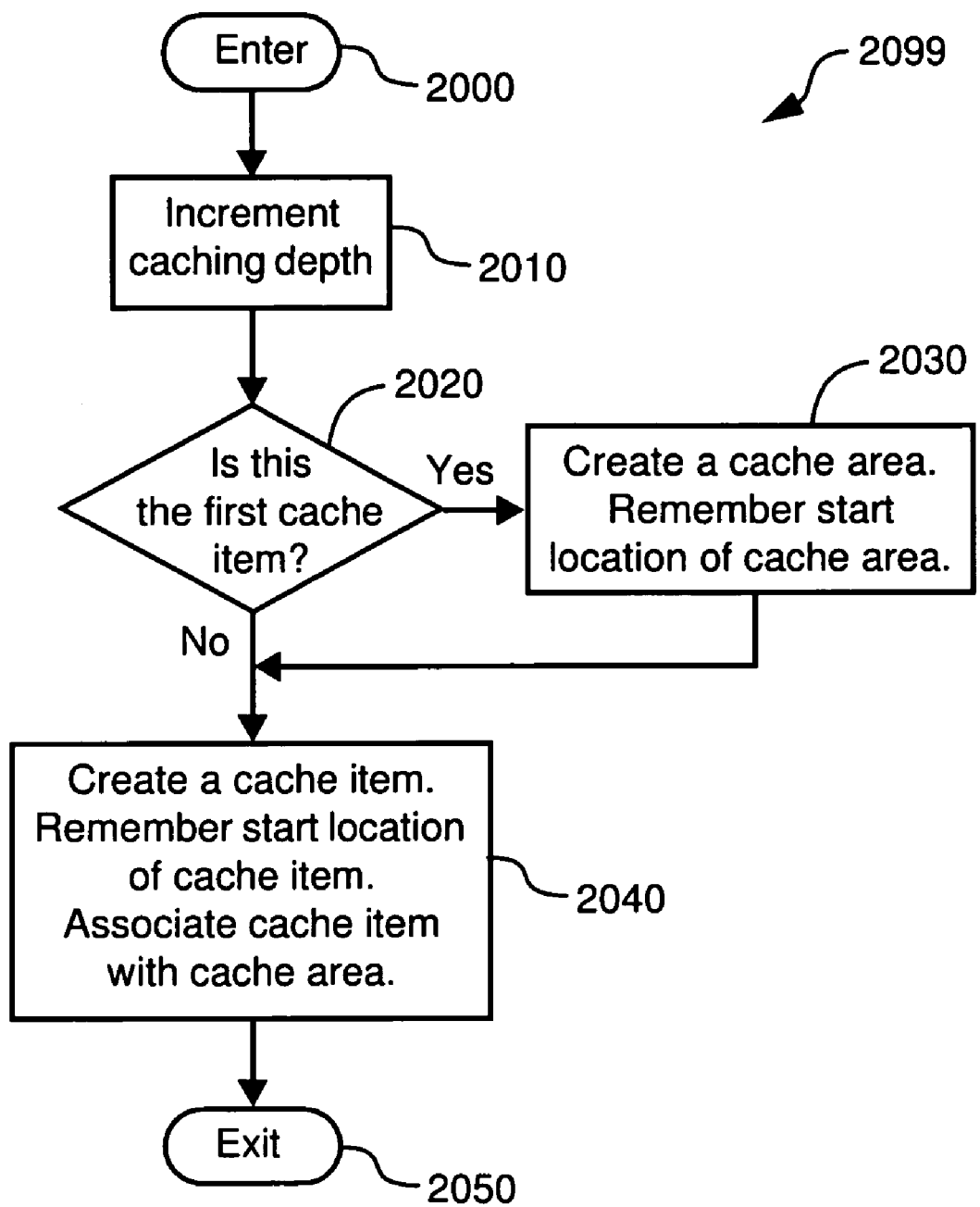
FIG. 20 is a flow diagram that provides further detail for steps 1815 and 1822 from FIG. 18.

FIG. 20 is a flow diagram 2099 that provides further detail for the "start caching" steps 1815 and 1822 from FIG. 18. This stage of processing begins at step 2000. Control passes to step 2010, which increments the caching depth 1910. A caching depth 1910 greater than one indicates the cache manager 1520 is handling overlapping items. If step 2010 increments the caching depth 1910 from zero to one, then this is the first time a cache item 1930 is being cached in this cache area 1920.

Control passes from step 2010 to decision step 2020, which checks whether an item being processed is the first cache item for the cache area 1920. If "Yes", control passes to step 2030, which creates an actual cache area 1920 object for the data. A start location 1924 of the cache area 1920 is recorded. In a preferred embodiment, the start area is an offset from the start of the XML text 522. Processing proceeds to step 2040.

If at step 2020 it is determined that the item being processed is not the first cache item, then a cache area 1920 already exists. Control passes to step 2040.

Step 2040 creates an actual cache item 1930 object and records a start location 1934 of the cache item. The cache item 1930 is associated with the cache area 1920.

When the appropriate cache item 1930 object and, if necessary, cache area 1920 object have been created this stage of processing is complete and control passes to an exit step 2050.

Figure 21:
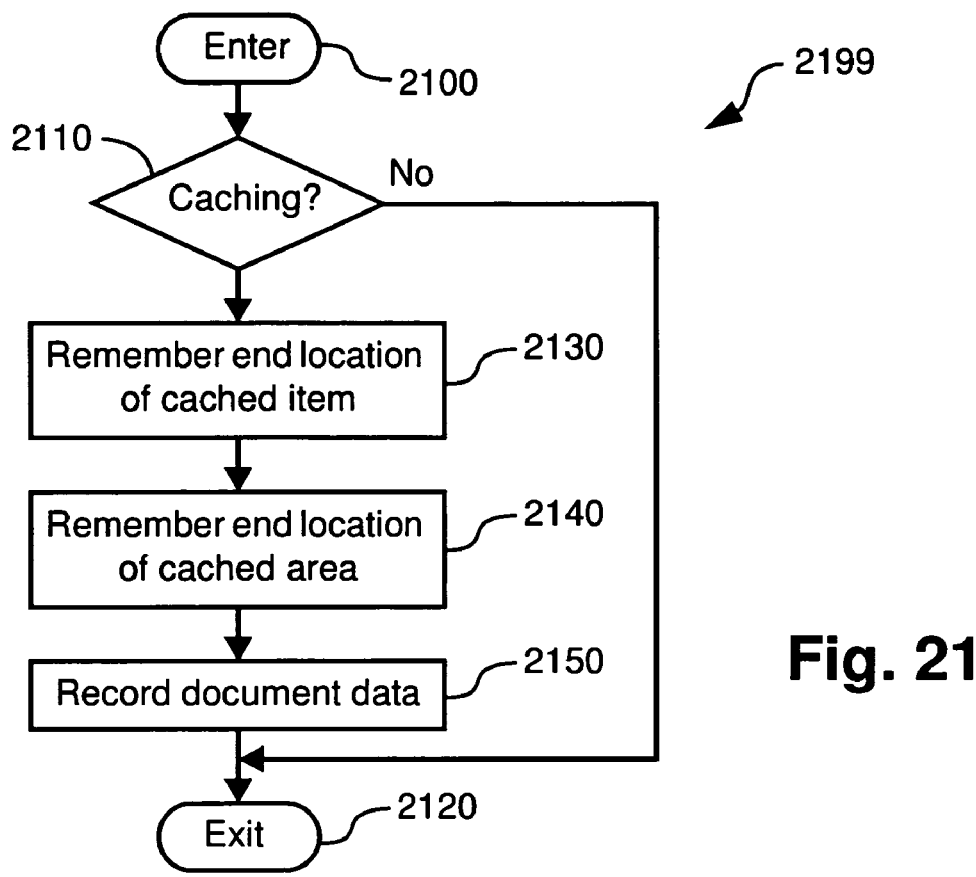
FIG. 21 is a flow diagram that provides further detail for steps 1780, 1715, 1824 and 1835 of FIG. 17 and FIG. 18.

FIG. 21 is a flow diagram 2199 that provides more detail for the "cache data (if necessary)" steps 1780, 1715, 1824 and 1835 of FIG. 17 and FIG. 18. Processing this stage begins at step 2100, and passes to decision step 2110. Decision step 2110 checks whether caching is currently being performed. If caching is currently being performed, "Yes", the caching depth 1910 is greater than zero and control passes to step 2130.

Step 2130 records the current document data by setting the cache item end location 1936. Control passes to step 2140, which records the current document data by setting the cache area end location 1926. Control then passes to step 2150 to record the actual data. Depending on the embodiment of the SAX or SAX-like parser 600 being used, recording the actual data may require a pointer to the data block, or may require the cache manager 1520 to allocate and move the data from the SAX or SAX-like parser 600 to memory managed by the cache manager 1520. The specific details associated with recording the actual data form part of the correspondence mentioned earlier between the calls to the cache manager 1520 and the underlying memory management routines. Control passes from step 2150 to an exit step 2120 and this stage of processing is complete.

If caching is not being performed at step 2110, "No", then this stage of processing is complete and control passes to the exit step 2120.

Figure 22:
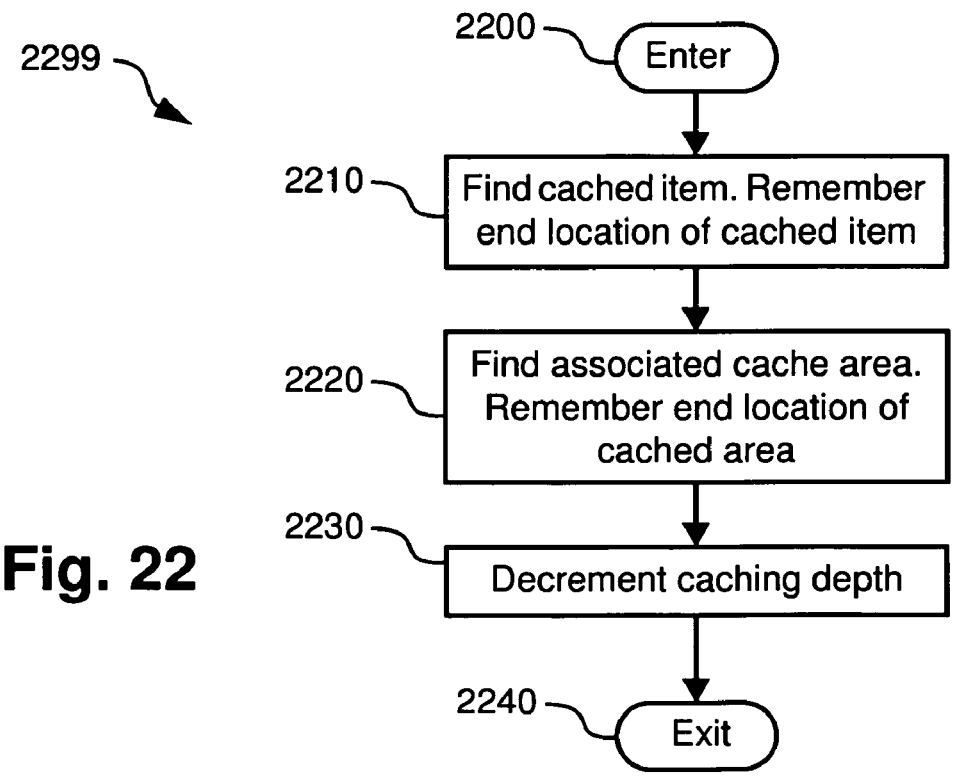
FIG. 22 is a flow diagram that provides further detail for steps 1826 and 1845 of FIG. 18.

FIG. 22 is a flow diagram 2299 that provides further detail for the "stop caching" steps 1826 and 1845 of FIG. 18. Processing this stage begins at step 2200. Control passes to step 2210 to retrieve the appropriate cache item 1930 for the "stop caching" cache event 1510. The appropriate cache item 1930 is found by matching the ruleset reference 1938 and rule reference 1939 against the current ruleset 710 and rule 720 being processed by the steps described with reference to FIG. 11 and FIG. 12, respectively. An end location 1936 of the cached item 1930 is set. In a preferred embodiment, the end location 1936 is an offset from the start of the XML text 522.

Control passes from step 2210 to step 2220 to process the appropriate cache area 1920. The cache area is referenced from the cache item used in step 2210. The end location 1926 of the current cache area is set. In a preferred embodiment, the end location is an offset from the start of the XML text 522. Control then passes to step 2230, which decrements the caching depth 1910 of the cache manager. This stage of processing is complete, so control passes to an exit step 2240.

Figure 23:
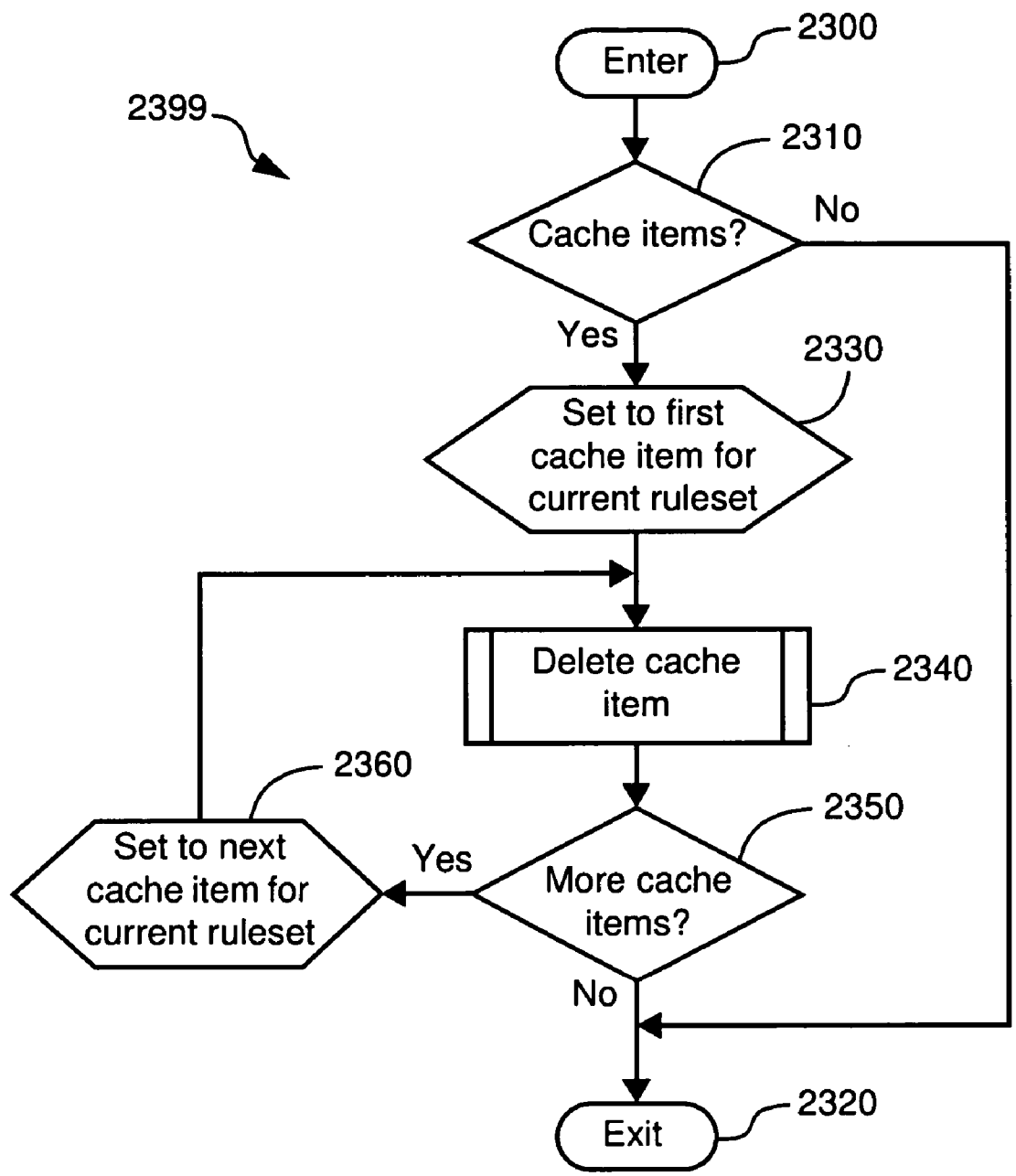
FIG. 23 is a flow diagram that provides further detail for step 1740 of FIG. 17.

FIG. 23 is a flow diagram 2399 that expands upon the "discard markers for previously matched event data and metadata" step 1740 of FIG. 17. This stage of processing begins at step 2300. Control then proceeds to decision step 2310, which checks whether there are cache items 1930 linked to the current ruleset 710. If there are cache items 1930 for the current ruleset 710, "Yes", control passes to step 2330. Any cache items that exist at step 2310 for the ruleset 710 within which a rule 720 has just been matched are of lower priority and therefore require deleting.

If there are no cache items 1930 for the ruleset 710 at step 2310, "No", control passes to exit step 2320 and this stage of processing is then complete.

At step 2330, a loop commences through each cache item 1930 linked to the current ruleset. Step 2330 sets a first cache item 1930 for the current ruleset 710. Control passes to step 2340. At step 2340, the presently set cache item 1930 is deleted, but not necessarily the cached memory to which the cache item 1930 references. The deletion of the memory is described below with reference to FIG. 24 and in the memory management following the description of FIG. 24.

Control passes from step 2340 to decision step 2350, which determines whether there are more cache items. If more cache items exist, "Yes", control passes to step 2360 to set the next cache item 1930 for the current ruleset 710 to be deleted. There will only be more than one cache item 1930 linked to a ruleset 710 if rules of equal priority were matched. Control then passes to step 2340 to complete the loop for processing the further cache items. Step 2340 deletes the next cache item 1930 and the loop is revisited in this manner until there are no remaining cache items 1930.

If there are no more cache items at step 2350, "No", control passes to exit step 2320.

Figure 24:
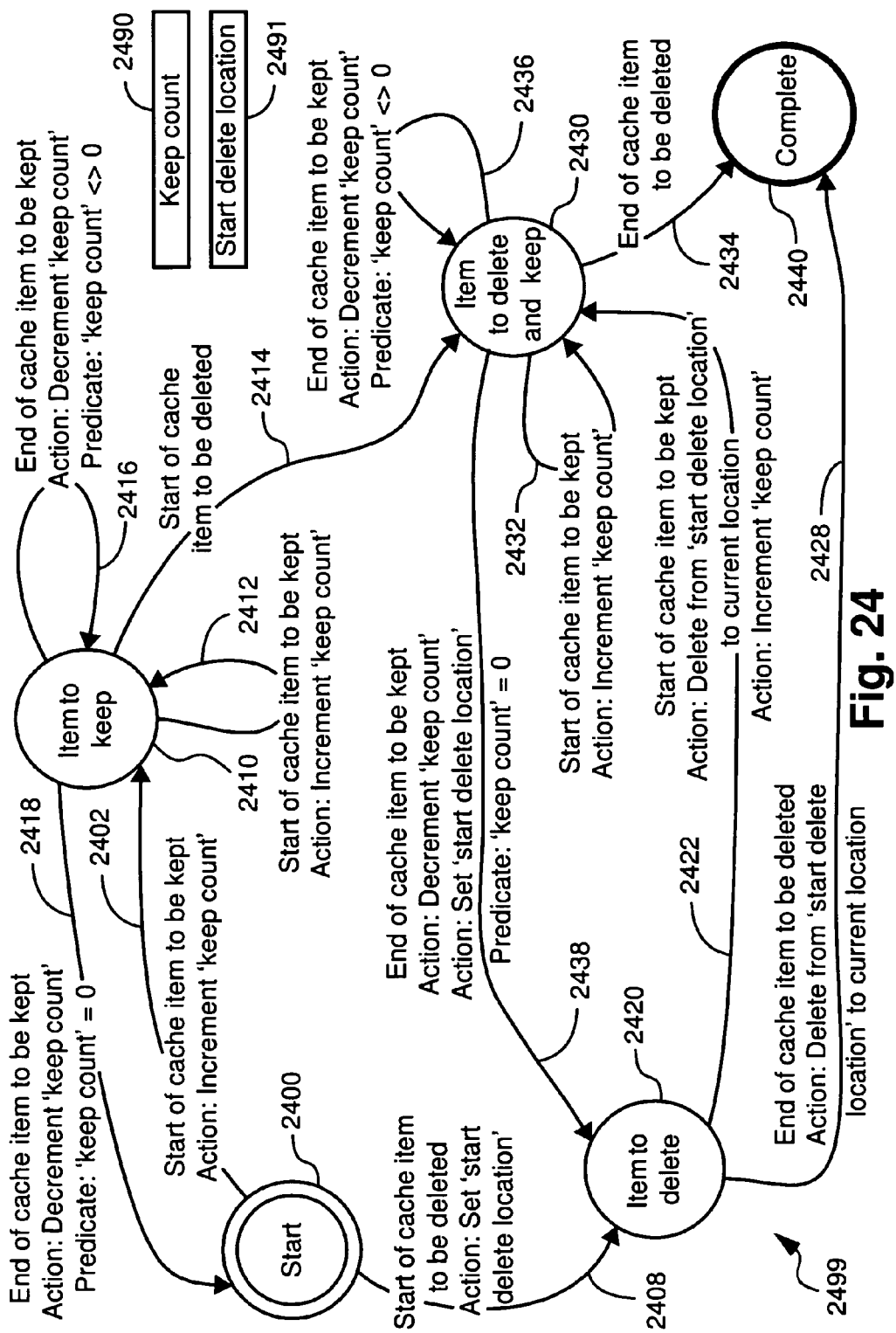
FIG. 24 is a state event diagram for the underlying algorithm effected during step 2340 of FIG. 23.

FIG. 24 is a state event diagram 2499 for the underlying algorithm effected during the "delete cache item" step 2340 of FIG. 23. FIG. 24 represents a state event diagram for processing the deletion of one cache item 1930 from a cache area 1920. There are five states used during processing. Processing begins at first state 2400. Second state 2410 tracks cache items 1930 that are kept in the cache area 1920. Third state 2420 tracks the cache item 1930 to be deleted from the cache area 1920. Fourth state 2430 tracks the case when the cache item 1930 to be deleted from the cache area 1920 overlaps with cache items 1930 that are to remain. Finally, fifth state 2440 represents the end of 'delete cache item' processing.

Two state variables are used during processing. The 'keep count' variable 2490 counts the number of cache items 1930 overlapping during processing of the cache area 1920. The 'start delete location' variable 2491 stores the start location of a deletable portion of memory area referenced by the cache item 1930 to be deleted. In some circumstances, the memory referenced by the cache item 1930 to be deleted cannot be fully deleted because of overlaps with memory referenced by other cache items.

The cache item 1930 has an associated cache area 1920 that was initialised when the cache item 1930 was created. The cache area 1920 of the cache item 1930 being deleted is now used.

The events in the diagram are generated by looping through the 'start location' 1934 and 'end location' 1936 of all the cache items 1930 in the associated cache area 1920 of the cache item 1930 to be deleted. The events are generated in the order of all locations 1934 and 1936 in the cache area 1920 starting at the start location 1924 of the cache area and finishing at the end location 1926 of the cache area. Where two location values are equal, Table 11 below shows which takes precedence.

TABLE 11

| Location 1 | Location 2 | Precedence |
|---|---|---|
| Start location of cache item to keep. | Start location of cache item to keep. | Either |
| | End location of cache item to keep | Location 2 |
| | Start location of cache item to delete. | Location 1 |
| | End location of cache item to delete. | Location 1 |
| End location of cache item to keep. | Start location of cache item to keep. | Location 1 |
| | End location of cache item to keep | Either |
| | Start location of cache item to delete. | Location 1 |
| | End location of cache item to delete. | Location 2 |
| Start location of cache item to delete. | Start location of cache item to keep. | Location 2 |
| | End location of cache item to keep | Location 2 |
| | Start location of cache item to delete. | Not applicable. There will only be one cache item to delete. |
| | End location of cache item to delete. | Not applicable. There will only be one cache item to delete. |
| End location of cache item to delete. | Start location of cache item to keep. | Location 2 |
| | End location of cache item to keep | Location 1 |
| | Start location of cache item to delete. | Not applicable. There will only be one cache item to delete. |
| | End location of cache item to delete. | Not applicable. There will only be one cache item to delete. |

Returning to FIG. 24, processing begins at the first state 2400 at the start location of the cache area 1924. The next locations possible are: (i) a start location belonging to a cache item 1930 to be deleted; or (ii) a start location belonging to one of the other cache items 1930 in the cache area 1920.

At state 2400, if a received event is the start location of one of the cache items 1930 to be kept 2402, then increment a reference count (the 'keep count' 2490) of the number of cache items that must remain in the cache area 1920 after the cache item 1930 to be deleted has been deleted. Control moves to state 2410 to track all the cache items 1930 to be kept.

At state 2400, if a received event is the start location of the cache item 1930 to be deleted 2408, then remember the address of the start of an area of memory to be deleted ('start delete location' 2491) and move to state 2420 to track the item to be deleted.

When in state 2410, the next locations possible are: (i) the start location 1934 of an additional cache item 1930 to keep; (ii) the end location 1936 of a cache item 1930 being kept; or (iii) the start location 1934 of the cache item 1930 being deleted.

At state 2410, if the event is the start location of an additional cache item 1930 to be kept 2412, then increment the 'keep count' 2490, remain in state 2410 and go on to process the next location.

At state 2410, if the event is the end location 1936 of a cache item 1930 to be kept 2416, then decrement the 'keep count' 2490. If 'keep count' 2490 is zero 2418, then return to state 2400 and go on to process the next location. If 'keep count' 2490 is greater than zero 2416, then remain in state 2410 and go on to process the next location.

At state 2410, if the event is the start location 1936 of the cache item 1930 to be deleted 2414, move to state 2430 to track an overlap between cache items 1930 that need to be kept and the current item to be deleted.

When in state 2420; the next possible locations are: (i) the start location 1934 of a cache item 1930 to be kept; or (ii) the end location 1936 of the cache item 1930 to be deleted.

At state 2420, if the event is the start location 1934 of a cache item 1930 to be kept 2422, then delete the memory from 'start delete location' 2491 to the current location, increment the 'keep count' 2490, and move to state 2430 to track an overlap between cache items 1930 that need to be kept and the current item to be deleted. Go on to process the next location.

At state 2420, if the event is the end location 1936 of the cache item 1930 to be deleted 2428, then delete the memory from the 'start delete location' 2491 to the current location. Move to state 2440.

When in state 2430; the next possible locations are: (i) the start location 1934 of an additional cache item 1930 to keep; (ii) the end location 1936 of a cache item 1930 being kept; or (iii) the end location 1934 of the cache item 1930 being deleted.

At state 2430, if the event is the start location 1934 of a cache item 1930 to be kept 2432, then increment the 'keep count' 2490 and remain in state 2430. Go on to process the next location.

At state 2430, if the event is the end location 1936 of the cache item to be deleted 2434, then move to state 2440.

At state 2430, if the event is the end location 1936 of a cache item to keep, then decrement the 'keep count' 2490. If the 'keep count' 2490 is zero 2438, then set the 'start delete location' 2491 to the current location. Then, move to state 2420 to track the next area of the cache area 1920 that can be deleted. Go on to process the next location. If the 'keep count' 2490 is greater than zero 2436, then remain in state 2430 and go on to process the next location.

At state 2440, and before completing this stage of processing, the 'caching depth' 1910 may need adjusting. If the cache item 1930 deleted belongs to the same cache area 1920 as the current cache area 1920 and the end of the cache item 1930 being deleted has not been marked to 'stop caching', then decrement the 'caching depth' 1910 by one. The mark item for 'stop caching' cache event 1510 does not occur for this deleted cache item 1930, because the higher priority rule 720 and cache item 1930 inhibit that event.

Memory Management

Many aspects of memory management are known to those skilled in the art. In summary, these involve allocating and freeing memory, resizing blocks of memory, making discrete blocks of memory into one contiguous block and re-locating memory, which in turn may mean larger contiguous blocks of memory can be freed for use by the operating system or application. There is a correspondence between the creation and deletion of cache areas 1920 and cache items 1930, and the data 524 and metadata 526 that needs to be cached and returned to the application 500.

TABLE 12

| | Cache event | Memory management |
| --- | --- | --- |
| 1 | Mark location for 'start caching' | Allocate memory if a new cache area (1920) object. Point to the next free location in that memory. |
| 2 | 'Cache data if necessary' | Reallocate memory (if not enough memory was allocated in (1)). Move data to the next free location of the allocated memory and update the next free location. |
| 3 | Mark location for 'stop caching' | No memory management action required. |
| 4 | Delete cache item | There are four scenarios when a cache item is deleted. These are covered in Table 13. |

Table 12 describes how the cache events 1510, derived from the XML events 615 processed in FIG. 17 and FIG. 18, utilize the memory management routines. The preferred embodiment uses a SAX or SAX-like parser that allocates and uses memory at each XML event 615, then frees the allocated memory when the XML event 615 is completed. The XML event is completed when the application of the SAX-like parser, or in this case the rule engine 620, has finished handling the XML event 615.

TABLE 13

| Scenario | Memory management |
| --- | --- |
| The cache item (1930) to be deleted has no other overlapping cache items. | The memory can be released. |
| The cache item (1930) to be deleted comes before, and overlaps with one or more cache items to keep. | Options:<br>a) Leave the memory as-is (the "deleted" portion will be sacrificed)<br>b) Allocate new memory of the size of the portion to keep, and copy contents being kept into new memory. Release old memory.<br>c) If the memory management allows, then release the portion of memory related to the cache item being deleted. |
| The cache item (1930) to be deleted comes after, and overlaps with one or more cache items to keep. | Options as above. |
| The cache item (1930) to be deleted comes on or between cache items to keep. | Do nothing - the memory needs to be kept for the surrounding cache item (1930) to keep. |

Selection of the memory management options, which are listed in Table 13 above, depends on such things as the memory management facilities of the implementation platform(s), the relative sizes of the memory being kept and deleted and performance issues. Other implementation and application factors may also affect the selection of a particular management option.

Continually marking small areas of memory to be released may lead to one larger, contiguous area that can be released, rather than just marked for release. These memory management techniques would be well known and appreciated by a person skilled in the art.

Exclusive Adaptation

The processing method and description for the 'exclusive' adaptation of this method initially remain fundamentally the same as the 'inclusive' adaptation. This initial processing is described above in respect of the 'inclusive' adaptation with reference to FIG. 5 through to FIG. 10. The 'exclusive' adaptation deviates from the 'inclusive' adaptation from the "parse document and cache matched data" step 1020 of FIG. 10.

Figure 25:
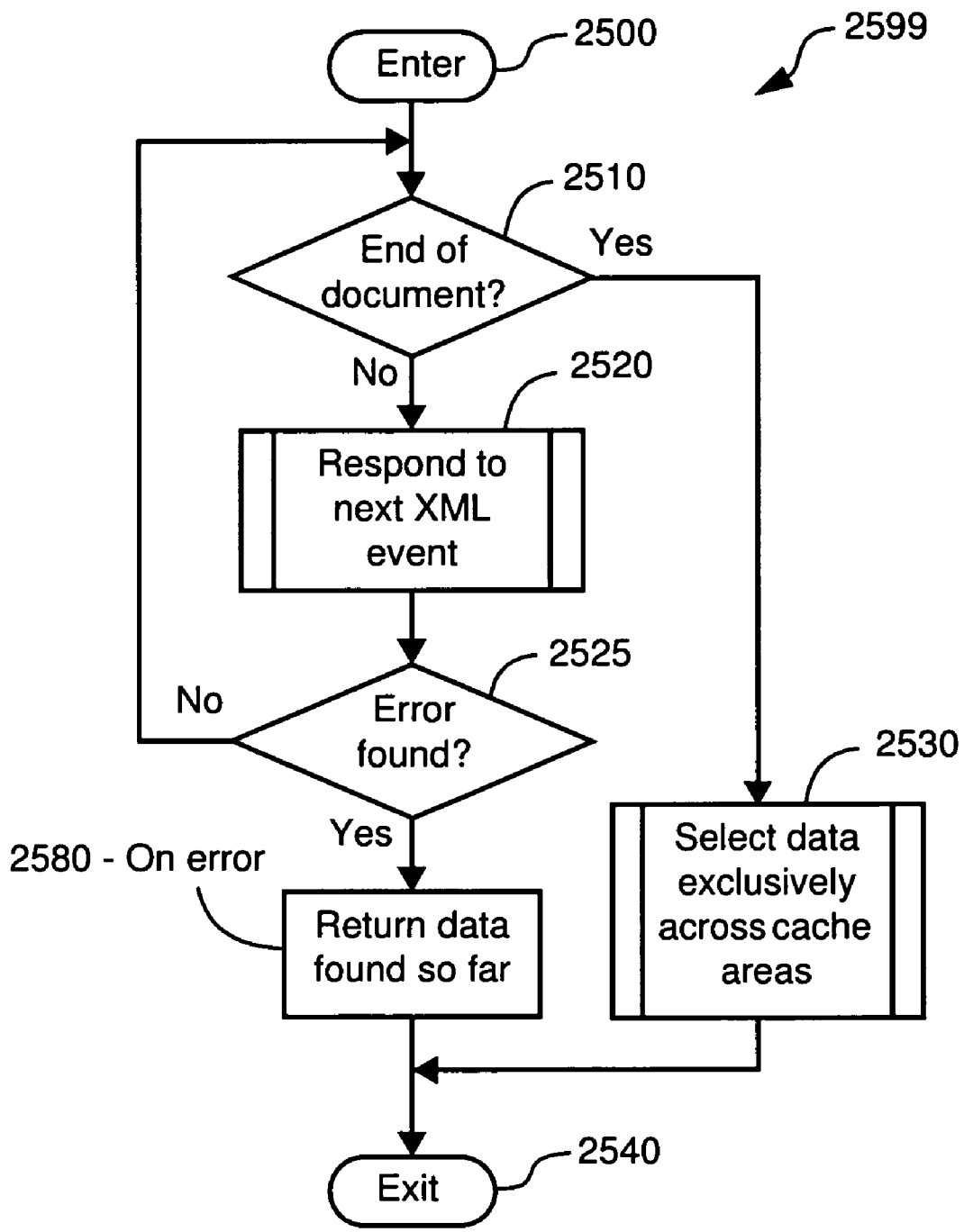
FIG. 25 is a flow diagram that expands upon step 1020 from FIG. 10, for the 'exclusive' adaptation.

FIG. 25 is a flow diagram 2599 that expands upon the "parse document and cache matched data" step 1020 from FIG. 10 for the 'exclusive' adaptation of this method. This stage of the processing begins at step 2500. Control then passes to step 2510, where a loop is entered to process XML events 615 produced by the SAX-like parser 600. The start of this loop is a decision step 2510 that checks whether the complete document 520 has been read and the end of the document has been reached. In the preferred embodiment, while the document 520 is being processed, XML events 615 are raised.

If the end of the document has been reached, "Yes", control passes from step 2510 to step 2530. Step 2530 selects data exclusively across the rulesets and deletes cached data that is no longer required. Following step 2530, the collected exclusive cache items 1930, related data 524 and metadata 526 are available. The processing of this phase is then complete and control then passes to an exit step 2540.

If the end of the document has not been reached at step 2510, "No", control passes to step 2520, which processes each XML event 615. In a preferred embodiment, control passes from step 2520 to decision step 2525, which checks whether an error was found during processing. If no errors are found, "No", control returns to the start of the loop at step 2510. If an error is found at step 2525, "Yes", control passes to step 2580, which returns the best data matches found to that point. Returning an indicator stating the data was extracted under error conditions would also be prudent. Control then passes to the exit step 2540.

FIG. 12 provides further detail for the "respond to next XML event" step 2520 from FIG. 25 for the 'exclusive' adaptation. This is processed in the same way as the 'inclusive' adaptation. FIG. 13 expands upon the "process ruleset" step 1220 from FIG. 12 for the 'exclusive' adaptation. This is also processed in the same way as the 'inclusive' adaptation.

It is possible, within the processing of FIG. 13, to eliminate processing unnecessary rules. Before step 1320, check if the rule 720 about to be processed has a lower priority than any rule 720 of the same ruleset 710 matched so far. If the rule has lower priority, proceed to step 1330 to check the next rule. This is not a necessary step, however, for the correct operation of this invention, and is merely an alternate arrangement that may be practised.

Figure 26:
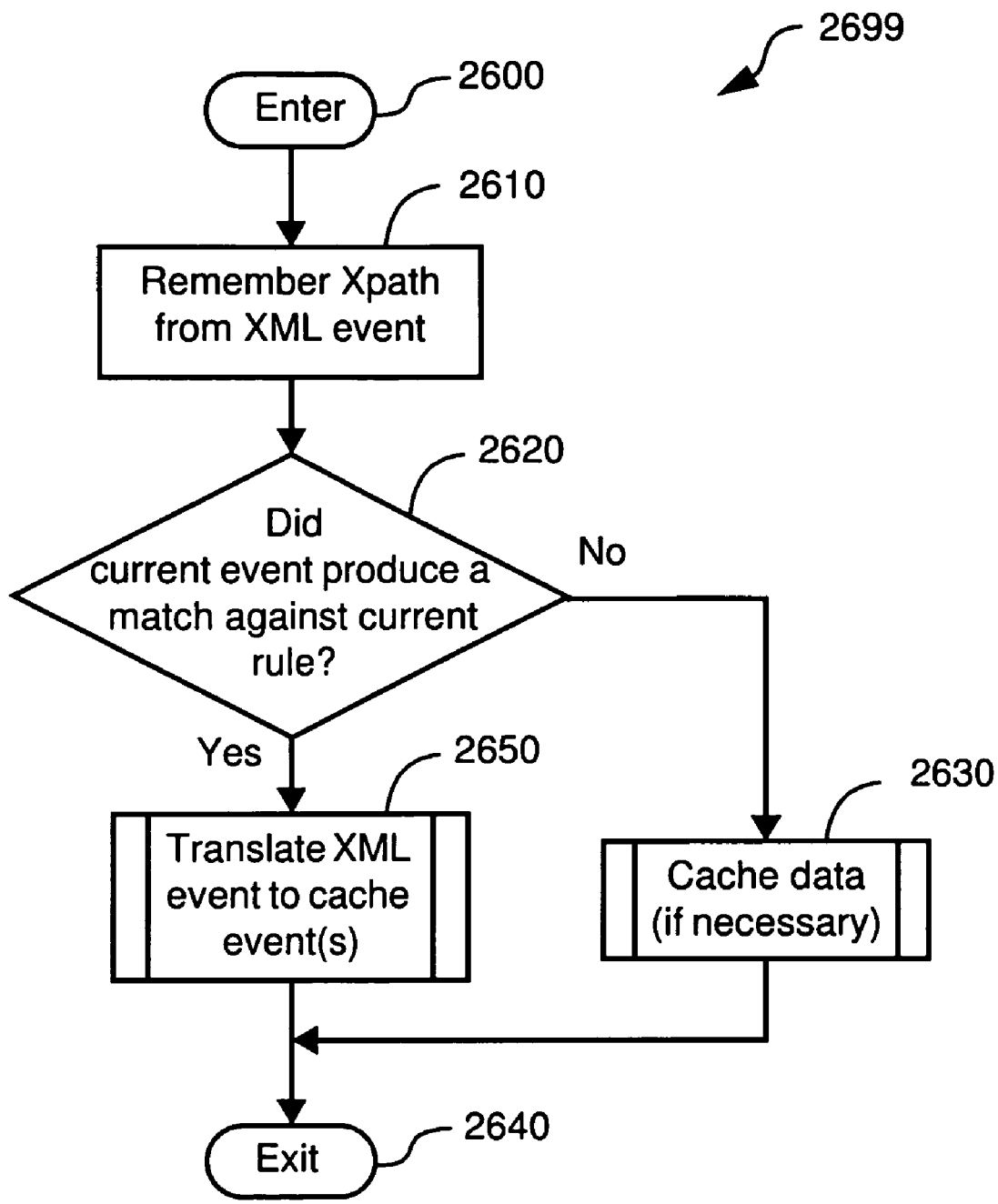
FIG. 26 is a flow diagram that provides further detail for step 1320 from FIG. 13, for the 'exclusive' adaptation.

FIG. 26 is a flow diagram 2699 that provides further detail for the "process rule" step 1320 from FIG. 13 for the 'exclusive' adaptation. This stage of processing begins at step 2600. It is necessary, in the preferred embodiment, to remember the current XPath location being processed in the document 520. Accordingly, control passes to step 2610, which remembers the XPath for the current XML event. XML events 615 such as 'start element' add to the current XPath location. XML events 615 such as 'end element' reduce the current XPath location. This stage of processing is performed in the same manner as described above in respect of step 1705 of FIG. 17 for the 'inclusive' adaptation.

Control passes from step 2610 to decision step 2620, which determines whether a current event 615 produces a match against a current rule 720. This stage of processing is performed in the same manner as described above in respect of step 1710 of FIG. 17 for the 'inclusive' adaptation.

If there is no match at step 2620, "No", then it may still be possible that data is being cached. Control passes to step 2630, which requests the cache manager 1520 to cache any data. Step 2630 is performed in the same way as the 'inclusive' adaptation, as described with respect to FIG. 21.

This stage of processing is then complete and control passes to exit step 2640. Any data 524 and metadata 526 found during previous processing of this specific ruleset 710 remain as the returned data 524 and metadata 526 from this stage of processing.

If a match was found at step 2620, "Yes", control passes to step 2650, which translates the XML event 615 into a cache event 1510 and responds to the cache event. Step 2650 is performed in the same way as the 'inclusive' adaptation, as described with reference to FIG. 18, with one additional action after the "stop caching" steps 1826 and 1845. The "stop caching" steps 1826 and 1845 are performed for a cache item 1930. Following step 1826, store a copy 1827 of the cache item 1930 for exclusivity processing in a new step. Similarly, following step 1845, store a copy of the cache item 1930 for exclusivity processing in new step 1847.

Control then proceeds from step 2650 to exit step 2640, where this stage of processing is complete.

Figure 27:
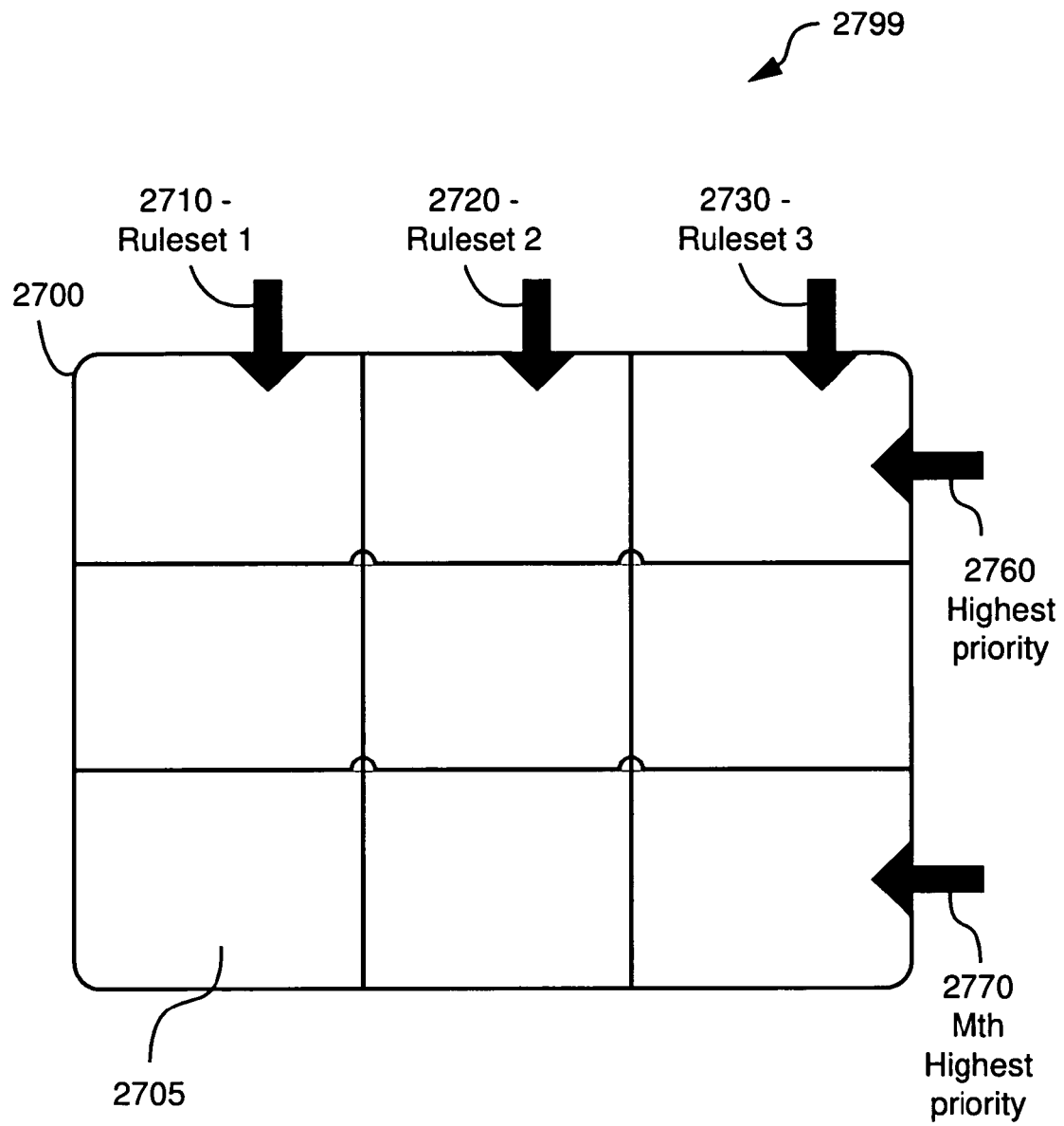
FIG. 27 is a representation of an example of an exclusivity-table.

FIG. 27 is a representation 2799 of an example of an exclusivity-table 2700. An exclusivity-table is used when selecting and keeping relevant cache items 1930 that will be used during the selection of data in the 'exclusive' adaptation.

The exclusivity-table 2700 is an M by N (rows by columns) table, where N is the number of rulesets 710 defined in the rules 504. M is a number greater than or equal to N. M equal to N is deemed adequate for the preferred embodiment of this invention but, depending on characteristics of the markup document 520 and the overlap of data items, it can also be seen that M greater than N is necessary for some applications.

The exclusivity-table contains a column for each ruleset 710. In the example exclusivity-table 2700, three columns 2710, 2720 and 2730 are shown, corresponding to ruleset 1, ruleset 2 and ruleset 3, respectively.

Elements 2705 of the exclusivity-table 2700 are initially deemed null. The elements 2705 hold copies of cache items 1930. The row-order of the cache-items 1930 in the exclusivity-table 2700 is dependent of the rule priority 722 of the cache-item 1930. Higher rows in the exclusivity-table 2700 are of higher priority than rows below. A highest priority row 2760 of the exclusivity-table 2700 stores copies of cache items 1930 with higher priority rules 722. Lower priority cache item copies are stored in rows underneath the highest priority row. Up to M cache item 1930 copies are stored in each column, with the Mth highest priority items being stored in the Mth highest priority row 2770 of the exclusivity-table 2700.

Figure 28:
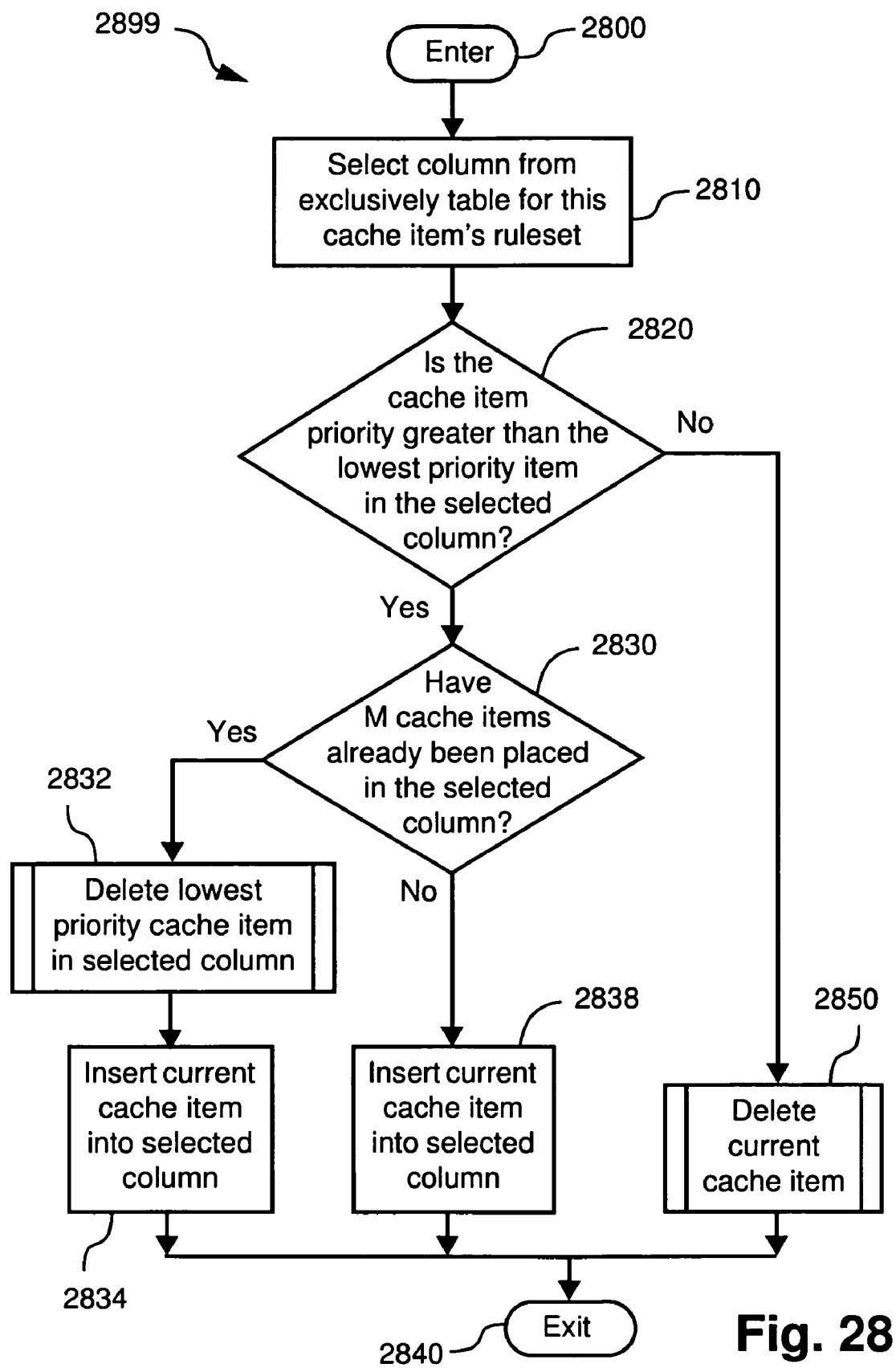
FIG. 28 is a flow diagram that provides further detail for steps 1827 and 1847 from the 'exclusive' adaptation of FIG. 18.

FIG. 28 is a flow diagram 2899 that provides further detail for the "Store cache item for exclusivity processing" steps 1827 and 1847 from the 'exclusive' adaptation of FIG. 18. This stage of processing begins at step 2800. Control passes to step 2810, which selects a column in the exclusivity-table 2700 for the cache item 1930 that has just completed "stop caching" processing, as described with respect to steps 1826 and 1845 from FIG. 18. The cache item 1930 has a reference 1938 to an associated ruleset 710. The reference 1938 is used to select the correct column from the exclusivity-table 2700.

Working from the highest priority row 2760 to the Mth highest priority row 2770, find the first element 2705 in the selected column having a priority 722 less than the current cache item 1930. A null element 2705 is always defined as having a lower priority than the current cache item 1930.

Control passes from step 2810 to decision step 2820, which determines whether the priority of a cache item is greater than the lowest priority item in the selected column. If, at step 2820, a null element or an element having lower priority than the current cache item 1930 is found, "Yes", then control proceeds to decision step 2830. If, at step 2820, a null element or an element having lower priority than the current cache item 1930 is not found, "No", then control proceeds to step 2850.

Step 2830 checks whether there are already M items in the selected column of the exclusivity-table 2700. If there are M items, "Yes", indicating that the column is full of previously found cache items 1930, then control passes to step 2832. If there are fewer than M items at step 2830, control passes to step 2838.

At step 2832, the cache item 1930 needs to be stored in the selected column of the exclusivity-table 2700 and the cache item that was stored at the Mth highest priority row 2770 is no longer required. Accordingly, in step 2832 the cache manager deletes the cache item in the Mth highest priority row. The processing to delete this cache item is described above with reference to FIG. 24.

Control passes from step 2832 to step 2834. Step 2834 inserts the current cache item 1930, which was found on completion of the "stop caching" processing steps 1826 and 1845 from FIG. 18, into the currently selected column of the exclusivity-table 2700. The cache item 1930 is inserted such that the items in the selected column remain in priority 722 order. Following step 2834, control proceeds to exit step 2840, where this stage of processing is complete.

At step 2838, a null element 2705 was found in the selected column. Step 2838 inserts the current cache item 1930 into the current column and there is no requirement to delete any caching item from the end of the column. The cache item 1930 is inserted such that the items in the selected column remain in priority 722 order. Following step 2838, control proceeds to exit step 2840, where this stage of processing is complete.

At step 2850, the current cache item 1930 is of lower priority than any cache items 1930 already found for the current ruleset 710. Also, M cache items have already been stored in that column of the exclusivity-table 2700. Step 2850 deletes the current cache item 1930. The processing to delete this cache item is described above with reference to FIG. 24. Following step 2850, control proceeds to exit step 2840, where this stage of processing is complete.

The processing described for FIG. 28 utilizes a "greater than" comparison for the rule priorities. It is possible that a rule 720 has a number of matches. It is also possible that the application 500 provides rules 720 that have equal priority 722. However, providing rules of equal priority conflicts with the use of the exclusive adaptation. Nevertheless, as the rules are provided by the application 500, "equality" of rule priorities needs to be addressed. Two approaches for handling equal rule priorities are provided below.

a) Treat the current cache item 1930 as having a higher priority than the "equal" item found in the exclusivity-table 2700. This results in the most recent cache item 1930 taking priority.

b) Treat the current cache item 1930 as having a lower priority than the equal priority item found in the exclusivity-table 2700. This results in the existing cache items taking priority over the current cache item 1930.

It would be clear to a person skilled in the art that processing of cache items 1930 stemming from rules 720 of equal priority 722 is not limited only to these options, but other ways of handling equal priority rules are also possible.

Figure 29:
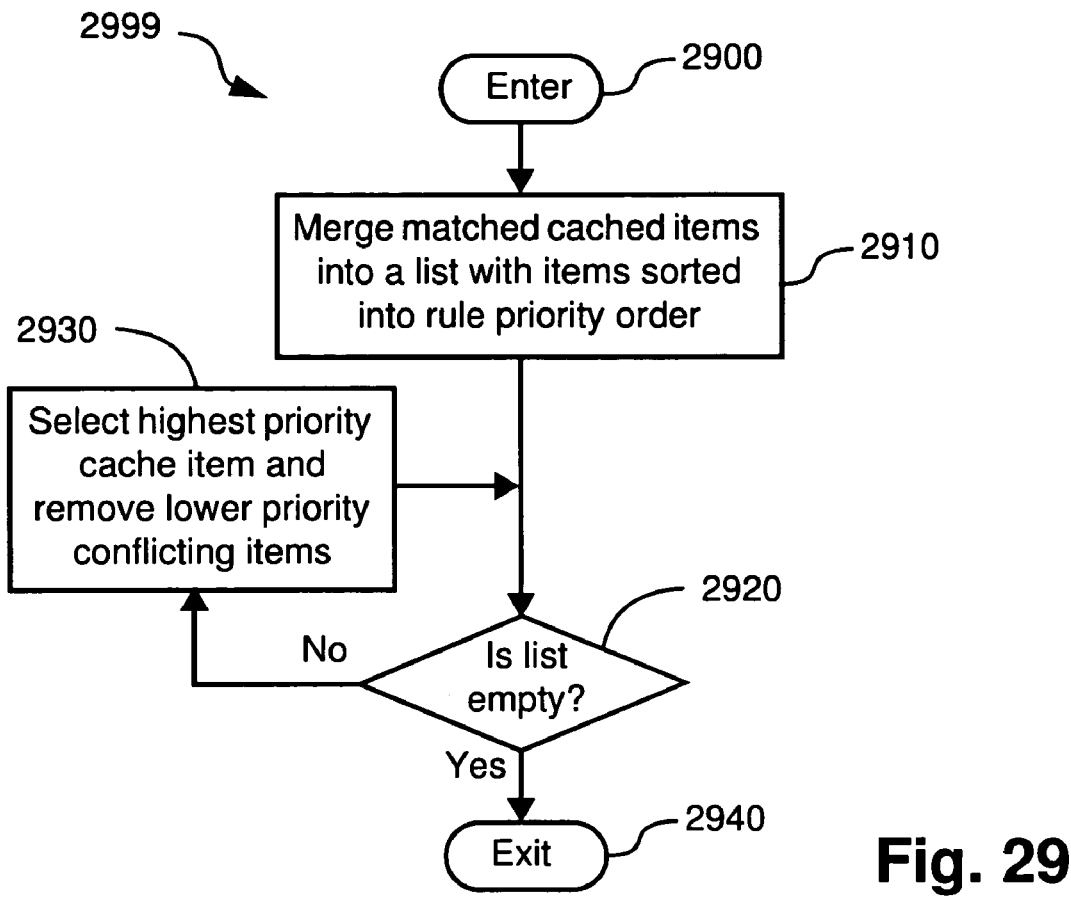
FIG. 29 is a flow diagram that provides further detail for step 2530 of FIG. 25.

FIG. 29 is a flow diagram 2999 that provides further detail for the "select data exclusively across cache areas" step 2530 of FIG. 25. Up until this stage, matching cache items 1930 have been prioritised within a ruleset 710. It is now necessary to analyse the cache item 1930 rule priorities across all rulesets 700.

This stage of processing begins at step 2900. Control proceeds to step 2910. The exclusivity-table 2700 elements 2705 are processed in rule priority 722 order from highest priority to lowest priority. Step 2910 merges all elements 2705 from the exclusivity-table 2700 into a list with the cache item of the highest priority rule at the head of the list and then in priority order until the cache item 1930 of the lowest priority rule at the tail of the list.

Control passes from step 2910 to decision step 2920, which determines whether the list is empty. If the list is empty, "Yes", control passes to an exit step 2940 and processing of this stage is complete. If the list is not empty at step 2920, "No", control passes to step 2930, which selects the next cache item 1930 from the head of the list. This selected cache item will form part of the result set. The data 524 and metadata 526 for this cache item 1930 are returned to the application 500, and the cache item 1930 is removed from the list.

Step 2930 also removes and deletes all lower priority items from the list that belong to the same ruleset 710 as the cache item 1930 just selected. These cache items 1930 being removed are deleted by the cache manager 1520, as described above with reference to FIG. 24. Step 2930 also removes and deletes all items that overlap with the cache item 1930 just selected. These cache items 1930 being removed are also deleted by the cache manager, as described above with reference to FIG. 24.

Items remaining on the list belong to other rulesets 710 and are exclusive with respect to the cache item 1930 just selected. Control passes from step 2930 to step 2920 and loops until all items have been removed from the list. When no more items remain on the list proceed to step 2940, where this stage of processing is complete.

It will be apparent to a person skilled in the art that the exclusivity algorithm described is not the only method of selecting exclusive items from the XML document 520. In another embodiment, all data that matches the supplied rules is cached and the highest priority total for the optimum combination of cache-items 1930 from the rulesets 710 is determined. A rule-based language, such as Prolog, provides a natural language to determine the results of applying the combinations set forth in this approach. Other methods of determining exclusivity can also be applied.

Dynamic Parsing

As described above, an application is enabled to extract specified sets of data from documents encoded using a markup language such as XML. The specified datasets are described by a set of rules defined by the application before parsing of a document commences. In a further embodiment, the rules change dynamically in response to whether initial rules are satisfied. A matching rule can influence the priorities and rulesets during a single parsing pass of a document.

TABLE 14

```
<?xml version="1.0" encoding="UTF-8" ?>
<travelog title="Around the world in 80 days">
    <entries>
        <entry date="1872-10-02">
            <person>Phileas Fogg</person> exited
the <place>Reform Club</place> at a little
after seven in the evening and...
        </entry>
        <entry date="1872-10-03">
            <person>Passepartout</person> packed the carpet bags.
<person>Phileas</person> and <person>Passepartout</person>
took a cab to
<place>Charing Cross </place>...
        </entry>
    </entries>
    <photos>
        <thumbnail date="1872-10-02">
            <person>Phileas Fogg</person>
            <place>Reform Club</place>
            <data>...</data>
        </thumbnail>
        <high-res date="1872-10-03">
            <person>Phileas Fogg</person>
            <person>Passepartout</person>
            <place>Charing Cross</place>
            <data>...</data>
        </high-res>
    </photos>
</travelog>
```

Table 14 is a sample XML document containing a travelog. The structure of the document includes descriptive text, keywords for places and people. The document also includes image information with appropriate keywords. In this example, an application scans the entries in the document of Table 14 for a person. When a person is found, the application searches for a corresponding image, preferring high resolution images to low resolution images.

In this example, references to "Phileas" are preferred over references to "Passepartout", as shown in the ruleset below:

Rule - Priority
/travelog/entries/entry/person::starts-with(text( ), "Phileas") - 1.0
/travelog/entries/entry/person::text( ) == "Passepartout") - 0.8

When the application finds an element that matches one of the persons, the rules table changes dynamically to look for images of the matched person. The preference is that high-resolution images are more important than thumbnails, shown in the amended ruleset below:

Rule - Priority
/travelog/photos/high-res/person::text( ) == person1 - 1.0
/travelog/photos/thumbnail/person::text( ) == person1 - 0.95
/travelog/photos/high-res/person::text( ) == person2 - 0.5
/travelog/photos/thumbnail/person::text( ) == person2 - 0.45

By changing the rulesets in response to matched rules, dynamic parsing of a document is enabled. Dynamic parsing enables the information required by an application to be extracted during a single parsing of the document. Dynamic parsing can be utilised by an application to change rulesets, once the application determines that all data required from an initial ruleset has been extracted. Further, results from a ruleset may be utilised as variables in a subsequent ruleset to enable the application to obtain relevant data in a single parse.

Exchanging Electronic Documents

Figure 30:
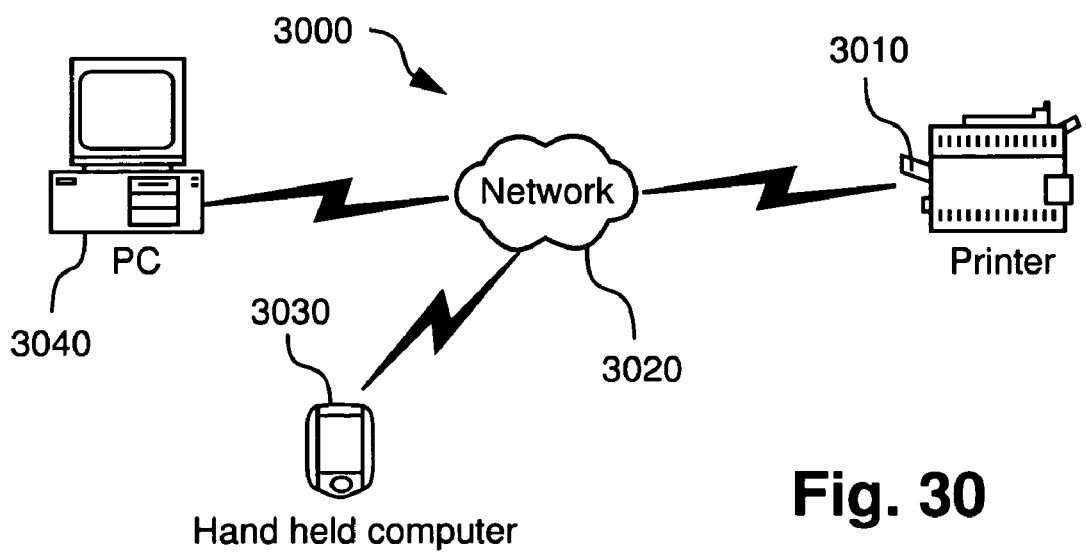
FIG. 30 is a schematic block diagram showing a network with connected devices.

FIG. 30 shows a schematic block diagram of a prior art arrangement 3000 including a printer 3010 connected to a network 3020. Also connected to the network 3020 are devices that use XML documents to describe information to be printed. The devices connected to the network 3020 include a personal computer (PC) 3040 and a small hand-held computing device 3030. The network 3020 can be implemented in many ways, including a wired or wireless Personal Area Network (PAN), Local Area Network (LAN), Wide Area Network (WAN) or internetwork (e.g. the Internet). Both the PC 3040 and hand-held computing device 3030 are adapted to print documents using the printer 3010 via the network 3020. The PC 3040 and the hand-held computing device 3030 are also adapted to exchange documents between each other.

Example 1

```
01  <?xml version="1.0" encoding="UTF-8"?>
02  <document version="1.0">
03    <title>Page 1</title>
04    <img src="a.jpg"/>
05  </document>
```

Example 1 is a sample XML document that the hand-held computer 3030 sends via the network 3020 to the printer 3010. The XML document of Example 1 conforms to an XML schema defined in Example 2.

Example 2

```
01  <?xml version="1.0" encoding="UTF-8"?>
02  <xs:schema
03    xmlns:xs="http://www.w3.org/2001/XMLSchema"
04    elementFormDefault="qualified">
05    <xs:element name="document">
06      <xs:complexType>
07        <xs:sequence>
08          <xs:element ref="title"/>
09          <xs:element ref="img"/>
10        </xs:sequence>
11        <xs:attribute name="version" type="xs:decimal"
12                      use="required"/>
13      </xs:complexType>
14    </xs:element>
15    <xs:element name="img">
16      <xs:complexType>
17        <xs:attribute name="src" type="xs:string"
18                      use="required"/>
19        <xs:attribute name="date" type="xs:date"
20                      use="optional"/>
21      </xs:complexType>
22    </xs:element>
23    <xs:element name="title" type="xs:string"/>
24  </xs:schema>
```

The printer 3010 is designed to understand documents that conform to the schema shown in Example 2. The printer 3010 receives the XML document from the hand-held computer 3030 and validates the format of the XML document in Example 1. The printer 3010 extracts required information from the img element shown in line 04 of Example 1 to print the image "a.jpg". In this particular example, the img element of line 04 may be considered as containing a Joint Photographic Experts Group (JPEG) compressed page of laid out information to be printed. In other embodiments, the img element may take the form of a Uniform Resource Identifier (URI) of a Scalable Vector Graphics (SVG) page or raw printer information, for example.

Example 3

```
01  <?xml version="1.0" encoding="UTF-8"?>
02  <document version="2.0">
03    <title>Page 1</title>
04    
05  </document>
```

Example 3 is a new version of the XML document of Example 1. The XML document of Example 3 conforms to an updated schema for the XML document shown in Example 1. The element on line 04 of Example 3 is now called page, instead of img as previously denoted on line 04 of Example 1.

The PC 3040 transmits the XML document of Example 3 via the network 3020 to the printer 3010. The printer 3010 is not able to print the desired page, because the img element (Example 1, line 04) has been replaced by the page element (Example 3, line 04). The printer 3010 requires a firmware upgrade to comprehend the new XML document in Example 3 or must rely on a service on the network to translate the document to resemble the document of Example 1 and conform with the original schema shown in Example 2.

When an XML document conforming to a particular schema is transmitted across a network to a device capable of handling that particular schema, the devices involved are able to interchange documents successfully. Difficulties arise when the XML document schema is updated and a document conforming to the new XML schema is interchanged among devices.

Figure 37:
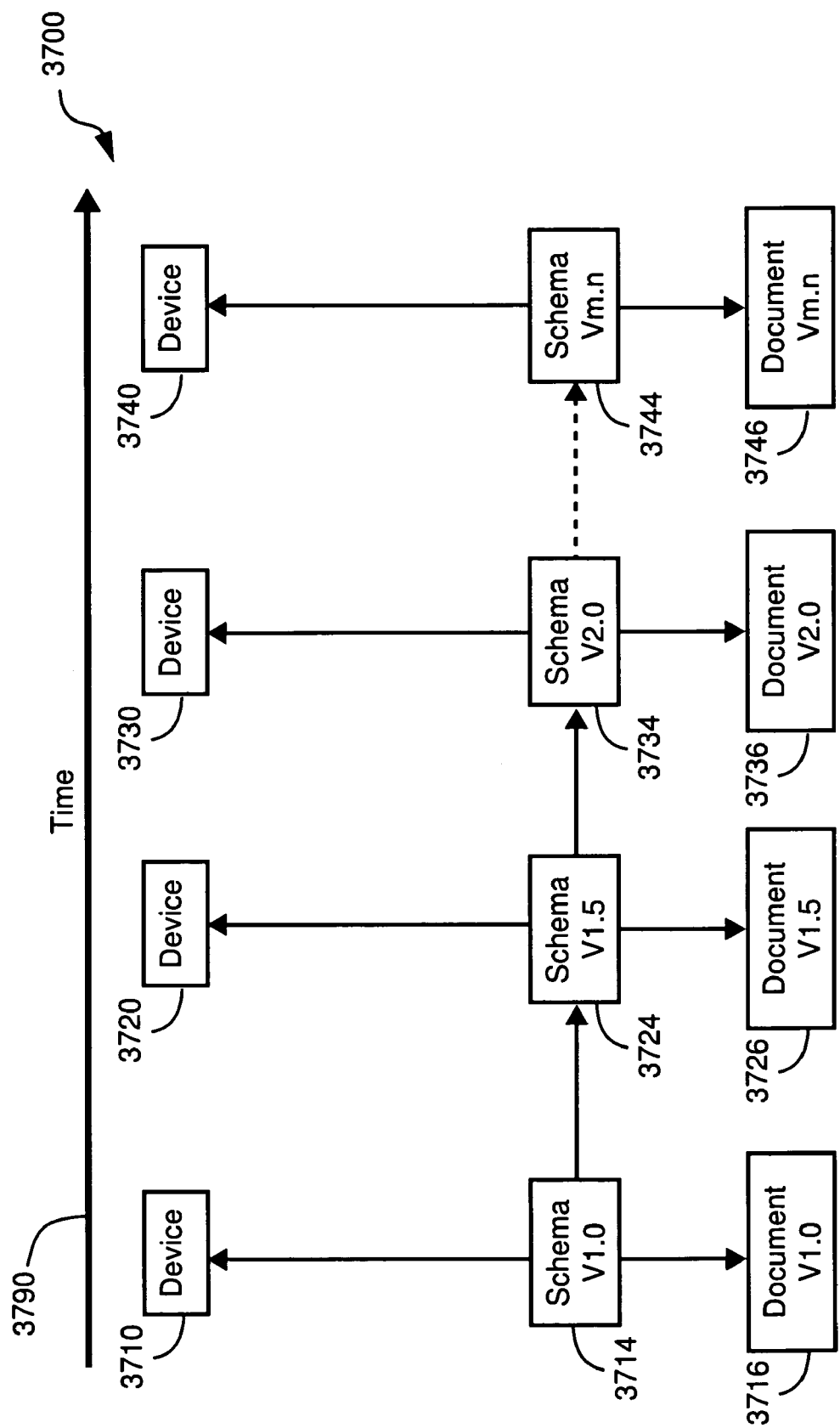
FIG. 37 is a schematic block diagram showing the evolution of a schema.

FIG. 37 is a schematic block diagram representation of a prior art system 3700 illustrating the evolution of a schema. The system 3700 includes first, second, third and fourth generation (version) devices 3710, 3720, 3730 and 3740, respectively, that are introduced at different points of time, as shown by a time axis 3790. The time axis 3790 shows the passage of time across the system 3700 from the first device 3710 to the fourth device 3740, and shows the evolution for devices, schemas and documents over time.

At a first point in time, the first device 3710 coexists with a first document 3716, denoted V1.0, and a first schema 3714, denoted V1.0. An arrow from the first schema 3714 to the first device 3710 indicates that the device 3710 is equipped with a parser conforming to the first schema 3714. Similarly, an arrow from the first schema 3714 to the first document 3716 indicates that the first document 3716 conforms to the first schema 3714.

At a second point in time, the second device 3720 coexists with a second document 3726, denoted V1.5, conforming to a second schema 3724, denoted V1.5. At a third point in time, the third device 3730 and a third document 3736, denoted V2.0, conforming to a third schema 3734, denoted V2.0, exist. At a later, fourth point in time, the fourth device 3740 and a fourth document 3746, denoted Vm.n, conforming to the fourth schema 3744, denoted Vm.n, exist.

The first, second, third and fourth documents 3716, 3726, 3736 and 3746 represent four versions of an XML document as the document evolves over time. Similarly, the first, second, third and fourth schemas 3714, 3724, 3734 and 3744 represent the evolution of an XML schema over time.

In the system 3700 shown, the device 3710 includes a validating parser conforming to the first schema 3714. Documents conforming to the first schema 3714 are parsed and validated. Documents conforming to a new schema, such as the third schema 3734, are generally not accepted by the device 3710, as the device 3710 expects documents that conform to the first schema 3714. Another kind of parsing error arises when the device does not have a validating parser, but due to a change in the schema the parser misinterprets or misses data that is important to the correct output of the device.

A typical device 3710 in a prior art arrangement, when presented with the third document 3736 of a later version of the schema, generally fails to operate correctly, because the third schema 3734 of the third document 3736 is incompatible with the parser of the device 3710. The third document 3736 is based on the third schema 3734, which is marked version 2.0. The integer part of the version number for the third document 3736 is different to the integer part of the version number for the first schema 3714 that the first device 3710 was designed to understand.

A difference in the integer part of a version number is typically used to indicate that the new version is incompatible with any older version. Conversely, the second document 3726 is marked version 1.5. The integer part of the version number for this document is the same as the integer part of the version number for the first schema 3714, which is 1.0. This indicates that the second document 3726, for the prior art, might be parseable by the first device 3710 as the changes to the second schema 3724 are not considered significant, but will fail strict schema validation. Typically, a change of this nature is to add a new element to support some new functionality.

Terminology

Before proceeding with a description of the embodiments, a brief review of terminology is discussed herein. Throughout this document the term device relates to both a device and/or a service. The term metaschema is generally used to define a generic schema that can be mapped into a number of different specific schema languages, like DTD or XML Schema. The usefulness of a metaschema in this usage is to allow the schema designer to write a schema in this metaschema language and have it translated to whatever schema language is in common use at that time.

In respect of the embodiments described herein, a metaschema can be considered as defining a set of schema. A metaschema also defines a similarity score between an original schema and other schemas in the set. XML schemas express shared vocabularies among documents and allow machines to carry out parsing by defining the structure, content and semantics of XML documents. Although a metaschema can be considered somewhat to define the format of an XML document, a metaschema is considered to be a very flexible definition of an XML document, because a metaschema describes a less rigid document format than existing XML schema languages.

Metaschema Syntax

Before continuing the description of the evolution of the metaschema, some information on the metaschema syntax will be provided. When considering schema evolution, one purpose of the metaschema is to constrain the evolution of the schema. The preferred way to describe metaschema syntax is to extend the XML Schema language.

Example 10

```
01  <?xml version="1.0" encoding="UTF-8"?>
02  <xs:schema
03    xmlns:xs="http://www.w3.org/2001/XMLSchema"
04    elementFormDefault="qualified">
05    <xs:element name="document">
06      <xs:complexType>
07        <xs:sequence>
08          <xs:element ref="title"/>
09          <xs:element ref="img"/>
10        </xs:sequence>
11        <xs:attribute name="version" type="xs:decimal"
12          use="required"/>
13      </xs:complexType>
14    </xs:element>
15    <xs:element name="img">
16      <rename newName="*" priority="0.9"/>
17      <relocate newLocation="/document//"
18        priority="0.8" distance="0.1" from="1.1"
19        to="unbounded"/>
20      <xs:complexType>
21        <xs:attribute name="src" type="xs:string"
22          use="required">
23          <rename newName="*" priority="0.1"/>
24        </xs:attribute>
25        <xs:attribute name="date" type="xs:date"
26          use="optional" from="1.5"/>
27      </xs:complexType>
28    </xs:element>
29    <xs:element name="title" type="xs:string" use="required">
30      <retype newType="xs:normalizedString"
31        priority="0.9" from="2.0" use="optional"/>
32      <retype newType="xs:token"
33        priority="0.8" from="1.2" to="2.5"
34        use="optional"/>
35    </xs:element>
36  </xs:schema>
```

Example 10 is a sample metaschema file containing metaschema elements and attributes. The rename element (line 16) indicates that the img element (line 15) can be renamed to any name as indicated by the '*' in the newName attribute (line 16). The value of the newName attribute (line 16) should be any XML Path Language (XPath) compatible expression. This rename element (line 16) also has a priority attribute (line 16) with the value "0.9". Priority values range between the highest 1.0 and lowest 0.0, and indicate the preference for this rule over other rules. The priority attribute can exist in a number of other elements in the XML Schema, especially in the xs:element element. The xs:element on line 15 doesn't have a priority element, and defaults to a priority of 1.0. Example 10 shows only one rename element (line 16) under the img element (line 15), but there can be any number of rename elements. Preferably, different rename elements have different priority values to guide the schema matching and scoring methods to the preferred mapping.

The relocate element (line 17) shows that the img element (line 15) could be moved to a different part of the schema in the future. The newLocation attribute (line 17) is an XPath expression to show the new location, in this case, "/document/P" (line 17), which means that the img element can be moved to any location under the "/document" element. The relocate element also has a priority attribute (line 18) to indicate the preference for moving this element. The relocate element also has a distance attribute (line 18), which is used to set a distance value used in calculating a similarity score. By default, the distance attribute is equal to (1.0−priority), unless otherwise specified. A distance of 0.0 indicates that the document is an exact match to the schema and a distance of 1.0 indicates that if this rule matched the input XML document, then the document is very different to the expected schema. The distance attribute can take on values outside the range of 0.0 to 1.0 in order to have a greater effect on the overall document similarity score.

The from attribute (line 18) is used to provide temporal information to the metaschema, and indicates from which version of the schema the relocate element (line 17) will be valid. In Example 10, the relocate element (line 17) is only valid from schema version 1.1. Thus, the initial version of the schema, 1.0, does not consider the relocation of the img element as valid. From schema 1.1 onwards, the img element can be relocated.

The to attribute (line 19) is used to provide the final schema version where the relocate element (line 17) is valid. In this case, it is "unbounded", the default value when the to attribute is not mentioned. That is, after version 1.1, the img element can always be moved to "/document//img".

The rename and relocate elements described above apply to the img element (line 15) and consequently to the elements below and attributes of the img element, as expected. The xs:complexType element (line 20) is part of the img element. However, this can be overridden by specifying a xs:complexType element below the rename (line 16) or relocate (line 17) elements. This allows finer control of changes that can occur for attributes and sub-elements depending on what the element was renamed to or where it was relocated.

The src attribute (line 21) also has a rename element (line 23). The src attribute can be renamed to anything, but the priority attribute (line 23) is very low, 0.1. This indicates that this type of change is not desired as it will be the last rule to match and will provide a very low similarity score since the distance is equal to (1−priority) by default.

The date attribute (line 25) is not to be renamed or relocated, and is not to exist until the schema is at or after version 1.5. That is, the schema cannot use the date attribute in the img element before version 1.5.

The retype element (line 30) is used to allow evolution of an element or attribute to a new type. In this case, the title element (line 29) can evolve from a xs:string to a xs:normalizedString. This was given the priority of 0.9, quite high, and can only occur from version 2.0 of the schema, due to the from attribute (line 31). Also, the use attribute (line 31) indicates whether this type is required or optional from version 2.0. Any of the metaschema elements can have a use attribute to further restrict their usage.

There is a second retype element on line 32. This shows that from version 1.2 to version 2.5 of the schema, the type of the title element (line 29) can be a "xs:token". Outside these versions, "xs:token" cannot be used. Note that there is some overlap of the type for the title element. Version 2.0 of the schema could be any of "xs:string", "xs:normalizedString" or "xs:token".

As shown by the above explanation, the metaschema can be written by extending the XML Schema language. These extensions follow the philosophy of the XML Schema specification with the purpose of adding options (rename, relocate, retype, etc . . . ) and temporal information for elements, attributes and types. This metaschema can then be used to provide a set of rules for evolving a schema. In an alternate embodiment, the set of constraining rules for evolving a schema are provided within the schema itself.

DETAILED DESCRIPTION OF EMBODIMENTS OF THE INVENTION

The present disclosure provides a set of constraining rules associated with a schema. The constraining rules identify one or more valid changes that can be made to one or more elements and/or attributes of the schema. In one embodiment, the set of constraining rules is included in the schema. In another embodiment, described in greater detail below, the set of constraining rules is included in a metaschema associated with the schema.

Figure 32:
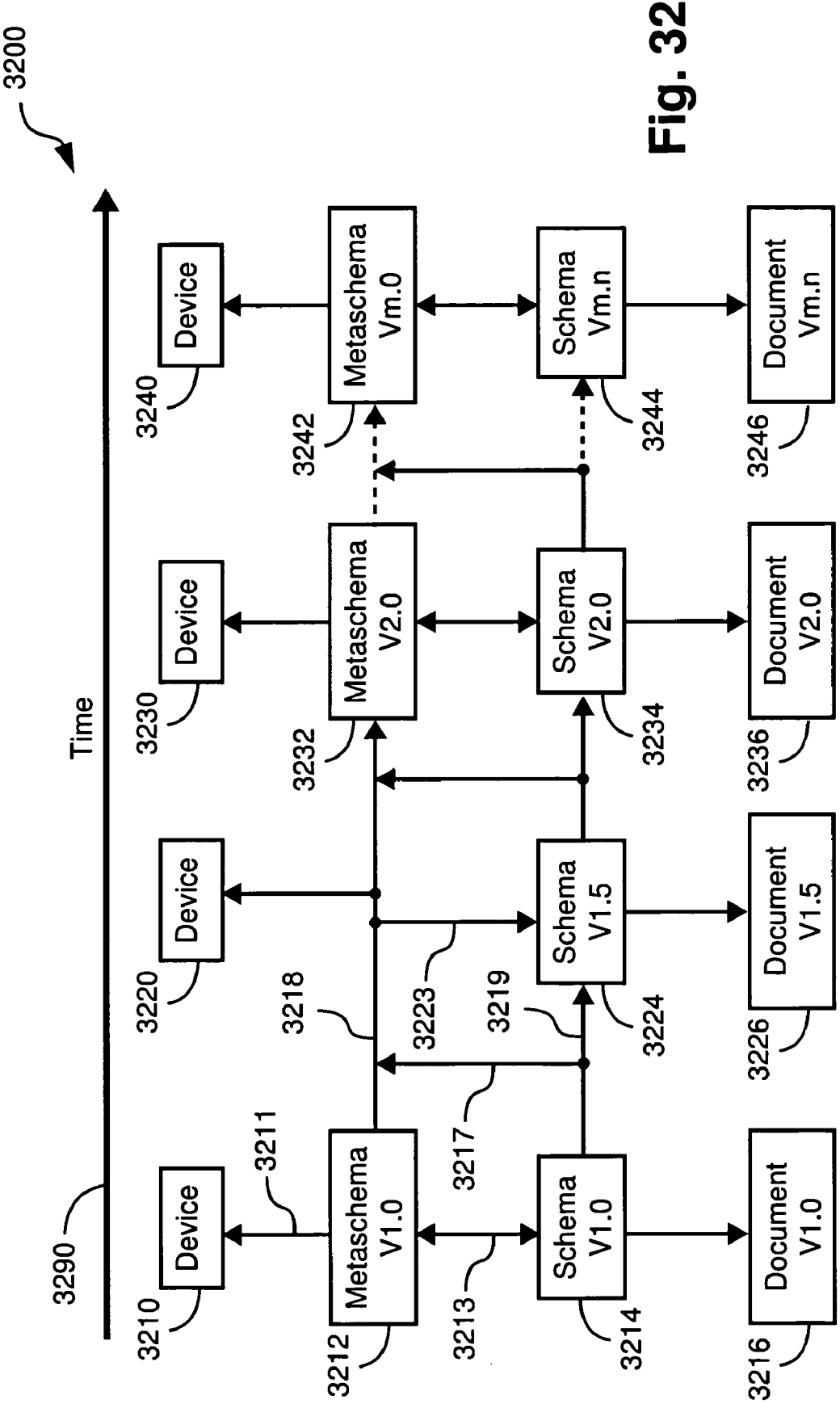
FIG. 32 is a schematic block diagram showing the relationship between a metaschema and derived versions of the schema.
Figure 42:
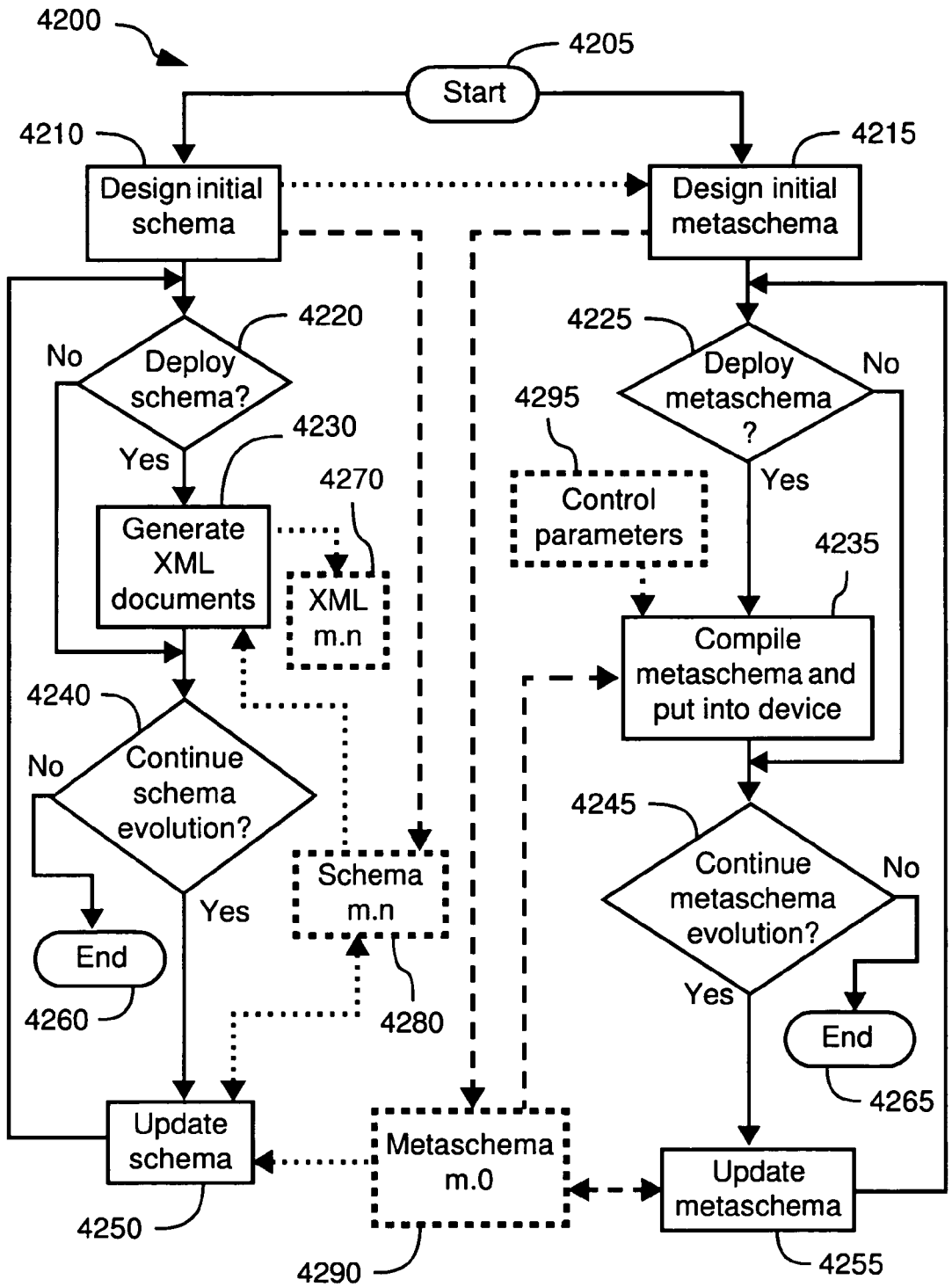
FIG. 42 is a flow diagram showing the evolution and deployment of a schema and metaschema.

FIG. 32 is a schematic block diagram representation of a system 3200 illustrating evolution of a schema and metaschema according to an embodiment of the invention. FIG. 42 is a flow diagram illustrating a method for the evolution and deployment of a schema and metaschema. Both these figures will be referenced through the following overview of a system in accordance with an embodiment of the invention.

The system 3200 includes first, second, third and fourth devices 3210, 3220, 3230 and 3240, respectively, that are introduced at different points of time, as shown by a time axis 3290. The time axis 3290 shows the passage of time across the system 3200 from the first device 3210 to the fourth device 3240, and shows the evolution for devices, schemas, metaschemas, and documents over time.

At a first point in time, the first device 3210, a first document 3216, a first schema 3214 and a first metaschema 3212 exist. At a second point in time, the second device 3220, second schema 3224 and second document 3226 are introduced. At a third point in time, the third device 3230, second metaschema 3232, third schema 3234 and third document 3236 are introduced. At a later, fourth point in time, the fourth device 3240, third metaschema 3242, fourth schema 3244 and fourth document 3246 are introduced.

The first, second, third and fourth documents 3216, 3226, 3236 and 3246 represent four versions of an XML document as the document evolves over time. The system 3200 enables each of the first, second, third and fourth devices 3210, 3220, 3230 and 3240 to work with each of the four versions of the XML document 3216, 3226, 3236 and 3246. Note that there may not be any difference between the first, second, third and fourth devices 3210, 3220, 3230 and 3240. In fact, the first, second, third and fourth devices 3210, 3220, 3230 and 3240 could be the same device at different points in time using only a compiled metaschema derived from the first metaschema V1.0 3212. There is no requirement for a device to evolve over time, just because a schema evolves.

There is no particular order for defining the first schema 3214 and first metaschema 3212, as shown by a double-headed arrow 3213 in FIG. 32 that joins the first schema 3214 and the first metaschema 3212. Typically, the first schema 3214 is defined before the first metaschema 3212, or both the first schema 3214 and the first metaschema 3212 are defined at the same time. However, in an alternate embodiment, the first schema 3214 information is fed into the metaschema 3212 design process.

The first schema 3214 is the first version of the schema in this example and is denoted Schema V1.0. Similarly, the first metaschema 3212 is the first version of the metaschema for this example and is denoted Metaschema V1.0. In a preferred embodiment, design of the first metaschema V1.0 3212 commences as the design of the first schema V1.0 3214 concludes.

The design of the first metaschema V1.0 3212 is based on the expected and allowable changes to the first schema V1.0 3214. The design of a metaschema is explained in more detail later.

After the first metaschema V1.0 3212 has been designed, the first metaschema 3212 is compiled into a parser specific format, called a compiled metaschema. This is described in greater detail later with respect to FIG. 36. An arrow 3211 from the first metaschema 3212 to the first device 3210 denotes the passing of the compiled metaschema to a metaschema-based parser residing in the first device 3210. This compiled version of the metaschema 3212 is either built into the first device 3210 at the time of manufacture or is dynamically downloaded at any time during the life of the first device 3210. The first document 3216 conforms to the first schema 3214, depicted by an arrow from the first schema 3214 to the first document 3216.

In known arrangements, an XML parser is based on the first schema 3214 for the expected first document 3216. In the embodiment of FIG. 32, the metaschema-based parser residing in the first device 3210 is based on the first metaschema 3212, instead of the first schema 3214. It is to be noted that when developing the first schema 3214, first metaschema 3212, first device 3210 and first document 3216, the future schemas 3224, 3234 or 3244 do not yet exist. Accordingly, the definition of the first metaschema is based on a prediction of the manner in which future schemas are likely to evolve from the first schema. In an alternate embodiment, not shown, the schema itself includes constraints within which elements and attributes can be changed, based on a prediction of the manner in which future schemas are likely to evolve from the first schema. In such an alternate embodiment, there may or may not be a metaschema associated with the schema.

Returning to FIG. 32, an arrow 3219 from the first schema 3214 to the second schema 3224 represents the evolution of the schema from the first point in time to the second point in time. At the second point in time, minor changes are introduced to the first schema 3214 to produce the second schema 3224, denoted Schema V1.5. An arrow from the second schema 3224 to the second document 3226, denoted Document V1.5, indicates that the second document 3226 conforms to the second schema 3224.

It could be expected that the first metaschema V1.0 3212 would be the only metaschema that needs to exist. However, FIG. 32 shows that the second metaschema 3232 exists at a third point in time and is denoted Metaschema V2.0. An arrow 3218 connects the first metaschema 3212 to the second metaschema 3232 to denote the evolution of the metaschema and show that the first metaschema 3212 is used in the design of the second metaschema 3232.

The second metaschema 3232 is needed when new functionality and information is added to the third schema 3234. Typically, a version 2.0 device implies a change in functionality that is not backwards compatible with earlier versions. Thus, in FIG. 32, the second metaschema V2.0 3232 is written to provide rules for this new information in the schema. The second metaschema 3232 is connected to the third schema 3234 by a double-headed arrow, for the same reason explained above in respect of the first schema 3214 and first metaschema 3212. An arrow from the second schema 3224 to the third schema 3234 indicates evolution of the schema and that the second schema 3224 is used in the design of the third schema 3234. An arrow also joins the second schema 3224 to the second metaschema 3232 to show that the preceding schema version is used when designing a revised metaschema. An arrow from the third schema 3234 to the third document 3236 indicates that the third document 3236 conforms to the third schema 3234.

FIG. 32 also shows third metaschema 3242, denoted Vm.0. This is to show that a new metaschema could be written for any version of a schema. In some cases, it may be decided that a new metaschema should be written, possibly just to increase a similarity score calculated for earlier versions of the schema, or to provide a more strict (or more relaxed) validation of a received document. The new metaschema is likely only to be compiled into new devices. Existing devices are likely to be using an older version of the metaschema. This should be kept in mind when considering generating a new metaschema. The third metaschema 3242 is shown with a dotted line, because the third metaschema may or may not exist, depending on whether the second metaschema 3232 evolves. An arrow joins the second metaschema 3232 to the third metaschema 3242. Separate arrows join the third schema 3234 to the fourth schema (Vm.n) 3244 and the third schema 3234 to the third metaschema 3242 to show that the preceding schema and metaschema versions are used when designing revised schemas and metaschemas.

The version numbers of the metaschemas are shown in FIG. 32 as progressing in integer steps from V1.0 to 2.0 to m.0. It will be appreciated by a person skilled in the art that the integer steps shown are arbitrary, and are used in this example for clarity to ease understanding. It will be readily understood that non-integer version numbers, such as V1.5, are also envisaged and may be used, for example, to denote a new metaschema that introduces minor modifications to a previous metaschema.

The interaction of the various components of the system 3200 of FIG. 32 will now be described with reference to FIG. 42 that illustrates a flow diagram 4200 of a method for the evolution and deployment of the schema and metaschema of FIG. 32. The flow diagram 4200 for developing schemas in this future-proof system begins at step 4205, Start, of FIG. 42. Control passes from step 4205 to two, parallel processes corresponding to development of the schema and metaschema, respectively. In the first process, control passes from step 4205 to step 4210 to design the initial schema. A schema Vm.n 4280 is shown as a dotted line box connected by a dotted arrow from step 4210 and represents the output of step 4210. Once the initial schema has been designed, control passes from step 4210 to decision step 4220 that determines whether the schema 3214 is deployed. If the schema is not to be deployed at step 4220, "No", control passes to decision step 4240, which is described below. If the schema is to be deployed at step 4220, "Yes", control passes to step 4230 in which one or more XML documents are generated using existing deployed schemas. A sample XML document Vm.n 4270 is shown as a dotted line box connected to step 4230 by a dotted line, and is representative of the output of step 4230. With reference to FIG. 32, the first document 3216 is generated based on the first schema 3214, which is shown in FIG. 42 by a dotted arrow from the schema 4280 to the step 4230.

Control passes from step 4230 to decision step 4240, which determines whether to continue evolution of the schema. If no evolution of the schema is to occur, "No", control passes to a terminating step 4260. If the schema is to evolve, "Yes", control passes from step 4240 to step 4250, which updates the schema. A dotted, double-headed arrow connects the schema 4280 to step 4250 to illustrate that the existing schema is used in the generation of an updated schema. Further, a dotted arrow from a metaschema 4290 to step 4250 illustrates that an existing metaschema can also be used as an input to the generation of an updated schema, as in the embodiment shown the metaschema controls the manner in which a schema can evolve. Control returns from step 4250 to step 4220, which determines whether or not to deploy the updated schema, as described above in respect of the initial schema.

In respect of the development of the metaschema, control passes from step 4205 to step 4215 to design the initial metaschema. The metaschema Vm.0 4290 is shown as a dotted line box connected by a dotted arrow from step 4215, showing that the metaschema 4290 is the output of step 4215. A dashed line connecting step 4210 to step 4215 shows that the initial design of the schema affects the initial design of the metaschema. Once the initial metaschema has been designed, control passes from step 4215 to decision step 4225 that determines whether the metaschema 3212 is deployed. If the schema is not to be deployed at step 4225, "No", control passes to decision step 4245, which is described below. If the schema is to be deployed at step 4225, "Yes", control passes to step 4235 in which the metaschema is compiled and placed into the device 3210 for use by a parser. A dotted arrow connects the metaschema 4290 to step 4235, showing that the metaschema 4290 is an input to step 4235. Step 4235 may include a translation/compilation step to convert the metaschema information, such as that shown in Example 10, to a form used by the parser, as described later with reference to FIG. 36. The compilation step 4235 may require extra control parameters 4295 that are not provided by the metaschema to be received from an external source. For example, the compiled metaschema may select only the first matching element from a group of elements that match the rule; this extra information is shown by a dotted line connecting the control parameters 4295, shown as a dotted line box, to step 4235.

Control passes from step 4235 to decision step 4245, which determines whether to continue evolution of the metaschema. If no evolution of the metaschema is to occur, "No", control passes to a terminating step 4265. If the metaschema is to evolve, "Yes", control passes from step 4245 to step 4255, which updates the metaschema. A dotted, double-headed arrow connects the metaschema 4290 to step 4255 to illustrate that the existing metaschema is used in the generation of an updated metaschema. Control returns from step 4255 to step 4225, which determines whether or not to deploy the updated metaschema, as described above in respect of the initial metaschema.

Returning to FIG. 32, the process of designing the second schema V1.5 3224 is no longer solely based on the first schema V1.0 3214, shown by an arrow 3219 from the first schema 3214 to the second schema 3224. Design of the second schema 3224 is also dependent on the first metaschema V1.0 3212, shown by an arrow 3223 from the first metaschema 3212 to the second schema 3224 in FIG. 32. FIG. 32 shows different versions for these metaschema, because it is possible that the metaschema can be enhanced over time to provide better scoring and access to new information for new schema versions. This is because more is known about the schema evolution as time goes on.

In this example, the enhancements result in minimal changes to form the second schema V1.5 3214. The changes to the second schema 3224 do not require any amendments to the first metaschema 3212. This is represented in FIG. 32 by the second point in time not having a different metaschema and thus the first metaschema 3212, introduced at the first point in time, remains in use.

The first metaschema V1.0 3212 is used in the design of the second schema V1.5 3224 shown by flow 3223. Metaschema V1.0 3212 can be considered as providing a list of assumptions and rules for how future schema are defined. Thus, the first metaschema V1.0 3212 is consulted for how the first schema V1.0 3214 should change to become the second schema V1.5 3224. This system works because schema design is generally very flexible and allows the same information to be organised in a number of different ways. The first metaschema V1.0 3212 can be considered as a list of allowable (and restricted) changes that can be applied to the first schema V1.0 3214. Using this system, the first schema V1.0 3214 is limited in the ways in which it can evolve into second schema V1.5 3224.

Returning to FIG. 42, the process of updating the schema in step 4250 and the process of updating the metaschema in step 4255 can occur in parallel or in any order. Note that the schema updated from step 4250 may feed into the generation of XML documents in step 4230 using the new schema if the new schema is deployed at step 4220.

The step of putting the compiled metaschema into a device 4235 is only required once. As a schema evolves to a new version, it may be desirable to update the device with an updated compiled metaschema. Thus, after the initial design of the metaschema 4215, the process of evolving the schema 4250 could occur without updating the device 4235.

A document source typically generates an XML document 4230 conformant to the highest version of a schema that the document source understands. Apart from some extensions described later, step 4230 follows the same method as the prior art for XML document generation. Embodiments seek to improve the parsing of XML documents, rather than the actual generation of XML documents.

A system in accordance with the invention enables devices provided with an XML parser to parse documents based on a currently understood schema as well as documents based on a set of predefined changes to the currently understood schema. New schemas are defined based on a previous schema and the set of allowed changes to the schema, as governed by a metaschema. Thus, the parser and schema both conform to the same set of possible schemas parseable by the parser.

Figure 31:
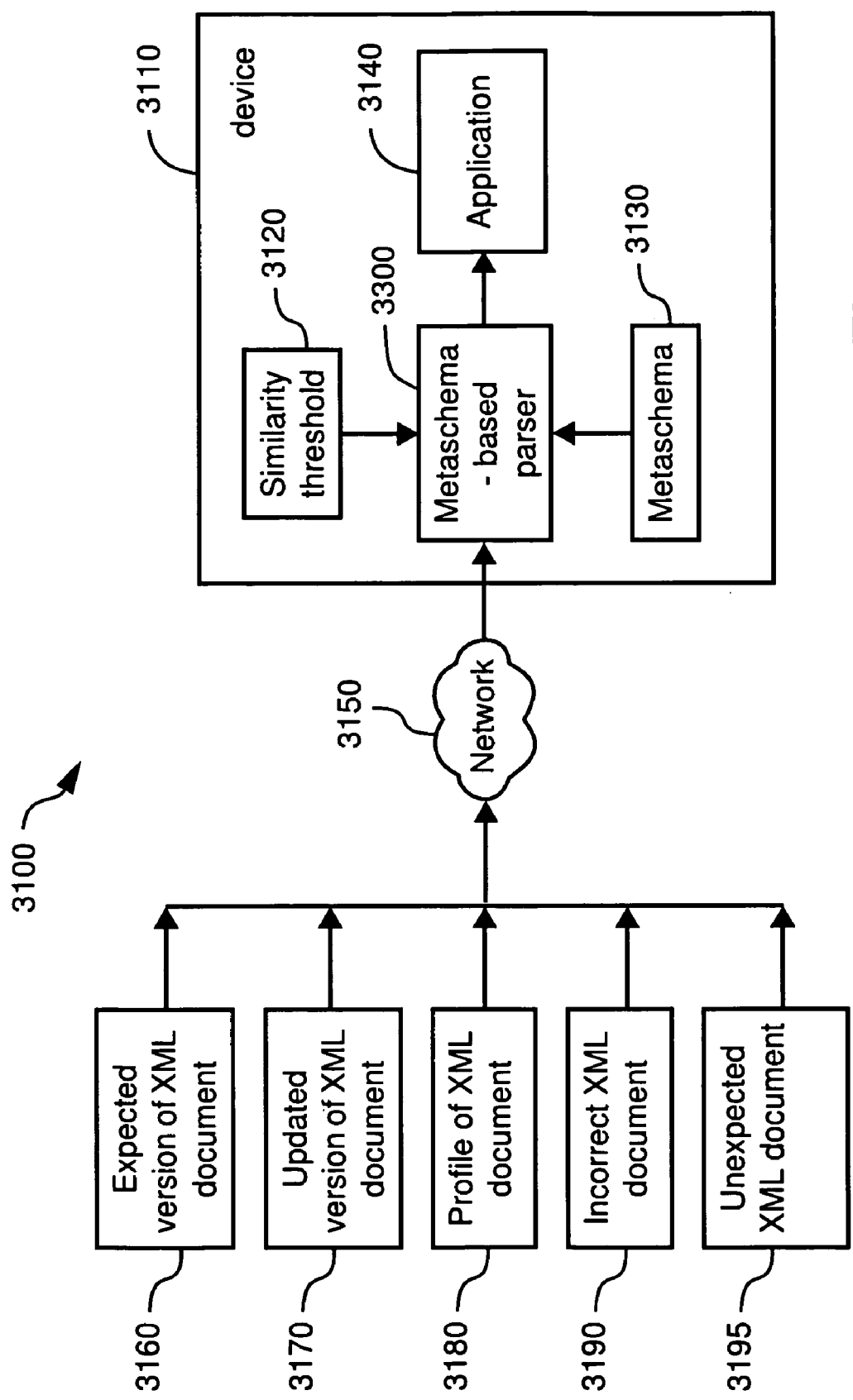
FIG. 31 is a schematic block diagram showing a device with a metaschema-based parser and different types of documents that can be processed by the device.

FIG. 31 is a schematic block diagram showing a system 3100 including a networked device 3110 equipped with a metaschema-based parser 3300. The device 3110 is representative of the device 3210 from FIG. 32, and is able to process document types 3160, 3170, 3180, 3190, and 3195, preferably via a network 3150.

The device 3110 also includes an application 3140 that uses information from a received XML document. In the case of the printer 3010 from FIG. 30, the application 3140 is the software inside the printer that accepts an image, renders and controls the hardware to print the image. The device 3110 also has a similarity threshold value 3120 that provides a threshold to the metaschema-based parser 3300 to determine whether to accept or reject a received XML document. The device 3110 further includes a metaschema 3130 that is used to control the mapping of a received document to an expected schema and to calculate a similarity score. The metaschema may be compiled, and is presented to the metaschema-based parser 3300.

The document types 3160, 3170, 3180, 3190 and 3195 are typically sent across the network 3150 from other devices (not shown). In other embodiments, one or more of the documents are provided to the device using a compact disc or other types of storage media. A first document type 3160 represents an expected version of an XML document. A prior art device works with such a document 3160 that was generated using the same schema that the parser 3300 of the device 3110 was designed to understand.

A second document type 3170 represents a newer version of the XML document, a third document type 3180 represents a different profile of the XML document, a fourth document type 3190 represents an incorrectly generated XML document that was generated with incorrect element/attribute names or having elements/attributes placed in the wrong location in the document, and a fifth document type 3195 represents an unexpected XML document that was not designed to work with the device 3110 at all. Using the metaschema-based parser 3300 and appropriately defined metaschema 3130, all of these XML documents types 3160, 3170, 3180, 3190, 3195 can be successfully parsed by device 3110.

The operation of the metaschema-based parser relies on a method that can provide a mapping between an input XML document and a known schema, as well as a method that can provide a similarity score to provide an indication of how closely the input XML document matches the known schema. Methods exist to perform these two functions. For example, a document to schema mapping can be performed by some XML editors, such as XMLSpy. XMLSpy receives an input document and generates a schema. However, manual fine-tuning of such a generated schema is often required. A graph can be generated from an input XML document. A graph matching algorithm is then applied to map nodes on the graph and calculate a distance. Although methods exist to perform these two functions, the known methods are typically used for off-line processing and are not designed for resource-constrained devices, nor are such methods intended for future-proofing devices. Thus, the method and system for the preferred embodiment are preferably implemented using a memory-efficient rule-based XML parser. In a preferred embodiment, the rule-based XML parser provides a document-to-schema mapping, as well as providing a similarity score.

Note that the rule-based XML parser is designed to provide easy access to information in the XML document, while being very efficient in the consumption of memory and processing resources. In fact, the rule-based parser provides an efficient means of implementing the metaschema-based parser, while providing rules that can be based on XPath-like expressions.

Rule-Based Parser

The metaschema format used in this disclosure is a compiled metaschema based on the format of the rules for a rule-based XML parser. An overview of the operation of the rule-based XML parser will now be provided. A more detailed description of the rule-based XML parser is provided earlier in this document with reference to FIGS. 1 to 29.

Figure 38:
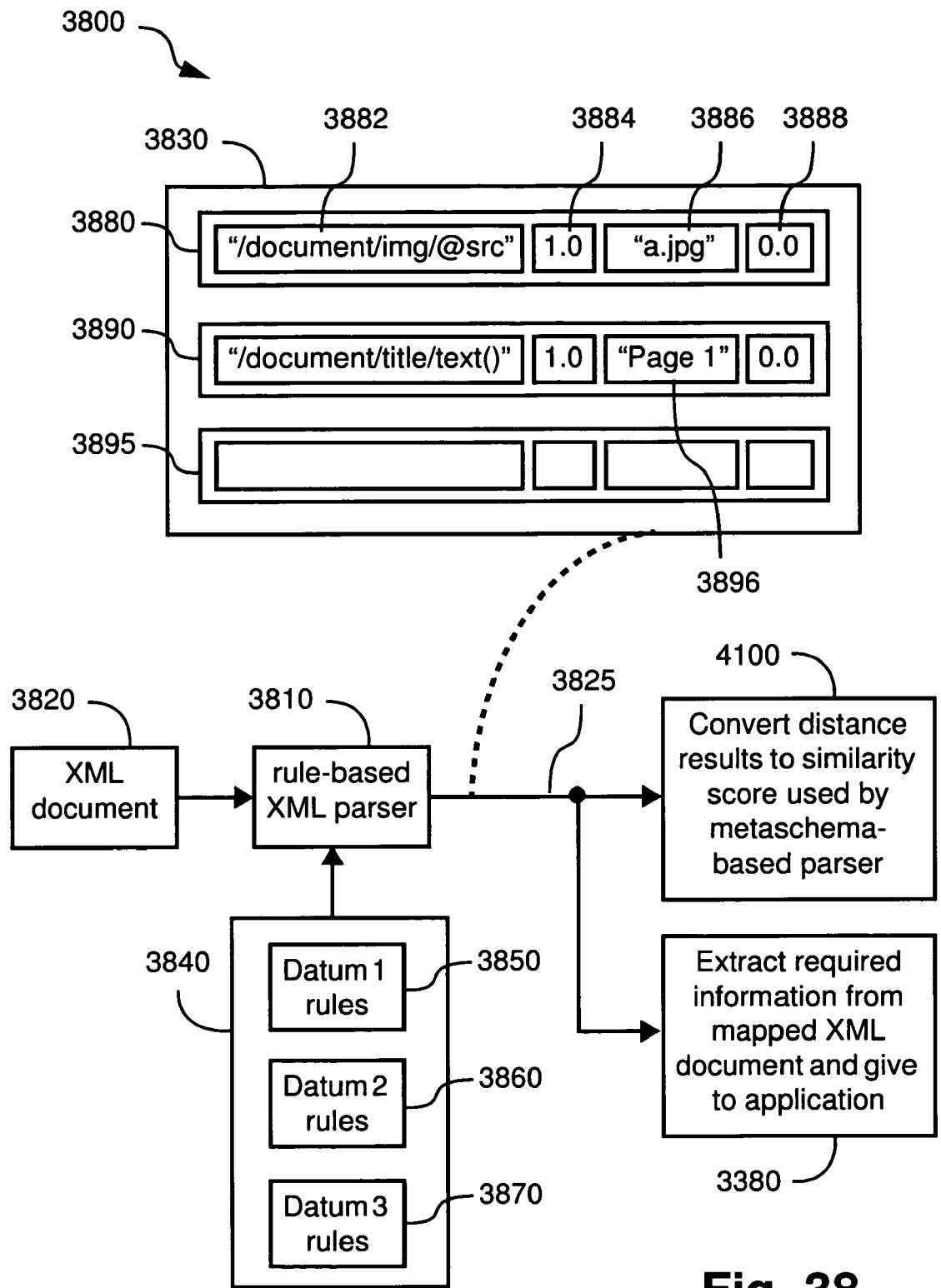
FIG. 38 is a schematic block diagram representation showing the operation of a rule-based XML parser.

FIG. 38 is a schematic block diagram representation 3800 depicting the operation of a rule-based XML parser 3810. The rule-based XML parser 3810 receives an XML document 3820, equivalent to the document shown in Example 1. The parser 3810 also receives a data rule set 3840 that includes one or more datum rule sets. In this example, the data rule set 3840 includes datum 1 rules 3850, datum 2 rules 3860 and datum 3 rules 3870. The purpose of the data rule set 3840 is to provide a set of rules that return a required datum. For example, the datum returned is information in an element or attribute. Depending on the rule provided, the datum returned is information returned from a group of related elements or attributes. The data rule set 3840 is obtained from a compiled metaschema (not shown).

The rule-based XML parser 3810 has two main modes of operation. A first mode, the inclusive mode, allows different rule sets to match the same data, as occurs with normal XPath operation. A second mode of operation, the exclusive mode, requires each rule set to match data exclusively. In a preferred embodiment, a metaschema-based parser utilises this second mode of operation.

The parser 3810 parses the document 3820 and compares the document 3820 to the data rule set 3840. Using the data rule set 3840, the rule-based XML parser 3810 finds the required data and passes resulting information 3830 to each of a data extraction unit 3380 and similarity score calculation unit 4100. The resulting information 3830 contains a set of datum results 3880, 3890 and 3895, one result for each datum rule set 3850, 3860, 3870 in the data rule set 3840. Each of the data extraction unit 3380 and the similarity score calculation unit 4100 are parts of a metaschema-based parser. The interaction among the rule-based parser 3315, the data extraction unit 3380 and the similarity score calculation unit 4100 within the metaschema-based parser 3300 is described later with reference to FIG. 33.

Figure 39:
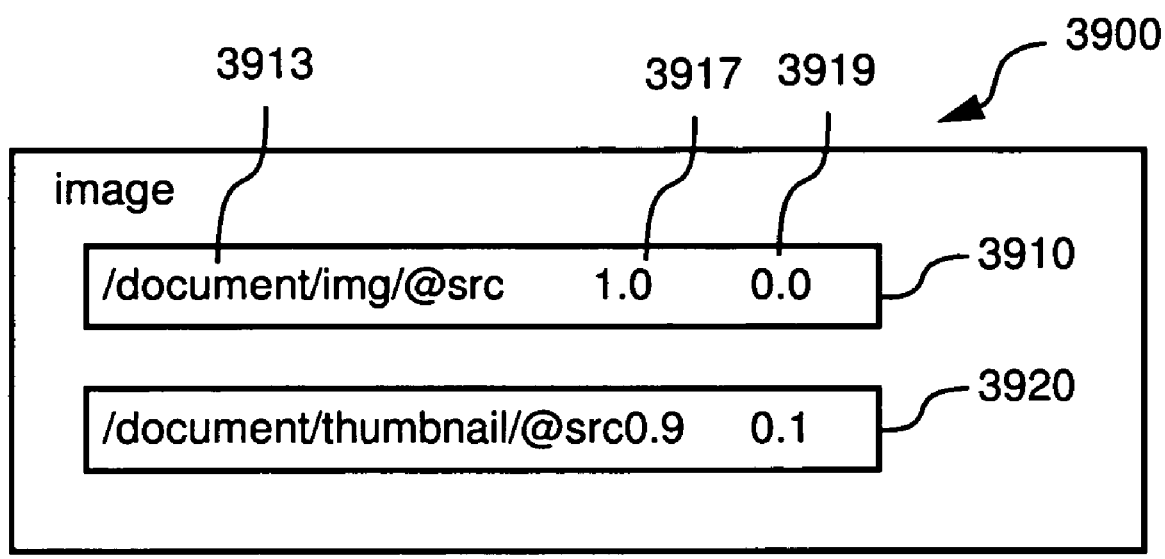
FIG. 39 is a schematic block diagram representation of an example rule set.

FIG. 39 is a schematic block diagram depicting an example of a datum rule set 3900. The datum rule set 3900 includes a set of rules for retrieving the src attribute from the received XML document shown in Example 1. The src attribute is part of the img element (line 04). The datum rule set 3900 includes a first rule 3910 comprising an XPath expression 3913 for the src attribute, "/document/img/@src", the priority of the rule 3917, set to a value of 1.0, and a user data field 3919, set to 0.0, that is made available by the rule-based XML parser for the application to store application related information. The rule priorities are ordered so that the highest value is the highest priority. In a preferred embodiment, priority values range between normalized values of 0.0 (lowest) to 1.0 (highest). Further, the user data field 3919 is used by the metaschema-based parser to store a distance value for a particular rule. That is, the distance is typically 0.0 for rules that exactly match the schema, and the distance is typically greater than 0.0 for rules that match more than one schema. Further detail regarding the priorities will be provided later.

Datum rule set 3900 also includes a second rule 3920. The second rule 3920 includes an XPath expression for the src attribute of a thumbnail element. The priority for the second rule is set, in this example, to 0.9 and the user data field is set to a value of 0.1. The intention of this datum rule set is to return the URI of an image. The rules 3910, 3920 in the datum rule set 3900 show all the different locations in the received XML document where this information might be found, according to the expected schema of the input document. In the example document in Example 1, there is no thumbnail element, so rule 3920 fails to match.

When the datum rule set 3900 of FIG. 39 is presented to the rule-based parser 3810 of FIG. 38, the rule-based XML parser 3810 tries each of the rules 3910, 3920 in the datum rule set 3900. Particular, practical implementations may be adapted to identify some optimizations and not actually try all the rules. The rule with the highest priority is then selected from the list of matching rules. In the case of parsing the XML document in Example 1, only the first rule 3910 matches. The first rule 3910 is also the rule with the highest priority of 1.0, so the first rule 3910 is selected as the matching rule.

The rule-based XML parser 3810 is designed to process documents where the application requires a number of different types of data from the document. The same processing as described for datum rule set 3900 applies to the first, second and third datum rule sets 3850, 3860 and 3870 in the data rule set 3840.

The first datum result 3880 has components that contain a rule item 3882 that matched "/document/img/@src", a priority item 3884 of the rule that matched "1.0", a data item 3886 "a.jpg" extracted from the XML document, and a field value 3888 "0.0" that the application set previously. Note that this description is for the rule-based XML parser that is embedded within a metaschema-based parser.

Compiled Metaschema

Now that the operation of the rule-based XML parser has been described, some more information about the compiled metaschema will be provided. The compiled metaschema will be described in terms of rules for the rule-based XML parser and for the schema evolution. By carefully defining a set of rules and priorities for each datum rule set, the rule-based XML parser is used to perform an XML document-to-schema mapping, as well as extracting required information in a one-pass parse of the XML document. However, the rule-based XML parser does not directly perform the XML document-to-schema similarity calculation. This is achieved by using an extra field value 3888 provided for application data. The extra field value is set to a distance value, which represents how different the given rule is to the expected document. The distance values are typically normalized to be between 0.0 and 1.0, where 0.0 means that the rule is an exact match. That is, the XML document is an exact match to the expected schema. A distance value of 1.0 indicates that the XML document is very different to the expected schema.

Since there is typically a number of elements to be extracted from the XML document, a number of different datum rule sets is required. Each of these datum rule sets may match the XML document, so there is likely to be a number of different distance values returned after parsing a document. The XML document distance value is calculated as a kind of average of each datum rule set's distance value.

From the XML document's distance value, the XML document's similarity value is calculated, as in step 4100 of FIG. 38, as similarity=1.0−document-distance The similarity value is 1.0 when the XML document is considered to match the expected schema and 0.0 when the XML document is considered very different from the expected schema. Normally for each rule, the rule priority can be expected to be (1−distance).

As described above, FIG. 39 shows an example datum rule set 3900 containing first and second rules 3910, 3920. For each of the first and second rules, the rule priority 3917 is given by the expression [1−distance(3919)]. Although that is typically the case, it is not required. In fact, having the flexibility of not setting the rule priority as a function of the distance can be very useful, as will be explained later. Also, the distance value can be larger than 1.0, as will also be explained later.

Figure 36:
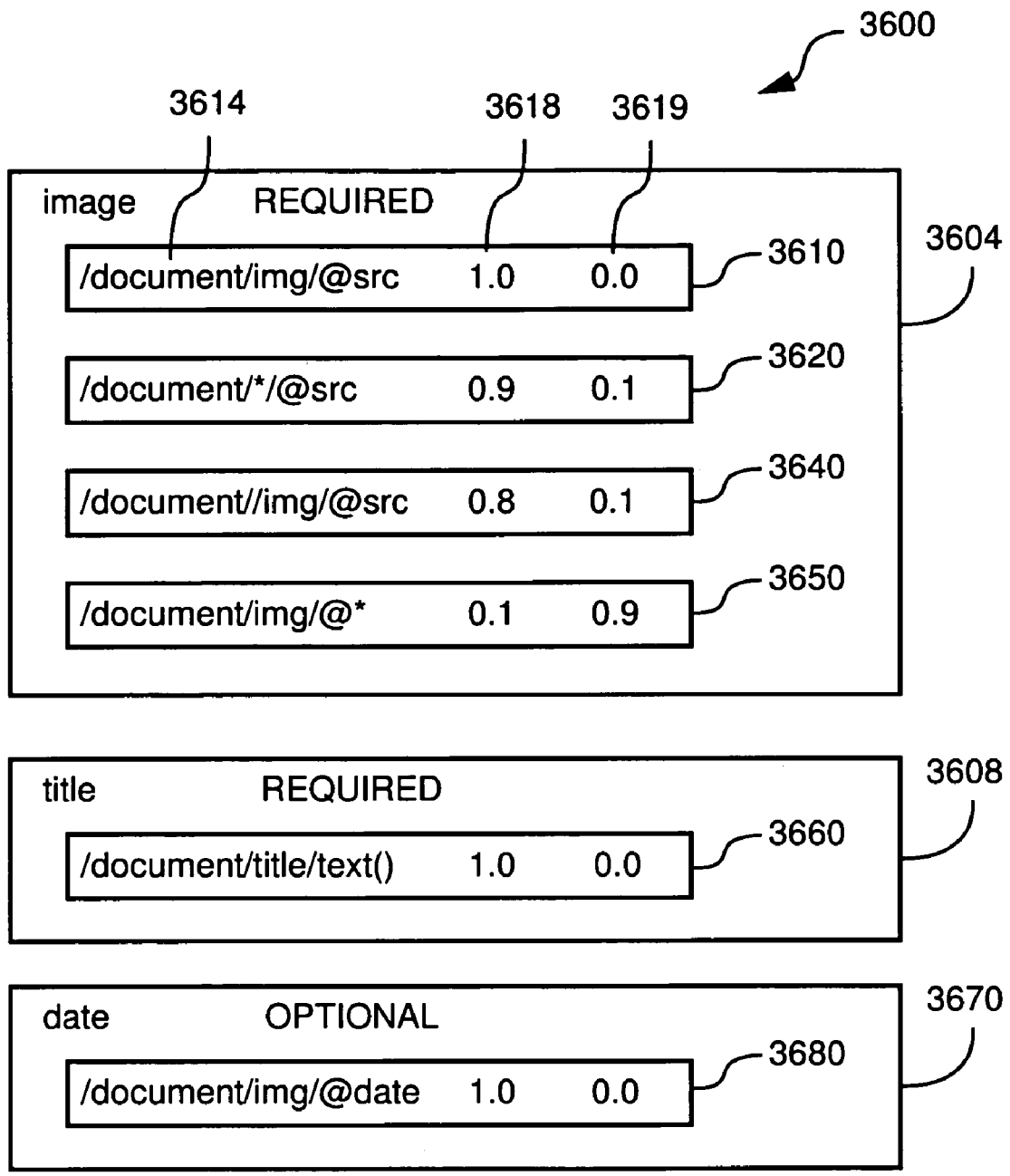
FIG. 36 is an example compiled metaschema based on the example XML schema in Example 2.

FIG. 36 is an example compiled metaschema 3600 based on the example XML schema of Example 2. The compiled metaschema 3600 is a way to define a set of likely variations of a schema over time. The compiled metaschema 3600 effectively defines a set of different schema. For each schema, the compiled metaschema 3600 provides a degree of the similarity of that schema to an original schema (or distance of that schema from an original schema).

For the following discussion, the XML schema shown in Example 2, the XML document shown in Example 1 and a new version XML document shown in Example 3 are used to describe the development of the compiled metaschema and implementation of the metaschema-based parser.

The compiled metaschema 3600 was designed by considering expected changes to the XML schema of Example 2. In the example presented here, the schema designers start with the XML schema shown in Example 2 as a preferred schema for the XML document shown in Example 1. For the printer 3010 example, both the img element's src attribute (Example 1 line 04) and the title element's text (Example 1 line 03) need to be extracted. Accordingly, the compiled metaschema 3600 of FIG. 36 includes a first datum rule set 3604 directed to the img element and a second datum rule set 3608 directed to the title element.

The first datum rule set 3604 includes a first rule 3610 that includes an XPath expression "/document/img/@src" 3614, a rule priority 3618 set to "1.0", and a rule distance 3619 set to "0.0". The XPath expression "/document/img/@src" 3614 describes the path to the src attribute in the img element in Example 1, line 04. This path is used by the rule-based XML parser, and for the XML document shown in Example 1, the XML parser returns the value "a.jpg" from the img element (Example 1, line 04). The priority value 3618 is set to "1.0", and this value is used by the rule-based XML parser to indicate that this is the highest priority rule to be matched. Thus, the matching of this rule has priority over all other rules. The distance value 3619 of "0.0" indicates that the information found in the received XML document was in the place where it was expected to be found, and thus this part of the XML document matches the expected schema exactly.

The first datum rule set 3604 in the compiled metaschema 3600 is marked as required. This means that the application requires this information to be extracted from the received XML document. If there is no matching information to be extracted, then the document is rejected, because the application doesn't have enough information to perform the required operation. The alternative is to mark the first rule set 3604 as optional. This means that the information should be extracted if it can be found, otherwise the first datum rule set 3604 is ignored. The optional flag is very useful when adding more rule sets that help with the similarity calculation, but when the actual data from the document is not required. This is because the rule set is used in the similarity calculation when a match is found; otherwise the rule set is ignored and not used in the similarity calculation.

The second datum rule set 3608 includes a second rule 3660 that is used to extract the page title. The second rule 3660 includes an XPath expression, priority value and distance value. In this case, rule 3660 includes the XPath expression "/document/title/text( )" to extract the text within the title element (Example 1, line 03), a priority value of "1.0" to indicate that this is the preferred rule to match and a distance value of "0.0". For the XML document shown in Example 1, the rule-based XML parser returns a priority value of "1.0", the text within the title element, "Page 1" (Example 1, line 03), and a distance value of "0.0". The second datum rule set 3608 containing the second rule 3660 is also marked required, so the title element must exist for this XML document to be considered valid.

In order to extract the date attribute, a third datum rule set 3670 containing a third rule 3680 is written. The third rule 3680 includes an XPath expression "/document/img/@date", a priority value "1.0" and a distance value "0.0". Example 2, at lines 19 and 20, indicates that the date attribute is optional and thus is not required to be in the XML document. Thus, the third datum rule set 3670 is marked as optional. The example XML document in Example 1 does not use this attribute and consequently there is no match for rule 3680.

Based on the compiled metaschema design so far, that includes a compiled metaschema 3600 with first, second and third rules 3610, 3660 and 3680, respectively, the metaschema-based parser only validly parses documents conforming to the XML schema shown in Example 2. That is, if the metaschema-based parser parses the XML document shown in Example 3, the XML document fails, because the img element has been renamed to page (Example 3 line 04) and the first datum rule set 3604 is a required rule set. Thus, the parser defined so far performs in a similar way to the parsers in the prior art, and is a very rigid parser.

This parser has the advantage that extracting the required information from the XML document is made much easier by providing XPath expressions for the information required. The application does not have to deal with SAX events or stepping through a Document Object Module (DOM) tree. The information returned so far has been minimal. If the underlying rule-based XML parser is memory-efficient, the metaschema-based parser is memory-efficient.

The next part in the compiled metaschema 3600 design is to determine types of changes that are expected in the XML schema. This has traditionally been considered a difficult problem. When actually working on a schema design, there is typically a number of changes that can be expected in future versions of the schema. Further, a particular metaschema can be designed to be strict or loose, depending on the application. The description of the compiled metaschema 3600 so far provides a strict metaschema that parses a document conforming to the XML schema shown in Example 2. Note that the defined metaschema also allows new elements to be added to the document and ignored, since there are no rules that match the new elements.

Continuing the design of the compiled metaschema 3600, the schema designers always expect the document element to be in the XML document in future versions of the schema. Further, the designers always expect the src attribute to have the name src. However, for the schema shown in Example 2, the designers are unsure whether the img element will always be named img. Accordingly, the schema designers designed the schema (shown in Example 2) to use lower case letters for elements and attributes, but knowing in the future they might change the schema to follow the DIG-35 standard and use capital letters, thus possibly having an IMG element replace the img element (Example 2, line 15). The designers also considered that in the future this element could be replaced with a generically named object element. Because of this uncertainty, the designers decided that compiled metaschema 3600 should also match/document/*/@src, but the priority is slightly lower at "0.9" and the distance value of "0.1". This is shown in the first datum rule set 3604 of FIG. 36 that includes a fourth rule 3620 including those attributes. Note that in the fourth rule 3620, the '*' character indicates that the rule will match any element. Also, the '@' character indicates matching an attribute instead of an element.

During the design of the schema shown in Example 2, the schema designers considered that the schema could have been more structured, where the img element could have been placed under a content or similarly named element. However, at the time there was no need to add another level of nesting, as nesting provided no value and only made the XML document more complicated. Still, knowing that the schema could evolve into this, the schema designers added a fifth rule 3640 to the first datum rule set 3604 of the compiled metaschema 3600.

The fifth rule 3640 includes the XPath expression "/document//img/@src", which means that the image information can be found anywhere under the document element, as long as the image information is in the form "img/@src". The likelihood of such an event occurring is not considered to be high, but if it did occur, it should be considered as a valid schema, so the schema designers assign this fifth rule 3640 a priority value of "0.8" and a distance value of "0.1". Thus, the fifth rule 3640 has the same distance value as the fourth rule 3620, because the fifth rule 3640 is considered to be an equally valid change as renaming the img element, and thus a document with this change should give the same similarity value as a document with a renamed img element. However, the priority of the fifth rule 3640 is lower than for the fourth rule 3620, because renaming the img element is considered the preferable change and keeping both the fourth and fifth rules 3620, 3640 at the same priority could lead to unpredictable results if a document is parsed where both rules match.

The art of designing a metaschema is somewhat similar to the art of designing a schema in the first place. It is expected that some specialization for the target device or application is likely. As a rough guideline, each element and attribute is considered for the likelihood to have its name changed or to be moved to a different location in the structure. This likelihood then guides the setting of the matching priority and distance score values.

So far, the compiled metaschema 3600 has been designed for likely changes to the schema. The compiled metaschema 3600 can also be designed for undesirable schema changes. A sixth rule 3650 in the first datum rule set 3604 shows a match for the expression "/document/img/@*" with a priority value of "0.1" and a distance value of "0.9". In this case, the schema designers indicate that the image information should almost always be obtained from the attribute named src. Any other attribute name matched gives a high distance value. This could be an indication for the device to ignore the received document. It should be noted that if a higher priority rule in the first datum rule set 3604 matches the XML document, then the sixth rule 3650 does not match because only one rule from a given rule set can match. Also, the distance value could be set to be a very large value, such as "100.0", to ensure that the document returns a very low similarity score.

The title element in Example 1, line 03 is considered to always be called title and thus there was no other rule required for this element. Thus, any XML document without a /document/title element is rejected, because this is a required element shown by the second datum rule set 3608. This makes the compiled metaschema 3600 somewhat rigid in the different XML documents that the metaschema accepts. A more flexible approach is to add a rule containing the expression "/document/*[1]/text( )" with a priority value of "0.8" and distance value of "0.2". This rule matches the first element that includes text information, and is likely to be the type of text you could use for the title of a printed document. For applications in which it is considered better to print some text for the title than printing nothing at all, this is considered a reasonable, and indeed desirable, approach.

Metaschema-Based Parser Operation

Figure 33:
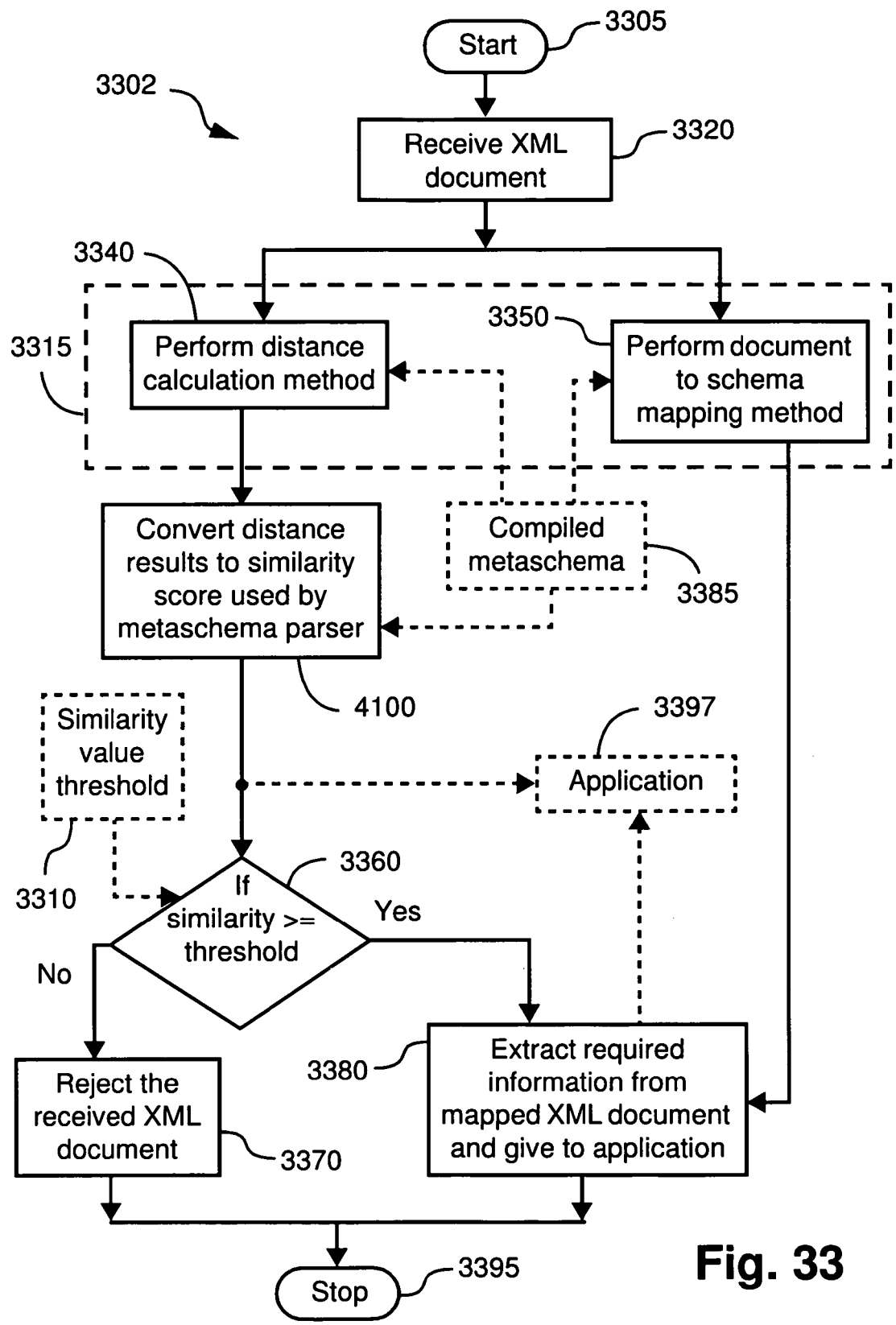
FIG. 33 is a flow diagram showing the operation of a metaschema-based parser.
Figure 34:
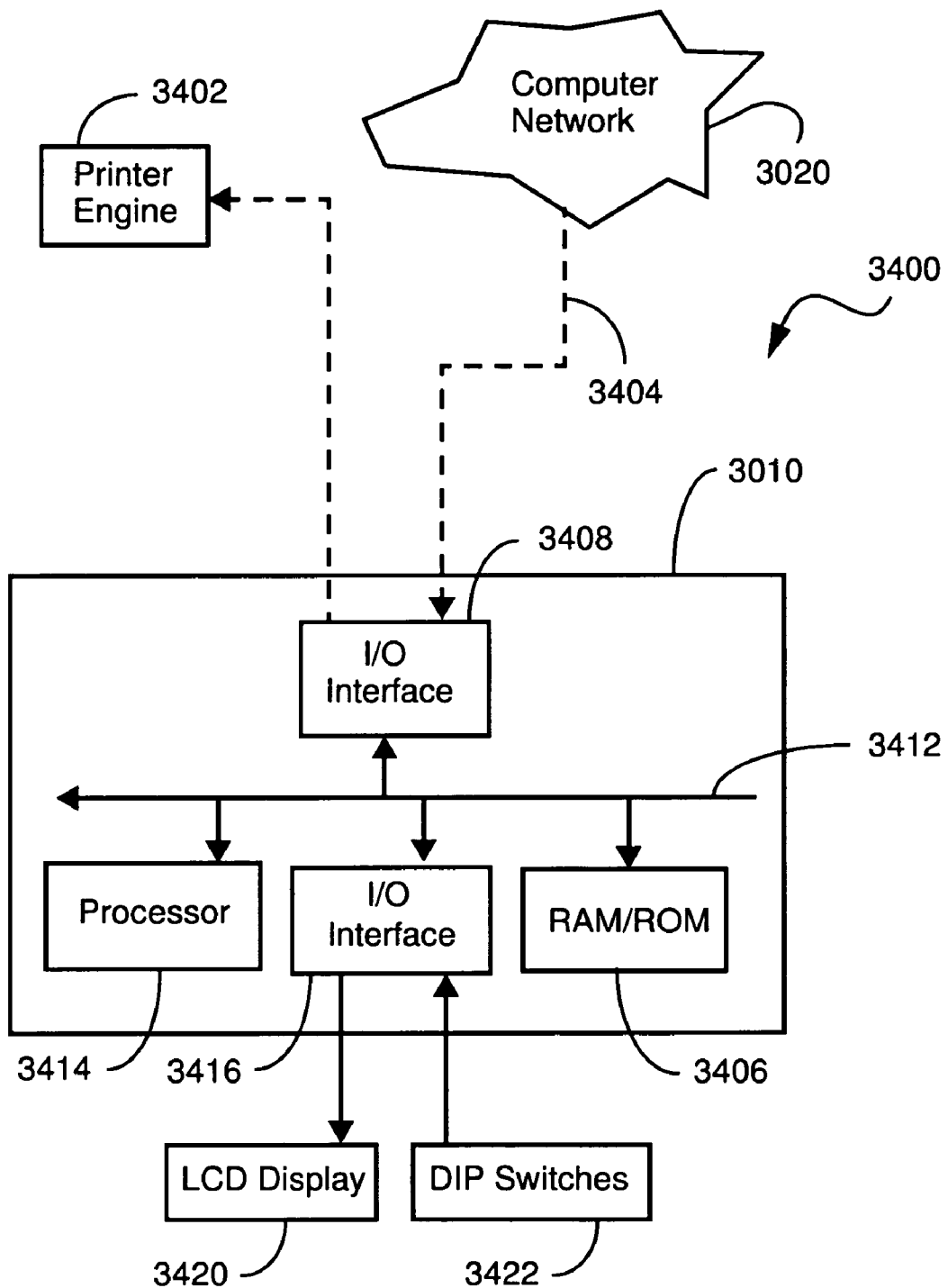
FIG. 34 is a schematic block diagram of a resource-constrained embedded computing device comprising processor, memory and I/O components.

The method for the metaschema-based parser 3300 is shown in the form of a flow diagram 3302 in FIG. 33. In an embodiment, this parser resides inside the printer 3010. The printer 3010 consists of components shown in FIG. 34. Note that FIG. 43, which is described later, is a general computing device that typically does not have the resource constraints of an embedded device. Since it is advantageous to use this invention on an embedded device, FIG. 34 is included to show a resource-constrained embedded device. The printer 3010 is connected to a network 3020 through an I/O interface 3408. This is where documents are received from devices 3040 and 3030 on the network 3020. A received document is stored in memory 3406 and processed by the metaschema-based parser shown in FIG. 33 running on the processor 3414. The resulting similarity score is optionally displayed on a display 3420 via a second I/O interface 3416. The second I/O interface 3416 optionally receives input from DIP switches 3422. The printer 3010 is also connected via the I/O interface 3408 to a printer engine 3402. The processor 3414, I/O interfaces 3408 and 3416, and memory 3406 are interconnected by means of a common bus 3412.

The flow diagram 3302 of FIG. 33 begins at a start step 3305 and proceeds to step 3320, in which the printer 3010 receives an XML document, such as that shown in Example 1. From step 3320, control flows to each of steps 3340 and 3350. Step 3340 performs a distance calculation method and step 3350 performs a document-to-schema mapping method. Step 3320 and 3350 are drawn as separate logical steps, but depending on particular implementations employed, these steps could be implemented in one step, or as parallel processes or serially where either one runs before the other. In the embodiment shown, the rule-based XML parser 3315 is used. The rule-based parser 3315 actually performs both steps 3340 and 3350 at the same time, which is indicated in FIG. 33 by a dotted line box 3315 around steps 3340 and 3350.

In this embodiment, a compiled-metaschema 3385 is used for distance calculation 3340, document to schema mapping 3350 and the similarity score calculation 4100. This is shown by dotted lines from the compiled-metaschema 3385 to each of steps 3340, 3350 and 4100.

The output of the document-to-schema mapping process 3350 is a list of data values for information requested from the compiled metaschema. In the example described earlier, the list of data values would be the result set 3830 of FIG. 38. For the compiled metaschema 3600 and input XML document shown in Example 1, there are two values returned by process 3350: (i) the image information URI (from the first rule set 3604) "a.jpg" as shown in 3886 (and Example 1, line 04), and (ii) the title information (from the second rule set 3608), "Page I" as shown in 3896 (and Example 1, line 03). In this example, the third rule set 3670 does not match the XML document shown in Example 1. Thus, the returned value in 3830 is an empty value 3895, indicating that the rule set did not match.

Step 3340 calculates the similarity (or distance) score. The result set 3830 of the rule-based XML parser 3810 returns the distance values along with other data. For the compiled metaschema 3600, step 3340 returns two results; one for the first datum rule set 3604 relating to an image, and one for the second datum rule set 3608 relating to title information. In the example of parsing the XML document shown in Example 1, both distance values are "0.0", because the document is an exact match to the expected schema.

Control passes from step 3340 to step 4100. Since the output of the similarity calculation is dependent on the method 3340 used to calculate the similarity (or distance), a further processing step 4100 is needed to convert from the output of the similarity (or distance) calculation 3340 to a value that can be used by the metaschema-based parser. When using the rule-based XML parser, a number of matched rules are returned from process 3340. This typically gives a set of distance values which are then input to process 4100. Process 4100 uses this set of distance values to calculate a single similarity value between 0.0 and 1.0 and is further described by the method in FIG. 41.

Control passes from step 4100 to step 3360, in which the similarity value output from step 4100 is compared with a stored similarity threshold 3310 to see which value is greater. The flow diagram 3302 shows the stored similarity threshold value 3310 being provided to the step 3360. The similarity threshold value 3310 can be part of the XML document sent to the device, for example, the printer 3010, or the similarity threshold value 3310 can be set and stored in the device by setting the value from another device like the PC 3040 or hand-held computer 3030 and sending the similarity threshold value 3310 to the device (printer 3010) over the network 3020. The similarity threshold value 3310 can also be fixed at the time of manufacture. The printer 3010 typically stores the value in a persistent memory 3406. In other embodiments, the similarity threshold acts as a function of a received document version, a function of the age of the device, or a function of the received document version and the age of the device.

Having the user set the similarity threshold provides a simple way for a user to control the types of XML documents the device accepts. The user does not need to understand XML or the working of the device. The user merely sets a value between 0.0 and 1.0, knowing that a value closer to 0.0 allows different types of documents to be interpreted, while setting a value nearer 1.0 rejects these different types of documents. As the device gets older, the user can expect to set the similarity threshold to a lower value so that the device accepts the latest versions of the documents. Alternatively, the device may be configured to reduce the similarity threshold automatically, based for example on a temporal measure.

A similarity score of 0.0 usually means that an input XML document did not have enough required information for the device to operate correctly. Inside the metaschema-based parser, a user set similarity threshold of 0.0 should be set to the next value above 0.0 for the threshold similarity comparison 3360. This way the device still fails XML documents that don't have enough required information in them.

It might seem useful for the user to set a low similarity threshold, as most XML documents are successfully parsed by the device. However, using a higher similarity threshold allows the user to be notified of an XML document that is not schema conformant. Thus, the user has the choice of rejecting the document or lowering the threshold value to allow the document to be processed. Printing a document that doesn't conform to the schema may not provide the expected output, so the similarity threshold is the way the user obtains some control over the operation of the device.

Returning to step 3360, for a user that only accepts a schema conformant document, the user sets the similarity threshold 3310 to 1.0. For a user that accepts almost any type of XML document, the similarity threshold 3310 is set closer to 0.0.

If the similarity value from 4100 is less than the similarity threshold 3310, "No", control passes to step 3370 in which the received XML document is rejected. Control passes from step 3370 to a terminating step 3395 and the process is completed.

Otherwise, if the similarity value from 4100 is greater than or equal to the similarity threshold 3310 at step 3360, "Yes", the XML document is considered accepted and control passes to step 3380, in which the information required from the XML document is extracted and provided to the application.

The list of data values output from the schema mapping step 3350 are provided to step 3380 for processing to extract the required information from the mapped XML document. Step 3380 then passes the required information to the application 3397. The similarity value from step 4100 may also be made available to the application 3397, as shown by a dotted line between the similarity calculation 4100 and the application 3397. In such circumstances, the application 3397 can utilise the similarity score to determine an appropriate treatment for the required data that has been extracted from the XML document in step 3380. Control proceeds from step 3380 to the terminating step 3395 after the required information has been passed to the application 3397.

The flow diagram 3302 shows that the schema mapping 3350 is always calculated. This does not always have to be the case and some optimization can be performed so that the similarity value is calculated first 4100 and checked against the threshold 3360 before the document mapping 3350 needs to be calculated. There would then also need to be a step to check that all the required elements/attributes have been found. In a preferred embodiment, the schema mapping and similarity calculation are parts of the same method, so this optimization cannot be achieved.

Similarity Score Calculation

Figure 41:
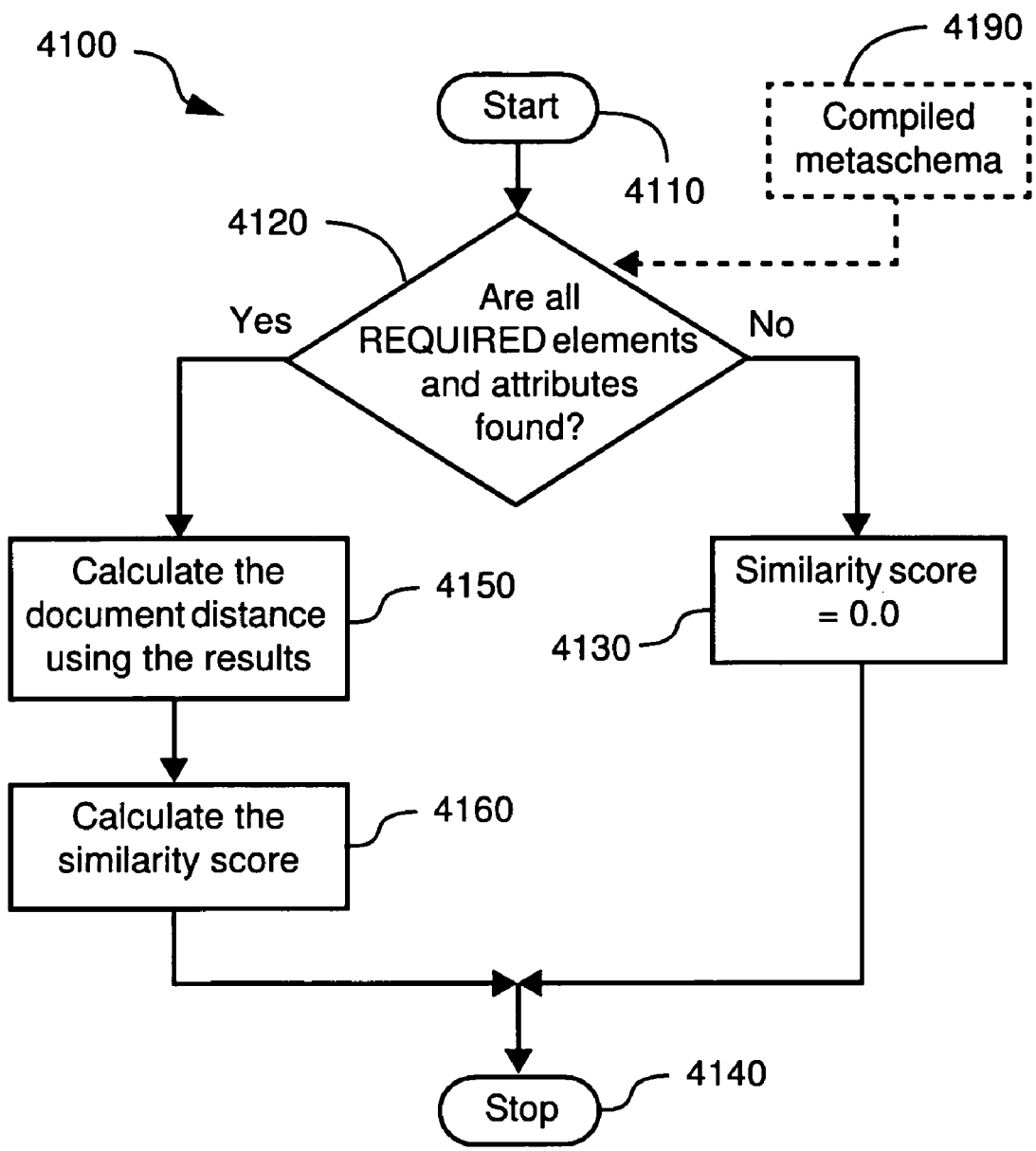
FIG. 41 is a flow diagram showing the calculation of a similarity score.

FIG. 41 is a flow diagram 4100 of a method for calculating a similarity score. The process starts at step 4110, which typically occurs after the similarity method step 3340 of FIG. 33 has completed. An application generally requires a minimal amount of required data from a received XML document. Control passes from step 4110 to step 4120, which determines whether all the required elements/attributes output from process 3350 have been found 4120. This calculation is done by referencing a compiled metaschema 4190 (shown as a dotted line box providing input to the step 4120) and checking the required/optional attributes. If there are any required elements/attributes missing, then the answer is "No", and control passes from step 4120 to step 4130, in which the similarity value is set to "0.0". From step 4130, no further processing is performed and control passes to a terminating step 4140.

Using a similarity value of "0.0" for a rejected document is the design choice for the preferred embodiment, as such a value gives one output value from this function. Since at least one required element is not present, the document should be rejected. A case may arise in which a received XML document is an exact match to the schema except for the missing required element. In such a case, the received document is likely to have a relatively high similarity value, but the step of checking for required elements/attributes ensures the document is rejected. In an alternate embodiment, step 4130 sets a flag indicating that not all required elements/attributes are found.

If all the required elements/attributes are found at step 4120, then control passes to step 4150, which calculates the document distance value. Distance values returned from the rule-based XML parser are typically between 0.0 and 1.0. Distance values are not negative values, but could be larger than 1.0, as will be explained later. The document distance is calculated as a type of average of all the distance values for matching rules. FIG. 38 shows a result set 3830 containing three rule results, 3880, 3890 and 3895. Rule results 3880 and 3890 both contain information, but rule result 3895 is empty, because that rule has not matched any element in the XML document. This empty rule result 3895 is not used in the document distance calculation, as rule result 3895 does not have an associated distance value.

The set of all the rule results (including the empty rule results) is denoted, arbitrarily, $R_a$. $R_a$ is the set of rule results 3830 returned from the rule-based XML parser 3810. The set of non-empty (valid) rule results is denoted $R_v$, where $R_v$ is a subset of $R_a$.

If the number of elements in $R_v$ are n, then the document distance is calculated by the following formula:

$$\text{document-distance} = \sqrt{\frac{\sum_{1}^{n} d_i^2}{n}}$$

where $d_i$ is the distance value for the $i^{th}$ member of $R_v$ and n is the number of elements in $R_v$.

Having calculated the document distance in step 4150, control passes to step 4160, which calculates a similarity score. The document similarity score is calculated in step 4160 as:

similarity=1.0−document-distance (when document-distance is <=1.0)

OR similarity=0.0 (when document-distance is >1.0)

After this, the similarity calculation is complete and control passes to the terminating step 4140.

The following section provides some more information about the calculations for document-distance and similarity in steps 4150 and 4160. In the above equation for document-distance, the resulting value is usually between 0.0 and 1.0. This is the case when the input distance values are between 0.0 and 1.0, as shown, for example, in Example 10. The reason for using a distance value larger than 1.0 is to weight the average function towards a larger document-distance. This would normally be the case when there is a particular element/attribute in the document and the document should be considered invalid when this element/attribute exists. Using a very large distance value, like "100.0", in such circumstances weights the document-distance value to be larger than 1.0. When the document-distance is larger than 1.0, the similarity score is set to 0.0, indicating that the document is not similar to the schema.

Although there are a number of ways to calculate document-distance, the above equation is used because values greater than 1.0 have a larger weighting on the output than values below 1.0. This leads to a distance value that is weighted in favour of keeping the document-distance larger, and thus leads to a smaller similarity score.

Other calculations, like taking the average of the distance values, can be used. It is up to the schema and metaschema designers of a particular implementation to decide whether documents are weighted to be more similar or documents are weighted to be less similar. Certainly there are cases where trying to weight documents to be more similar is desirable. In other embodiments, the document-distance is set to the maximum (or minimum) distance value from the set of returned results.

A similarity score for the example XML document in Example 3 and compiled metaschema 3600 can be calculated. The XML document in Example 3 does not match the img element, as Example 3 uses the page element. Thus, the distance value for the matching rule 3620 is 0.1. Example 3 does have the title element and the distance value for the matching rule 3660 is 0.0. There is no date attribute, so the optional rule 3680 does not match and is not counted. Calculating the document-distance value is shown below:

$$\sqrt{\frac{0.1^2 + 0.0^2}{2}} = 0.07$$

And the resulting similarity score is 1.0−0.07=0.93 which can be considered to be reasonably similar, because the calculated value is close to 1.0, the perfect match.

Compiling a Metaschema

Example 10 shows the form for a metaschema based on the XML Schema language. Example 10 is the metaschema for the compiled metaschema shown in FIG. 36. The conversion between the metaschema shown in Example 10 and the compiled metaschema shown in FIG. 36 is now described. Although not required for this example, the compiled metaschema may require more information than the metaschema provides. FIG. 42 shows extra control parameters 4295 that are used by the metaschema compilation step 4220. The sort of extra information provided by the control parameters 4295 includes information to select a specific element/attribute from a group of matching elements or attributes. For example, most rules containing '*' could match more than one element/attribute. Thus, using extra control parameters 4295 to specify which element/attribute to select may be required, depending on the actual implementation and application.

Different devices utilise data contained in marked-up documents in different ways. For example, a printer may be interested in the high-resolution image content of the document, whereas a word processor may be interested in document author information or document content revision numbers. Further, different models or variants of a given device type, such as a printer, may require or prefer different compiled metaschema. A device specific metaschema can be defined based on the information required for the particular device. Alternatively, a common metaschema can be defined and then modified through the establishment of device-specific rules during compilation. The control parameters 4295 can be utilised to target a compiled metaschema to a particular device or device type. For a particular device, the control parameters 4295 may include, for example, a similarity threshold value and other data to indicate the required information. A targeted metaschema can be strongly or loosely validating, with more or fewer rules, depending on the application.

The first step is to determine what data is required by the device. For the example presented in the discussion of the compiled metaschema 3600, the img src attribute (Example 10, line 21) and title text (Example 10, line 29) data are required, as shown by the use attributes (Example 10, line 22 and line 29). The img date attribute (Example 10, line 25) is optional, as shown by the use attribute (Example 10, line 26).

The next step is to write a rule set for each of these items. Because most of the elements and attributes involved are default values, the calculation is simple. The more complicated cases are described later. For the src attribute in the img element (Example 10 line 21), the corresponding rule 3610 has an XPath expression of the attribute's location, "/document/img/@src" and a priority of "1.0", since the src attribute (Example 10, line 21) uses the default priority value of "1.0" (i.e., priority is not specified). The distance value is set to the distance attribute or (1.0−priority) when distance attribute is not provided. This gives (1.0−priority)=(1.0−1.0)=0.0. Thus, rule 3610 has a priority value of "1.0" (3618) and a distance value of "0.0" (3619).

The src attribute (Example 10, line 21) can be renamed (Example 10, line 23) to any name with a priority of "0.1" (Example 10, line 23). This corresponds to rule 3650, where the rule has the XPath expression "/document/img/@*", a priority of "0.1" and a distance value of "0.9" (calculated from 1.0−priority).

Since the src attribute belongs to the img element (Example 10, line 15), it can also move with the img element (Example 10, line 15). The img element (Example 10, line 15) can be renamed (Example 10, line 16) to any name. This then gives rule 3620, where the XPath expression is "/document/*/@src", priority is "0.9" (Example 10, line 16) and distance value is "0.1" (calculated from 1.0−priority).

Finally, the img element (Example 10, line 15) can be relocated (Example 10, line 17) to another part of the document. This gives rule 3640 where the XPath expression is "/document//img/@src", the priority is "0.8" (Example 10, line 18) and the distance is set to the distance attribute (Example 10, line 18), which was set to "0.1".

The metaschema shown in Example 10 would produce more rules for the compiled metaschema 3600 that are not shown in the compiled metaschema. Ideally, every combination of renaming, relocating and retyping an element or attribute should be used. For example, the combination of renaming and relocating the img element with renaming the src attribute has not been shown. This provides a further rule, such as /document//*/@*, with a priority that is calculated as a combination of the priorities for document (Example 10, line 05), img relocate (Example 10, line 18), img rename (Example 10, line 16) and src rename (Example 10, line 23) items.

The rule priority is calculated as the product of the priorities of the elements and attributes comprising the rule:

$$
\begin{array}{ccccc}
/\text{document} & // & * & / & @* & \text{rule} \\
\uparrow & \uparrow & \uparrow & & \uparrow & \\
1.0 & 0.8 & 0.9 & & 0.1 & \text{priority}
\end{array}
$$

$$\text{rule priority} = 1.0 \times 0.8 \times 0.9 \times 0.1 = 0.07$$

In this example, the rule_distance is calculated by multiplying the (1.0−distance) values from each of the elements in the metaschema (Example 10, line 23). It will be appreciated by a person skilled in the art that other methods exist for determining the rule_distance, without departing from the spirit and scope of the invention.

$$
\begin{array}{ccccc}
/\text{document} & // & * & / & @* & \text{rule} \\
\uparrow & \uparrow & \uparrow & & \uparrow & \\
0.0 & 0.1 & 0.1 & & 0.9 & \text{distance} \\
1.0 & 0.9 & 0.9 & & 0.1 & (1.0 - \text{distance})
\end{array}
$$

Thus, the resulting rule distance for this example is 0.92.

Distance values can be larger than 1.0. For these cases, the rule_distance is assigned the largest distance value. That is, the above rule_distance calculation is used when all the distance values are less than (or equal to) 1.0. If any distance value is larger than 1.0, the rule_distance is set to the largest distance value. The same process can be applied to converting the metaschema shown in Example 10 to remaining rule sets 3608 and 3670 shown in FIG. 36.

The metaschema also works with namespaces. This provides more precise control over the types of elements and attributes that can match than when the wildcard '*' is used. In the preferred embodiment using the rule-based XML parser, the rules are written using XPath expressions as a convenient syntax for the rules.

Example 4

```
/document/img[namespace-uri( ) = "http://www.web.com/ns"]/@src
/document/*[local-name( )='img']/@src
```

Namespace rules for elements and attributes with namespaces attempt to match any element in a preferred namespace and then have a following rule to match elements outside the namespace. Example 4 shows two rules, with a first rule attempting to match the img element in the "http://www.web.com/ns" namespace. If the first rule fails, then a second rule attempts to match the img element in any namespace. Using this method, finer control over the schema matching can be obtained, as well as finer control over the similarity calculation.

When the rule-based XML parser matches a rule like "/document/*/@src", as in rule 3620, the parser could match more than one element. This happens when there are a number of elements below the document element that have src attributes. In such a case, the rule-based XML parser returns an array of results for that rule set. That is, the result 3880 of the rule set 3850 is an array of matching values and not just a single value as shown in 3880 of FIG. 38.

Example 5

```
01   <?xml version="1.0" encoding="UTF-8"?>
02   <document version="1.0">
03     <title>Page 1</title>
04     <img src="a.jpg"/>
05     <img src="b.jpg"/>
06     <img src="c.jpg"/>
07   </document>
```

Figure 40:
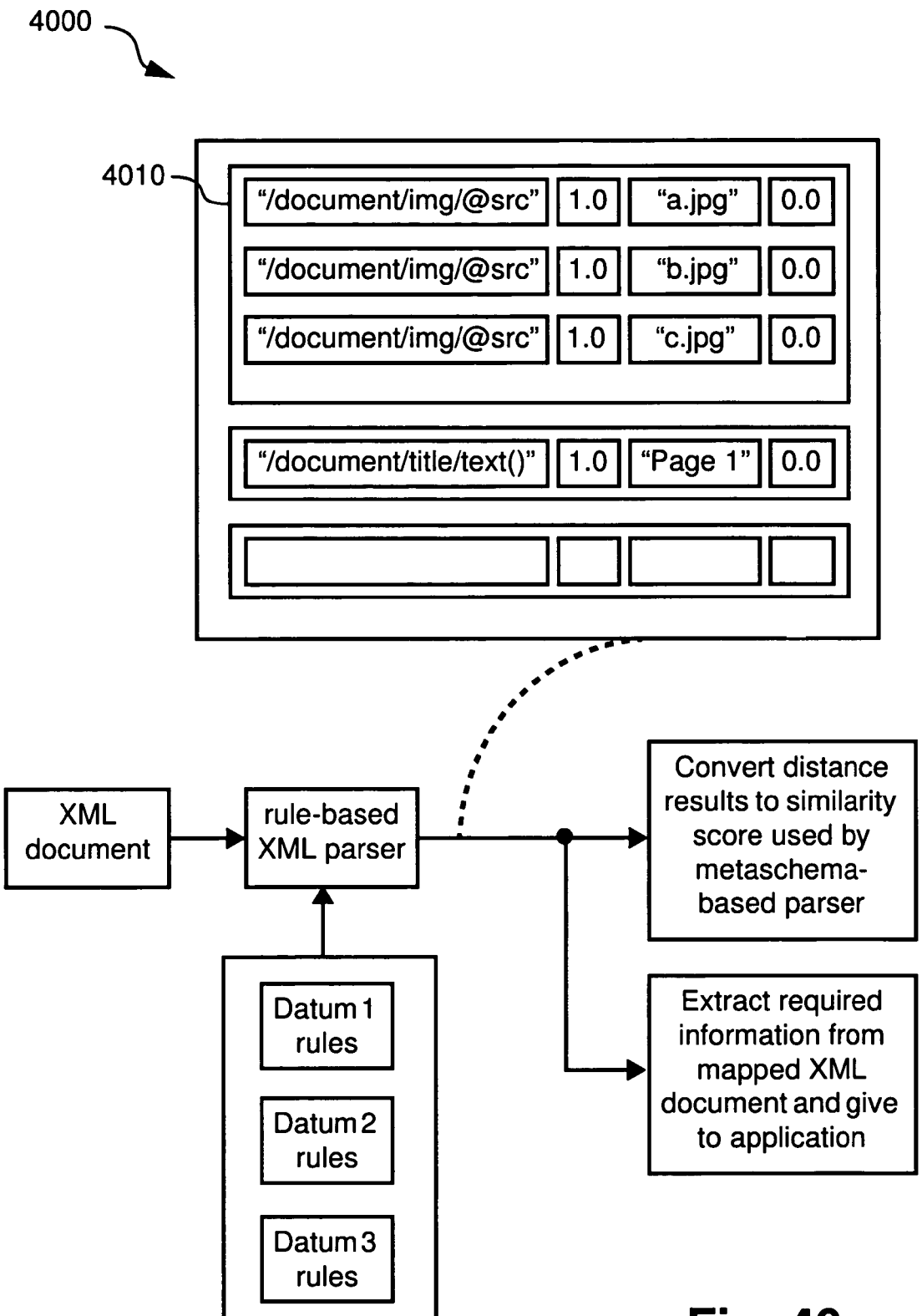
FIG. 40 is a schematic block diagram representation showing an array of matched results being returned.

Example 5 is an example of an XML document containing three img elements. The rule "/document/img/@src" matches all three img elements on lines 04, 05 and 06. FIG. 40 is a schematic block diagram representation 4000 depicting the operation of a rule-based XML parser in a manner similar to FIG. 38, but showing an array of matched results being returned. Instead of showing a result set 3830 being passed from the rule-based parser, FIG. 40 shows a result rule set 4010 consisting of an array of the values matched from the rule "/document/img/@src". The first returned values are from the match on line 04 of Example 5 and include a rule match "/document/img/@src", a priority item "1.0" of the rule that matched, a data item "a.jpg" extracted from the XML document, and a field value "0.0". The second returned values include a rule match "/document/img/@src", a priority item "1.0" of the rule that matched, a data item "b.jpg" extracted from the XML document, and a field value "0.0". The third returned values include a rule match "/document/img/@src", a priority item "1.0" of the rule that matched, a data item "c.jpg" extracted from the XML document, and a field value "0.0".

In other embodiments, the parser returns the location of one or more matched results to the application, either alone or in combination with the matched results.

When the results have arrays of matches, each result in the returned array is treated as a separate rule in the document-distance calculation. An application that is only expecting one returned result preferably uses a more specific rule like "/document/*[@src][1]/@src" to return only the first value, thus guaranteeing only one value is returned for the rule set. However, if the application wants all the results from the array to be used in the similarity calculation, then a rule like /document/*/@src is used. Since the results are returned as a set of arrays, the application does not have to use all the results; the application selects whatever result is deemed appropriate to use for a given application.

Schema Validation

A rule-based parser associated with a set of constraining rules can also be used for schema validation. Schema validation can be considered in a number of different ways. There is the traditional World Wide Web Consortium (W3C) schema validation, where all elements and attributes in the XML document match the schema; any unrecognised element or attribute causes a validation fail. Then there is a less strict version that does not fail validation on unrecognised elements or attributes. The set of constraining rules approach can provide both of these cases, as well as providing validation on individual attributes and elements. As described above, one embodiment includes the set of constraining rules in the schema itself, and another embodiment includes the set of constraining rules in a metaschema associated with the schema. The following discussion relates to a metaschema-based parser in which the set of constraining rules is included in the metaschema. However, it will be appreciated by a person skilled in the art that alternate embodiments utilising a set of constraining rules not included in an associated metaschema may equally be practised, without departing from the spirit and scope of the invention.

The rule set required flag is used to ensure that the required elements exist in the parsed XML document. Normally rule sets that are required by the application are marked as required. Marking all elements that are required for schema validation as required provides a very useful partial schema validation method, because any required rule that does not match causes the document to be rejected.

A method for providing a very good schema validation is implemented as follows. All elements and attributes in the schema are given their own rule set, like 3604 of FIG. 36. Required elements/attributes are marked as required. The remaining elements/attributes are marked as optional. This ensures the remaining elements/attributes match if those elements/attributes exist in the XML document, as shown in FIG. 35.

Figure 35:
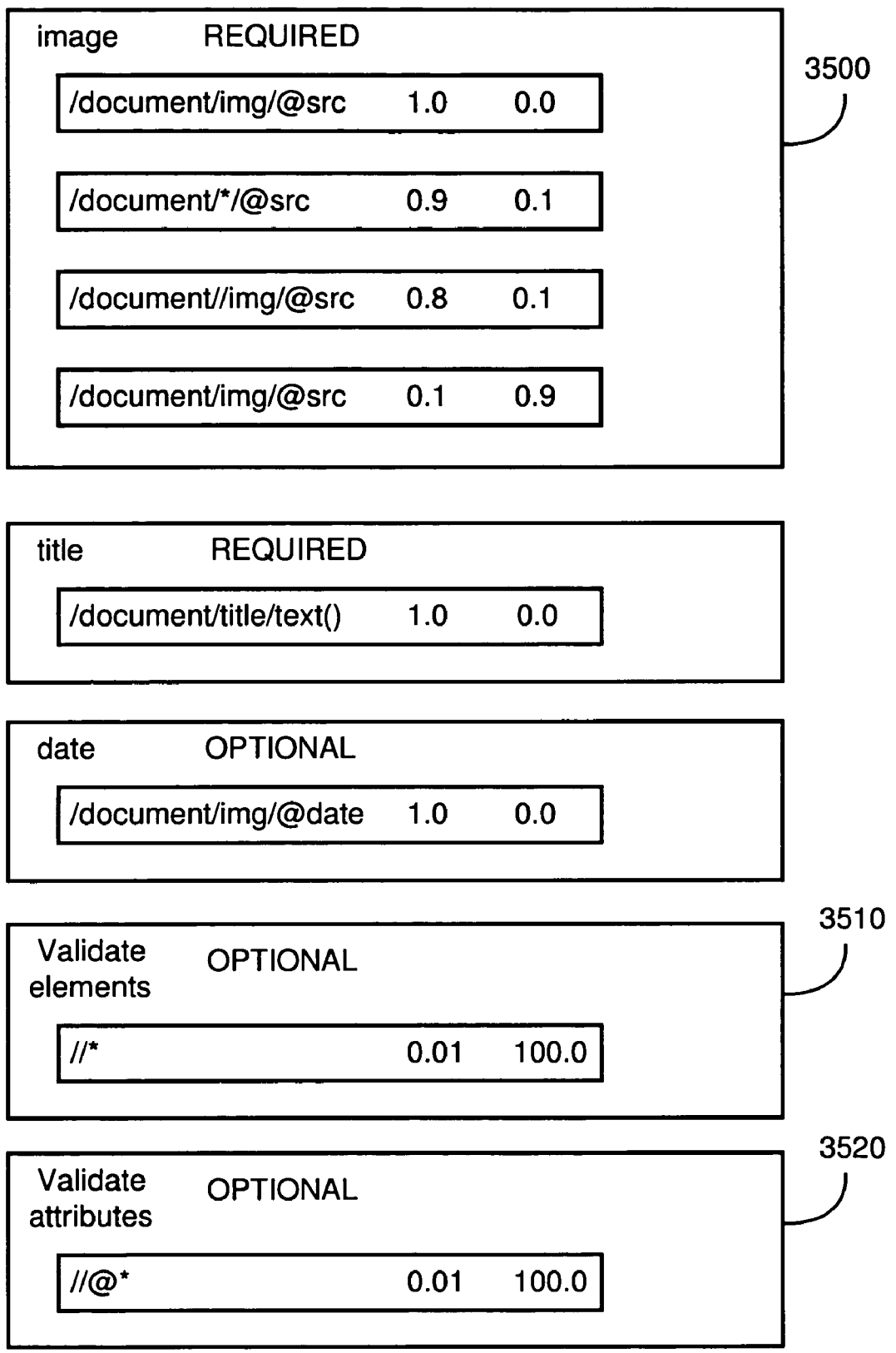
FIG. 35 is an example compiled metaschema based on the metaschema of FIG. 36, with validating rules.

FIG. 35 is an amended version of FIG. 36 and includes two new rule sets in the compiled metaschema 3500. In addition to the first, second and third rule sets 3604, 3608 and 3670 of FIG. 36, FIG. 35 introduces a fourth rule set 3510 to match any element anywhere "//*", and a fifth rule set 3520 to match any attribute anywhere "//@*". These two rules have the lowest priorities, so that these rules only match if nothing else matches. These rules also have very large distance values, for example "100.0" or larger. Thus, if either of the rules matches, the overall document-distance is larger than "1.0", and thus the resulting similarity score is ultimately "0.0".

This type of validation is valid only on elements that are in a particular namespace by using the above two rules in conjunction with the correct namespace. This is quite useful as the structure of the information from certain namespaces may have to be considered invariant, while the structure of information from other namespaces may be changing regularly and may not be considered important for schema validation.

```
01   <?xml version="1.0" encoding="UTF-8"?>
02   <document version="5.2" similarity="0.7">
03     <title>Page 1</title>
04     <img src="a.jpg"/>
05   </document>
```

Over time, a similarity score of an XML document generally decreases, as the schema is updated to newer versions. To avoid a user having to adjust the similarity threshold, an XML document optionally includes the similarity threshold. Example 6, shown above, is an example XML document where the similarity attribute is used, at line 02. Since the metaschema designers know the method and metaschema used for a metaschema-based parser, the designers can easily calculate the similarity score for new versions of the document format. Alternatively, the similarity value is calculated inside the source device generating the document and then placed inside the document. Thus, the XML document optionally provides the similarity score to the device parsing the document and thus allows the document to be printed without any intervention from the user. This similarity score is then used as the value in step 3310 of FIG. 33, when parsing the document.

As described earlier, an XML document typically has an associated version number to indicate to which version of the schema the XML document conforms. For applications that are concerned about the validity of the schema, those documents should use the version value. Typically, minor number changes mean a new schema is backwards compatible, and major number changes indicate no backwards compatibility.

Example 7

```
01   <?xml version="1.0" encoding="UTF-8"?>
02   <document version="5.2">
03     <rule set="image" path="/document/page/@src"
04        priority="0.85" distance="0.1"/>
05     <rule set="image" path="/document/item/@src"
06        priority="0.75" distance="0.2"/>
07     <title>Page 1</title>
08     
09   </document>
```

Another way to help an XML document to be accepted by a metaschema-based parser is to add extra rules within the XML document under a known element. Example 7 shows two rules added using the rule elements, at lines 03 and 05. In this way, the application updates the existing rules in the metaschema and thus guides the parsing of the XML document. This is a method of dynamically updating the metaschema of a device for individual documents.

Note that in Example 7 the rule element has a set attribute. This attribute describes to which rule set the rule is added. In the compiled metaschema shown in FIG. 36, there are three rule sets, image 3604, title 3608 and date 3670. The two rules in Example 7 are added to the image rule set 3604.

Example 7A

```
01   <rule set="image">
02     <replace old="/document/image/@src" new="/document/page/@src"
03        priority="0.85" distance="0.1" />
04     <add new="/document/item/@src" priority="0.75" distance="0.2" />
05     <delete old="/document//img/@src" />
06   </rule>
```

Example 7a shows a rule element from a fragment of an XML document. The rule element of Example 7a amends an existing rule set through the replacement, addition and deletion of rules. In particular, lines 02 and 03 show the replacement of the existing rule "/document/image/@src" with the new rule "/document/page/@src". Line 04 shows the addition of a new rule "/document/item/@src" and line 05 shows the deletion of the existing rule "/document//img/@src".

Rather than updating rule sets of an existing metaschema, as described above with reference to Examples 7 and 7a, a further approach is to update the device through the provision of a new metaschema.

One of the advantages with using the metaschema-based parser is seen when the metaschema is designed to be very flexible. Note that the typical difference between a flexible metaschema and an inflexible metaschema is that a flexible metaschema has more contingency rules, especially rules containing match anything "*" and match below here "//". An inflexible metaschema can be taken, and by adding more contingency rules, that metaschema becomes more of a flexible metaschema, where the same valid documents that match also have the same similarity score (because the same rules matched), but the flexible metaschema also matches more types of documents due to the extra rules; probably with lower similarity scores, depending on how the rules are written.

This is an advantage for device manufacturers, because it enables devices that were designed to understand one type of schema to attempt to understand another type of schema that may not have even been designed for a manufacturer's device. This is a "best-effort" attempt to understand a received XML document. For a printer, this could be very useful. If the user sends an XML document to a printer, even though the XML document looks like the printer should understand the document, the printer may decide the document is not similar enough to the schema understood by the printer. However, the user has the option to reduce the similarity threshold so that the printer extracts information from the document and attempts to print the information. If the XML document is similar enough to the schema understood by the printer, then the printer delivers to the user what is expected. If the document is not sufficiently similar, then the printer produces an output; may be some of the printout is correct and some incorrect, but this is generally better than having the printer reject the job completely, especially when the user is willing to accept some errors on the document.

It will be appreciated by a person skilled in the relevant art that the discussion above regarding the flexibility of a metaschema is equally applicable to the more general case of a set of constraining rules, irrespective of whether the set of constraining rules is embodied in the schema, an associated metaschema, or elsewhere.

Using a set of constraining rules, such as may be embodied in a metaschema, to constrain the evolution of a schema has been described in detail. The purpose of this future-proofing set of constraining rules is to guide the changes to an existing schema when creating a new schema, thus providing predictable parsing of future documents created by the new schema. The set of constraining rules, particularly when embodied as a metaschema, is also used to derive rules for the operation of the parser tasked with accepting documents conformant to schemas that are themselves conformant to the metaschema.

There are many and varied ways and purposes for creating a metaschema. Some other purposes for a metaschema-based parser are now described.

Soft validation is another use for a metaschema-based parser. XML parsers have two standardised levels of checking XML input. The most basic checking method, known as well-formedness checking, verifies that the XML document conforms to the XML syntax. XML parsers typically stop parsing an entire document or an entire hierarchical branch of a document when an XML syntax error is discovered. The next level of checking is known as validation, which involves comparison of an XML document to a schema that the document is required to follow. An XML schema is a precise description of the structure that a particular XML document can take. A schema also describes the names and types of the elements and attributes of the document. When validation is enabled for XML parsers, a binary state of valid or not valid is returned from the parser. The parser recovery mechanisms for invalid documents normally involve discarding the document.

Traditional XML parsers can be considered to use hard validation, involving only the results pass or fail. The term soft validation is introduced here to describe more than just pass or fail validation. Soft validation includes different levels of pass or fail, potentially including a continuum of values in-between.

An example of a recovery mechanism for a parser parsing a document that fails either well-formedness checking or validation checking is the behaviour of current HTML web browsers when an incorrect input document is encountered. HTML web browsers may attempt to display all sorts of malformed web pages. The approach of such web browsers is very simple and involves ignoring unknown HTML elements and displaying most or all unknown elements or content as flattened (i.e., structure-less) text until, and if, the parser of the web browser manages to recover some understanding of the structure of the input document. This approach can be useful for displaying information to a human viewing the data, however it is almost certainly useless, and destructive of information, for any subsequent computer processing of the parsed document.

A human can generally understand information provided in a wide variety of ways. A human can even understand information sent in the reverse order. However, a device has trouble when processing information received in a similar manner. A device can easily fail when one piece of information is in the wrong location or even when one character is incorrect, let alone receiving information that has been sent in the reverse order. Thus, the traditional approach of strict validation has worked well for devices; ignore a document if there is any doubt about the conformance of the document. This way the device is unlikely to crash. However, the document is not used, so the expected process or service subsequent to the parsing operation does not occur. This is an inadequate approach.

Sometimes an XML document may not validate to a particular XML schema, but it is significantly close enough that a useful mapping might be assumed. Therefore, if the parser described in the embodiment(s) is applied to a non-conformant document, then the parser output is likely to be useful for subsequent processing or services, likely yielding a more useful result to a user than the fail condition of known approaches. This is where the soft validation and the metaschema-based parser can be useful. An XML schema can be used to derive a metaschema, where the purpose of the metaschema is not to constrain the evolution of the schema, but to allow, through control by metaschema-derivation of parsing rules, documents conforming to similar schema to be parsed successfully. With a well defined metaschema, the metaschema-based parser outputs a similarity score that is used to indicate how closely an input XML document matches an expected schema. This similarity score is used in the soft validation process. The validation softness the parser is willing to accept is controlled by the threshold value, generally set by the device user. The combination of the metaschema and threshold value determine the softness. The metaschema sets the overall softness rules and the threshold sets the user allowable softness. Soft validation is generally concerned when the schema of the document being parsed is not known to the parser.

Figure 44:
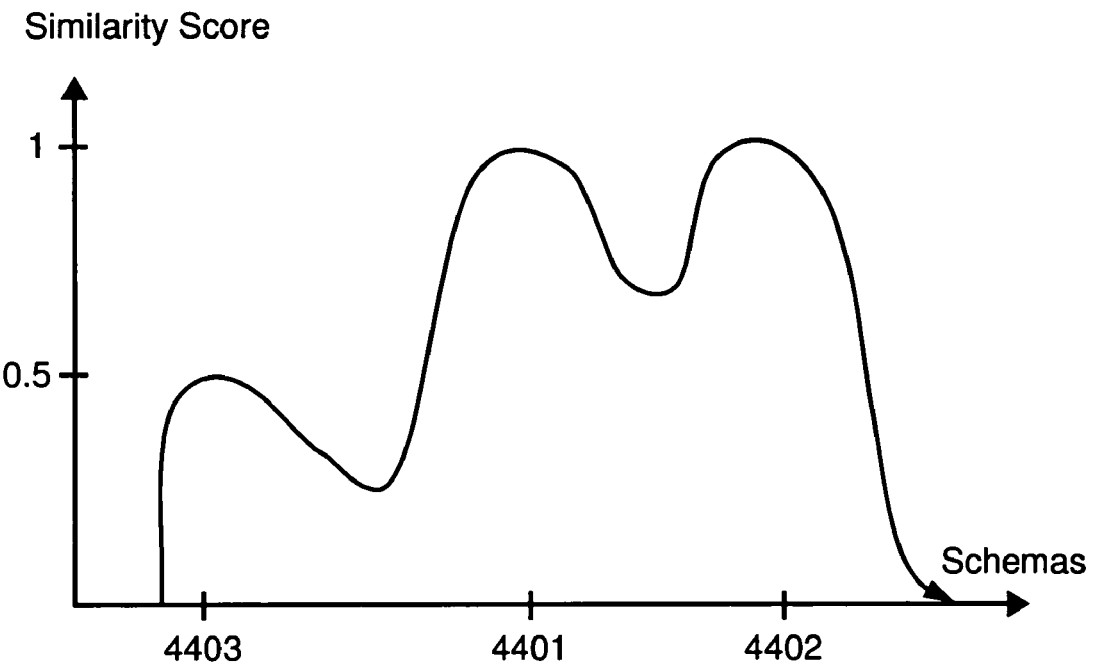
FIG. 44 is a graph of a plot of similarity scores of all schemas against a nominal metaschema.

FIG. 44 shows the metaschema in graph form. The x-axis shows a one-dimensional representation of all the schemas that can exist. The y-axis is the similarity score output from the metaschema-based parser for a document conforming to the corresponding schema on the x-axis. So FIG. 44 is a graph showing how the different schemas score for a given metaschema.

Figure 45:
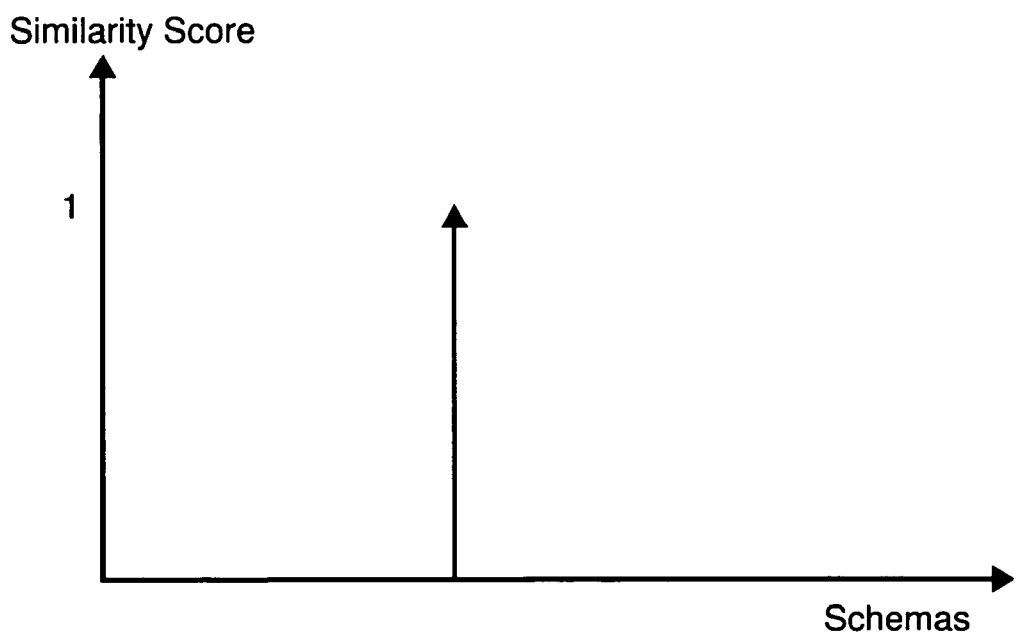
FIG. 45 is a graph of a plot of similarity scores of all schemas against traditional XML parser validation.

FIG. 45 is a graph of a traditional XML parser validation, using the metaschema graph representation described above in respect of FIG. 44. There is only one schema that will validate, giving an effective similarity score of 1, and every other schema will give an effective similarity score of 0.

Figure 46:
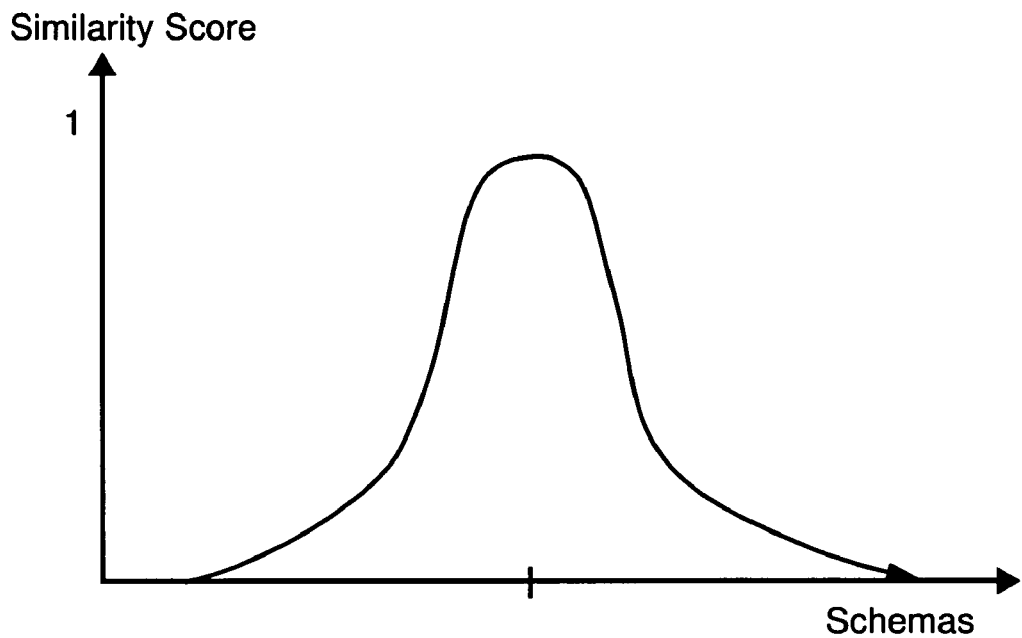
FIG. 46 is a graph of a plot of similarity scores of all schemas against a soft-validating metaschema-based parser.

FIG. 46 is a graph of an example of a typical soft validating metaschema-based parser. The known schema is shown with the highest similarity score of 1. Other similar schema, but not the same, have decreasing similarity scores, resulting in a somewhat bell-shaped curve for this example. Changing the metaschema will change the shape of the curve in the graph. This is a graph of the validation softness.

It is important to note that two or more schemas can be used to create a metaschema automatically or by hand. FIG. 44 shows a complicated metaschema that was created to perfectly match two schemas, shown by two peaks corresponding to points 4401 and 4402 on the x-axis. Of course, it could be created to perfectly match any number of required schemas. It was also designed to give a similarity score of 0.5 for the schema at point 4403 on the x-axis. This particular schema was considered to be closer to the original required schemas than other schemas, but was not considered to be a good match.

Using FIGS. 44, 45, and 46, drawing a horizontal line at the threshold value shows the number of schemas that will pass validation. This threshold value provides the user with control over the softness of the validation the user is willing to accept for the input document.

The soft validation approach is useful for a company that wants to validate documents for device types. For example, documents sent to printers are typically of similar formats. A company producing printers may have a wide range of printers. The different printers typically require similar information, in similar formats. However, the formats may not conform to one schema. The soft validation approach to document parsing allows a particular printer to work effectively with documents that were designed for similar printers in the same range. The set of constraining rules, as embodied in the metaschema in the example described, can be designed to be softer, which will allow the metaschema-based parser to be more likely to accept documents designed for printers from other manufacturers.

This soft validation approach is also useful within a company that manufactures a number of different ranges of devices. For example, the document format for a camera can be different to the document format for a printer. However, a metaschema, such as that shown in FIG. 44, can be defined to allow successful parsing of documents designed for either the printer or camera range of products. The soft validation approach allows successful parsing of XML documents that have variations in schema.

Considering that schemas are generally somewhat similar among similar device types, we can describe this as a schema theme. This is where schemas representing documents of a similar theme are generally similar. Even if the schema are not similar, defining a metaschema like the one in FIG. 44 (where it accepts two different ranges of schema 4401 and 4402) makes different schemas appear similar when considering the similarity score. So the metaschema can be considered to define a schema theme. Thus, the set of constraining rules, as embodied in this example as a metaschema, establishes how different schemas relate to the schema theme. So in the description of the metaschema for schema evolution, the metaschema represents a time based schema versioning theme; that is, the schema theme is the variations of one schema over time. In more general terminology, a set of constraining rules associated with a schema represents a time based schema versioning theme.

This view of a set of constraining rules, such as embodied in a metaschema, as a schema theme allows other uses of schema themes to be described. For example, currently web pages can be found by using the Google™ web search engine to find a pattern of words within the web page. The search can be further restricted by URL restrictions. Other than those restrictions, the user generally has to rely on the word matching. Considering that documents are being written conforming to different schema, a metaschema can be defined to represent different schema themes. In the case of document searching, the schema themes could be sports, financial, housing, health etc. . . . Defining a metaschema for each of the schema themes gives a number of different metaschema. Document searching can be enhanced by adding a schema theme attribute to the search. For example, consider a search for the text "football" with a "health" theme. The search engine finds documents containing the text "football", and then parses each document using the "health" metaschema to get the similarity score. A document that was about "football injuries" rates higher than a document about "football accounting practices", because the documents conform to different schema. Thus, the search results can be ranked on the similarity score from the metaschema-based parser for the "health" metaschema.

The metaschema (schema theme) approach can also be used in other ways. A document can be parsed using many different metaschema. For example, there may be sports, financial, housing and health metaschemas (schema themes) defined. Parsing one document against each of these metaschemas results in four different similarity scores being returned, one for each schema theme. These similarity scores can be used to plot the document in a multidimensional similarity space. This sort of document analysis may then be used in a more advanced document searching system.

Figure 47:
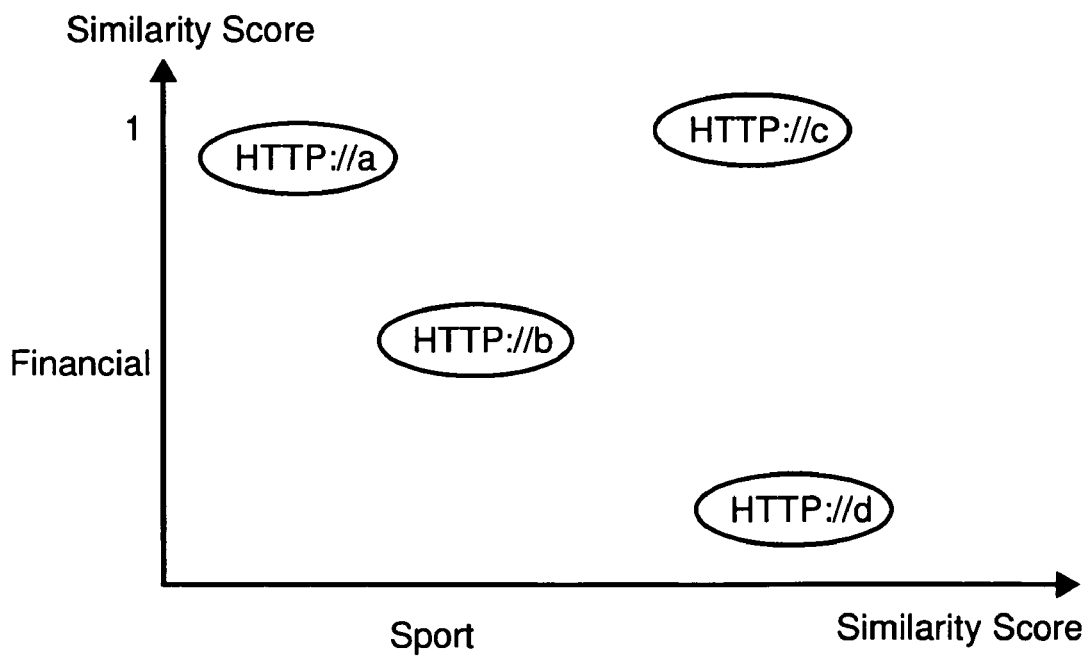
FIG. 47 is a two-dimensional schema theme graph depicting the similarity scores of given documents against two schema themes.

FIG. 47 shows a two dimensional schema theme graph. In this example, two dimensions are used for the sake of clarity. However, it will be appreciated that such multidimensional graphs may also consist of three or more axes. The figure shows the results of analysing four documents against two metaschema, one for a "financial" schema theme, shown as the y-axis, the other for a "sport" schema theme, shown as the x-axis. Each document has two similarity scores and these have been used to plot the document on the two dimensional space. The four documents are shown as ovals that represent clickable links to the locations of the respective documents on the Internet. As can be seen, a first document http://a is mostly "financial" and not very "sport"y, as it has a high similarity score measured against the financial axis and a low similarity score measured against the sport axis. A second document http://b registers a mid-range similarity score against each of the respective financial and sport axes. A third document http://c compares highly to both "financial" and "sport" schemas. An advanced document searching system could use this information to provide even better searching of documents. A fourth document http://d is mostly related to sport and has very little connection to finance, and thus registers a large similarity score on the sport axis, but a low similarity score on the financial axis.

A user can select a combination of schema themes the document should or should not match. For example, a search could specify "financial" and "sport" themes along with the normal search strings. The third document http://c rates most highly on these themes. Further, the search engine could also specify "financial" and not "sport". The search engine would then select the first document http://a as the best match, as the first document has the highest similarity to the "financial" schema theme, but the lowest score for the "sport" theme. Of course, going to more dimensions would allow for even better schema theme selection.

In the same way current search engines are continually indexing documents to allow fast searching, the similarity scores could be calculated during the indexing process and stored with the traditional indexing information. Alternatively, similarity scores can be calculated during post-processing of search results, such as when reordering the search results based on a schema value. Similarity scores can be used to include or exclude from the search results a document matching a nominal schema.

The output of a metaschema-based parser is a similarity score and, optionally, a mapping of the input XML document to the schema (or schemas) the metaschema was based on. As previously mentioned, the similarity score and mapping are generally two different functional blocks. In the above examples, the similarity score is always used as it provides useful information of validation or similarity to the known schemas. For validation, the similarity score can be used to cover all levels of validation; from very strict validation, to loose validation, to no validation. For schema theme comparison, the similarity score is used to show how closely the document conforms to the schema theme.

The mapping is not always used. In the above examples, if the document passes validation, then the mapping is useful. Otherwise, the mapping is not useful since the document is not used. For a schema theme comparison based search engine, the mapping is unlikely to be used. The similarity score will be used to help score the document against the different schema themes, but most documents searched will not be used and thus the mapping will not be required. Further, the mapping is most useful for the schema theme that the document most closely matches, so comparison to other schema themes are unlikely to need the mapping.

The embodiments described thus far relate to a device with a parser having only one metaschema. In other embodiments, a device contains a number of metaschemas from which the parser may select when parsing a received document. The selection can be based on the namespace of the root element in the document or some other information. In fact, for unrecognisable XML documents, it might be beneficial for the metaschema-based parser to parse the XML document with each different metaschema and select the results that generate the highest similarity score.

Example 8

| | | |
|---|---|---|
| 01 | <name> | |
| 02 | John Howard | |
| 03 | </name> | |

The examples in this document generally show a 1:1 mapping between document element/attribute and rule. Rules can also be written to match combined elements. Example 8 shows an XML fragment that includes a name of a person. The name "John Howard" can be retrieved by the rule "/name/text( )".

Example 9

| | | |
|---|---|---|
| 01 | <name> | |
| 01 |   <first> | |
| 02 |     John | |
| 01 |   </first> | |
| 01 |   <last> | |
| 02 |     Howard | |
| 01 |   </last> | |
| 03 | </name> | |

If the schema changes to break up the name into first name and last name, as shown in Example 9, the above rule, "/name/text( )", still works. This is because text( ) matches all text nodes below the name element.

Using the rule-based XML parser provides processing and memory scalability. That is, generally speaking, the more rules in the metaschema, the more processing and memory resources are used. If an XML document is to be parsed on a resource-constrained device, the metaschema is preferably written with fewer rules.

A metaschema can be updated, compiled if required and downloaded to a device. The device then uses the compiled metaschema to provide better document mapping and similarity scoring. This has the advantage over the prior art in that there is still one (or very few) metaschema on the device. In the prior art, there needs to be one schema for each different version of the document, which often means multiple parsers, because validating parsers are often generated from the schema.

It may be useful for a device to show the similarity score before processing the document. The user can then get some feedback as to how the received XML document maps to the expected schema. This could also be used instead of the user set similarity threshold value 3310. The user could review the similarity score and then decide whether the device should reject the document or continue to process the document.

Profiles are becoming more popular in XML. A core schema can be defined as well as profiles schema which add or remove some of the functionality of the core schema. Profiles can also be defined for different groups of devices. For example, an office profile May be used by all devices that are used in an office environment. An image profile may Be used by all devices that are used in an image processing environment. The two Schemas for these two profiles typically require different attributes and elements to be implemented in the XML document. Thus, a prior art parser that can parse a document from one schema profile might not always parse a document from the other schema profile. The metaschema for profiles can be designed by ensuring the required elements in each schema profile have a matching rule in the one metaschema.

A printer can be used in both the office environment and image processing environment. If the metaschema was designed to include both office and image profile information, then the printer is able to successfully operate in both environments.

Computer Implementation

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather than sequential.

Figure 43:
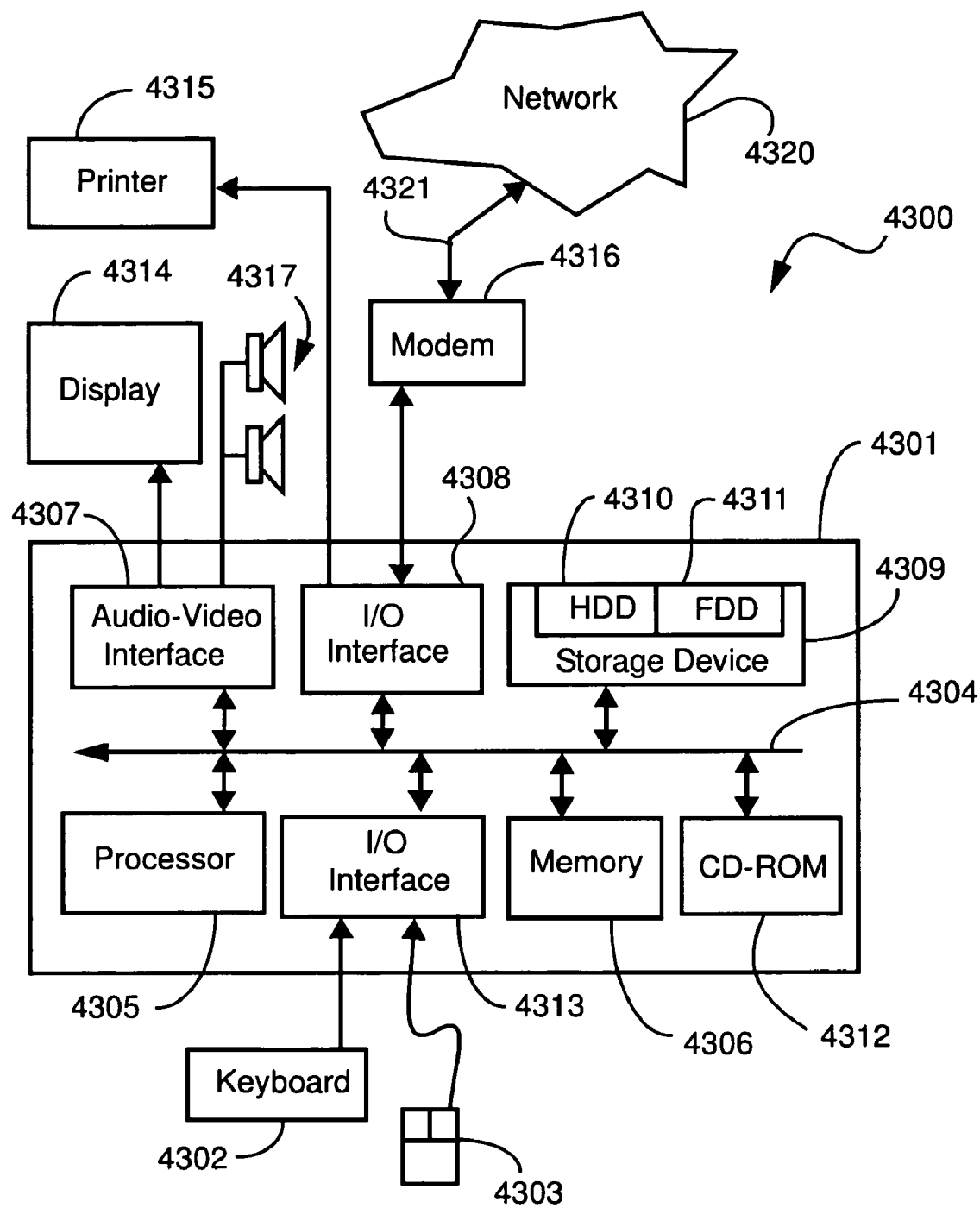
FIG. 43 is a schematic block diagram of a general purpose computer upon which arrangements described can be practised.

The methods of controlling evolution of schemas and schema validation may be practised using a general-purpose computer system 4300, such as that shown in FIG. 43 wherein the processes of FIGS. 1 to 47 may be implemented as software, such as an application program executing within the computer system 4300. In particular, the steps of the method of controlling evolution of schemas are effected by instructions in the software that are carried out by the computer. The instructions may be formed as one or more code modules, each for performing one or more particular tasks. The software may also be divided into two separate parts, in which a first part performs the methods for controlling evolution of schemas and schema validation, and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for controlling evolution of schemas.

The computer system 4300 is formed by a computer module 4301, input devices such as a keyboard 4302 and mouse 4303, output devices including a printer 4315, a display device 4314 and loudspeakers 4317. A Modulator-Demodulator (Modem) transceiver device 4316 is used by the computer module 4301 for communicating to and from a communications network 4320, for example connectable via a telephone line 4321 or other functional medium. The modem 4316 can be used to obtain access to the Internet, and other network systems, such as a Local Area Network (LAN) or a Wide Area Network (WAN), and may be incorporated into the computer module 4301 in some implementations.

The computer module 4301 typically includes at least one processor unit 4305, and a memory unit 4306, for example formed from semiconductor random access memory (RAM) and read only memory (ROM). The module 4301 also includes an number of input/output (I/O) interfaces including an audio-video interface 4307 that couples to the video display 4314 and loudspeakers 4317, an I/O interface 4313 for the keyboard 4302 and mouse 4303 and optionally a joystick (not illustrated), and an interface 4308 for the modem 4316 and printer 4315. In some implementations, the modem 4316 may be incorporated within the computer module 4301, for example within the interface 4308. A storage device 4309 is provided and typically includes a hard disk drive 4310 and a floppy disk drive 4311. A magnetic tape drive (not illustrated) may also be used. A CD-ROM drive 4312 is typically provided as a non-volatile source of data. The components 4305 to 4313 of the computer module 4301, typically communicate via an interconnected bus 4304 and in a manner which results in a conventional mode of operation of the computer system 4300 known to those in the relevant art. Examples of computers on which the described arrangements can be practised include IBM-PCs and compatibles, Sun Sparcstations or alike computer systems evolved therefrom.

Typically, the application program is resident on the hard disk drive 4310 and read and controlled in its execution by the processor 4305. Intermediate storage of the program and any data fetched from the network 4320 may be accomplished using the semiconductor memory 4306, possibly in concert with the hard disk drive 4310. In some instances, the application program may be supplied to the user encoded on a CD-ROM or floppy disk and read via the corresponding drive 4312 or 4311, or alternatively may be read by the user from the network 4320 via the modem device 4316. Still further, the software can also be loaded into the computer system 4300 from other computer readable media. The term "computer readable medium" as used herein refers to any storage or transmission medium that participates in providing instructions and/or data to the computer system 4300 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 4301. Examples of transmission media include radio or infra-red transmission channels as well as a network connection to another computer or networked device, and the Internet or Intranets including e-mail transmissions and information recorded on Websites and the like.

The methods of controlling schema evolution and schema validation may alternatively be implemented in dedicated hardware such as one or more integrated circuits performing the functions or sub functions of parsing and validation. Such dedicated hardware may include graphic processors, digital signal processors, or one or more microprocessors and associated memories.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

We claim:

1. A method for determining whether a document is acceptable or rejected for use by an apparatus, said apparatus comprising a parser for parsing said document, wherein the document is stored on a computer-readable storage medium and includes plural elements and attributes arranged according to a schema of elements and attributes, said method comprising the steps of:

using a computer to determine a version of the document;
compiling a metaschema based on the parser and the determined version of the document, said metaschema providing a set of rules for a valid change of the schema, each of the set of rules comprising a value and an expression of at least one of an element and an attribute of the schema;

using a computer to execute steps of:
  (a) determining a similarity score for said document by comparing at least one of the elements and the attributes of said document to the value and the expression of at least one of an element and an attribute of the schema in the metaschema; and
  (b) mapping the document to the schema to produce a list of data values for information requested from the compiled metaschema; and using a computer to use the similarity score to accept or reject further use of the document, wherein the list of data values is used to extract information from the mapped document if the document is accepted for further use.

2. The method according to claim 1, wherein said similarity score is based on a matched expression for said at least one of the element or the attribute in said schema.

3. The method according to claim 1, comprising the further step of:
mapping said document into a conformant document based on the similarity score and a control threshold.

4. The method according to claim 1, wherein said set of rules is included within said schema.

5. The method according to claim 1, comprising the further step of:
allocating, in said set of rules, a rule set for one or more elements and attributes in said schema, each said rule set identifying whether an associated element or attribute is required.

6. The method according to claim 1, wherein said at least one valid schema change is selected from the group consisting of rename, relocate, retype and a combination thereof.

7. The method according to claim 1, comprising the further step of:
comparing said similarity score against a threshold to determine validity of said document.

8. The method according to claim 1, comprising the further step of:
embedding rule sets in said document to update said set of rules.

9. A device having a processor and a memory, wherein the memory stores a computer-executable program executable by the processor for controlling the device to determine whether a document is acceptable or rejected for use by an apparatus, said apparatus comprising a parser for parsing said document, wherein the document is stored in the memory and includes plural elements and attributes arranged according to a schema of elements and attributes, and wherein the computer-executable program stored in the memory comprises:

computer-executable program code for determining a version of the document;
computer-executable program code for compiling a metaschema based on the parser and the determined version of the document, said metaschema providing a set of rules for a valid change of the schema, each of the set of rules comprising a value and an expression of at least one of an element and an attribute of the schema;

computer-executable program code for executing:
(a) computer-executable code for determining a similarity score for said document by comparing at least one of the elements and the attributes of said document to the value and the expression of at least one of an element and an attribute of the schema in the metaschema; and
(b) computer-executable code for mapping the document to the schema to produce a list of data values for information requested from the compiled metaschema; and computer-executable program code for using the similarity score to accept or reject further use of the document, wherein the list of data values is used to extract information from the mapped document if the document is accepted for further use.

10. A computer readable storage medium having a computer executable program recorded therein for causing a computer to determine whether a document is acceptable or rejected for use by an apparatus, said apparatus comprising a parser for parsing said document, wherein the document is stored in the computer readable storage medium and includes plural elements and attributes arranged according to a schema of elements and attributes, said computer executable program comprising:

code for determining a version of a document;
code for compiling a metaschema based on the parser and the determined version of the document, said metaschema providing a set of rules for a valid change of the schema, each of the set of rules comprising a value and an expression of at least one of an element and an attribute of the schema;
code for executing:
(a) code for determining a similarity score for said document by comparing at least one of the elements and the attributes of said document to the value and the expression of at least one of an element and an attribute of the schema in the metaschema; and
(b) code for mapping the document to the schema to produce a list of data values for information requested from the compiled metaschema; and
code for using said similarity score to accept or reject further use of said document, wherein the list of data values is used to extract information from the mapped document if the document is accepted for further use.

11. A method according to claim 1, comprising the further step of:
using a computer to constrain evolution of a schema associated with the document.

12. The method according to claim 11, wherein said valid changes are selected from the group consisting of rename, relocate, retype, and a combination thereof.

13. The method according to claim 11, comprising the further steps of:
compiling said metaschema into a device;
parsing a document received by said device using the compiled metaschema to identify the presence of required data items; and
determining a schema-validation of said received document.

14. The method according to claim 13, wherein said schema-validation is determined based on a number of the required data items.

15. A method of determining whether one or more documents are acceptable or rejected for use by an apparatus, said apparatus comprising a parser for parsing said document, wherein the documents are stored on a computer-readable storage medium and each include plural elements and attributes arranged according to a schema of elements and attributes, said method comprising the steps of:
using a computer to determine a version of the document;
using a computer to compile a metaschema based on the parser and the determined version of the document, said metaschema providing a set of rules for a valid change of the schema, each of the set of rules comprising a value and an expression of at least one of an element and an attribute of the schema;
using a computer to:
(a) determine a similarity score for each said document by comparing at least one of the elements and the attributes of said document to the value and the expression of at least one of an element and an attribute of the schema in the metaschema; and
(b) map the document to the schema to produce a list of data values for information requested from the compiled metaschema; and
using a computer to use the similarity score to accept or reject further use of the document, wherein the list of data values is used to extract information from the mapped document if the document is accepted for further use.

16. The method according to claim 15, comprising the further step of:
ranking the documents according to the determined similarity scores.

* * * * *